United States Patent [19]

Shah et al.

[11] Patent Number: 4,463,446

[45] Date of Patent: Jul. 31, 1984

[54] CONTROL DEVICE

[75] Inventors: Hasmukh R. Shah; Ashok K. Gupta, both of Hot Springs, Ark.

[73] Assignee: U.M.C. Industries, Inc., New York, N.Y.

[21] Appl. No.: 400,059

[22] Filed: Jul. 20, 1982

Related U.S. Application Data

[63] Continuation of Ser. No. 181,232, Aug. 25, 1980, abandoned.

[51] Int. Cl.[3] .......... G06F 3/02; G06F 7/50; G06F 11/00

[52] U.S. Cl. .......... 364/900; 340/825.35

[58] Field of Search .......... 364/200, 900, 464, 465, 364/479; 194/1 N, 2, 10; 340/825.35

[56] References Cited

U.S. PATENT DOCUMENTS

| | | | |
|---|---|---|---|
| 3,732,544 | 5/1973 | Obland | 364/200 |
| 3,828,317 | 8/1974 | Mette | 364/900 |
| 3,894,220 | 7/1975 | Levasseur | 194/1 N X |
| 3,982,620 | 9/1976 | Kortenhaus | 194/1 N |
| 4,001,568 | 1/1977 | Itzuka et al. | 364/900 X |
| 4,008,792 | 2/1977 | Levasseur et al. | 194/1 N |
| 4,056,181 | 11/1977 | Ikeguchi et al. | 194/10 |
| 4,093,999 | 6/1978 | Fuller et al. | 364/900 |
| 4,094,398 | 6/1978 | Camp et al. | 194/10 |
| 4,096,933 | 6/1978 | Massa | 364/479 X |
| 4,107,777 | 8/1978 | Pearson et al. | 364/479 X |
| 4,124,775 | 11/1978 | Zarouni | 194/1 N X |
| 4,231,105 | 10/1980 | Schuller et al. | 364/900 |
| 4,272,757 | 6/1981 | McLaughlin et al. | 340/825.35 |

OTHER PUBLICATIONS

Jim Barnes, "A Smart Vending Machine", 1974-1975, all pages.

*Primary Examiner*—Harvey E. Springborn

*Attorney, Agent, or Firm*—Senniger, Powers, Leavitt and Roedel

[57] ABSTRACT

A price-setting control device for a vending machine can be used to set prices for a number of products and to store those prices in a memory. A decimal-type visual display selectively, but simultaneously, displays a "line" number which is assigned to a given product plus the price set for that product. A line-selecting switch, rather than the customer-operated switches of the vending machine, is used to select the desired line number when the price, for the product corresponding to that line number, is to be set. Mode-controlling data for the operation of the vending machine can be stored in selected locations within the memory; and the line-selecting switch plus a price-setting switch can be used to change that data.

21 Claims, 29 Drawing Figures

NORMAL
FUNCTION
CREDIT
LR
LCR
PR
PCR

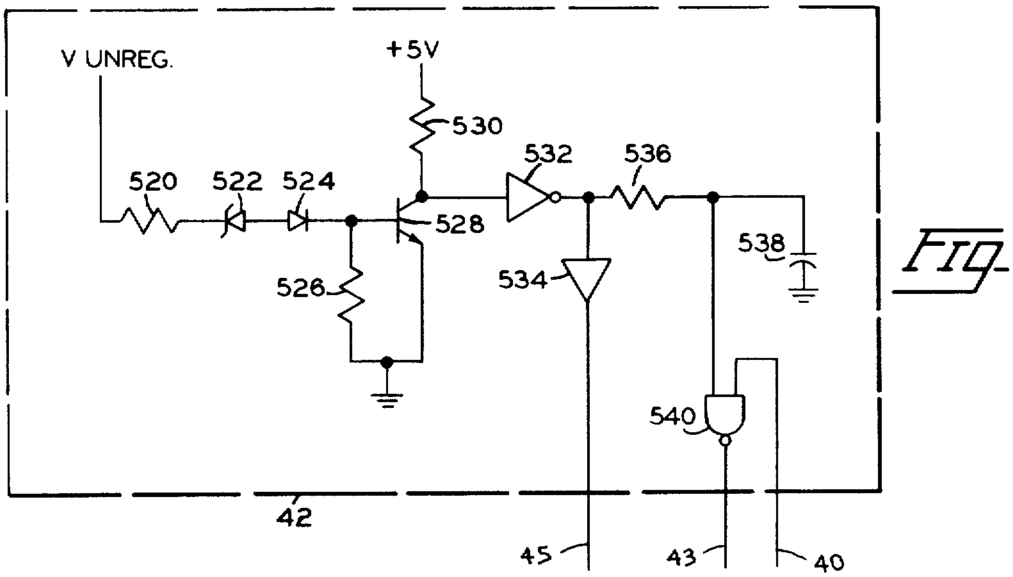
Fig. 16.
Fig. 17.
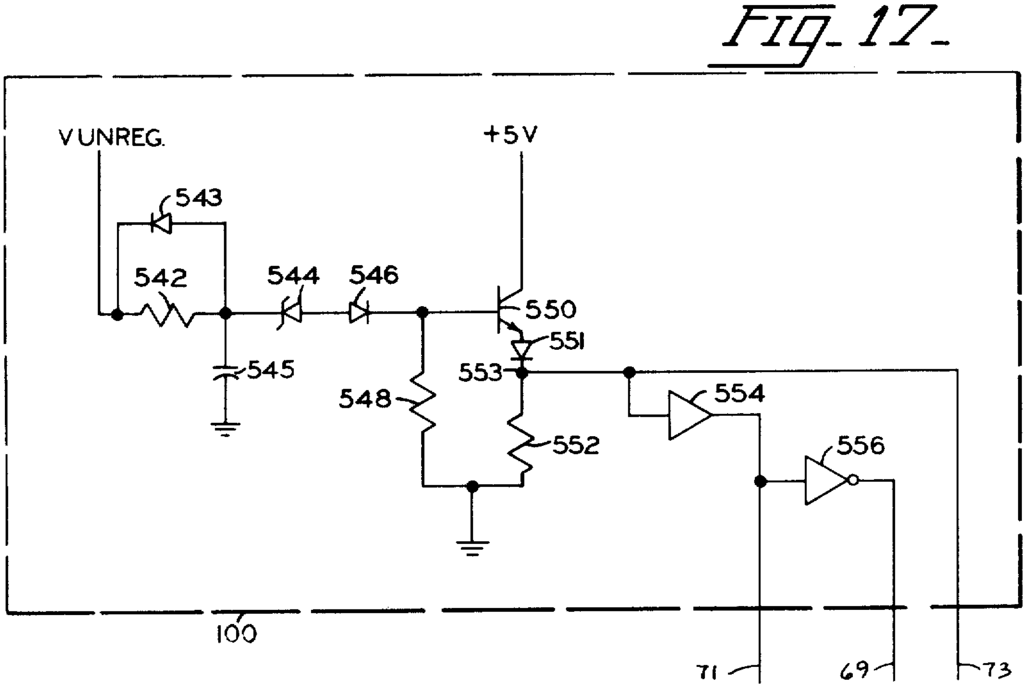

CONTROL DEVICE

This is a continuation of application Ser. No. 181,232 filed Aug. 25, 1980 which is now abandoned.

BACKGROUND OF THE INVENTION

The products which are vended by electrically-controlled vending machines are customarily selected by pressing selection switches at the exteriors of those vending machines. The prices charged for those products are customarily set by setting a number of manually-operable switches for each product. In 1974, Motorola Inc. exhibited a price-setting control device for a vending machine wherein the customer-operated selection switches of the vending machine were used to select the products whose prices where to be set, and wherein a BCD-coded thumbwheel switch was used to set the prices for those products; and those prices then were stored in a memory. That price-setting control device had a decimal-type display which displayed the value of the coinage as it was inserted.

SUMMARY OF THE INVENTION

The present invention provides a price-setting control device for a vending machine wherein a decimal-type visual display selectively, but simultaneously, displays a "line" number which is assigned to a product plus the price set for that product. The simultaneous display of the line number and of the price set for the product corresponding to that line number frees the operator of the vending machine of all need of remembering which line number is having the price therefor set. It is, therefore, an object of the present invention to provide a price-setting control device for a vending machine wherein a decimal-type visual display selectively, but simultaneously, displays a line number and the corresponding price.

It frequently is desirable to be able to set different modes for the operation of a vending machine. For example, it frequently is desirable to be able to set a long vend or a short vend or to set a maximum value of change which can be paid out during each vending cycle. The price-setting control device provided by the present invention is able to set different modes of operation for a vending machine; and it does so with the same line-selecting and price-setting switches that are used to select the various lines and to set the prices therefor. As a result, selection of various modes of operation of a vending machine can be effected without any need of additional switches. It is, therefore, an object of the present invention to provide a price-setting control device for a vending machine which can set various modes of operation for that vending machine by use of the same switches that are used to select the lines and the prices set therefor.

It frequently is desirable to have a running count of the numbers of each denomination of money that effected a vending operation, to have a running count of each vended product or service, to have a running count of the numbers of each denomination of money dispensed as change, and to have a running count of the total dollar value of the vended products and services. The numbers of each denomination of money accepted for a given vending operation, and the value of each product or service corresponding thereto, are stored in temporary registers; and then, after that product or service has been dispensed, those numbers and that value are made parts of running counts stored in memories. The numbers of each denomination of money dispensed as change are made parts of further running counts stored in further memories. The total value of all products or services is made part of a still further running count stored in a still further memory. The various running counts can be selectively displayed on the decimal-type visual display. It is, therefore, an object of the present invention to provide a price-setting control device for a vending machine which maintains, and can selectively display, a running record of the numbers of each denomination of money that effects vending operation, of each vended product or service, of the numbers of each denomination of money dispensed as change, and of the total dollar value of the vended products and services.

It sometimes happens that the power to a vending machine is interrupted; and, where the price-setting control device for that vending machine recurrently writes data into a volatile memory having a battery back-up, it would be desirable to permit that control device to complete all phases of a writing transaction before all power is lost. The present invention attains this result by sensing a descreasing supply voltage, by prohibiting the initiation of any new writing transaction, but permitting any writing transaction in process to be completed.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

BRIEF DESCRIPTION OF THE DRAWING

In the drawing.

FIG. 16 is a view of the components of the Power On/Off Interrupt block of FIG. 1, FIG. 17 is a view of the components of the Power On/Off Reset block of FIG. 1.

DETAILED DESCRIPTION OF PREFERRED EMBODIMENT

Figure 1:
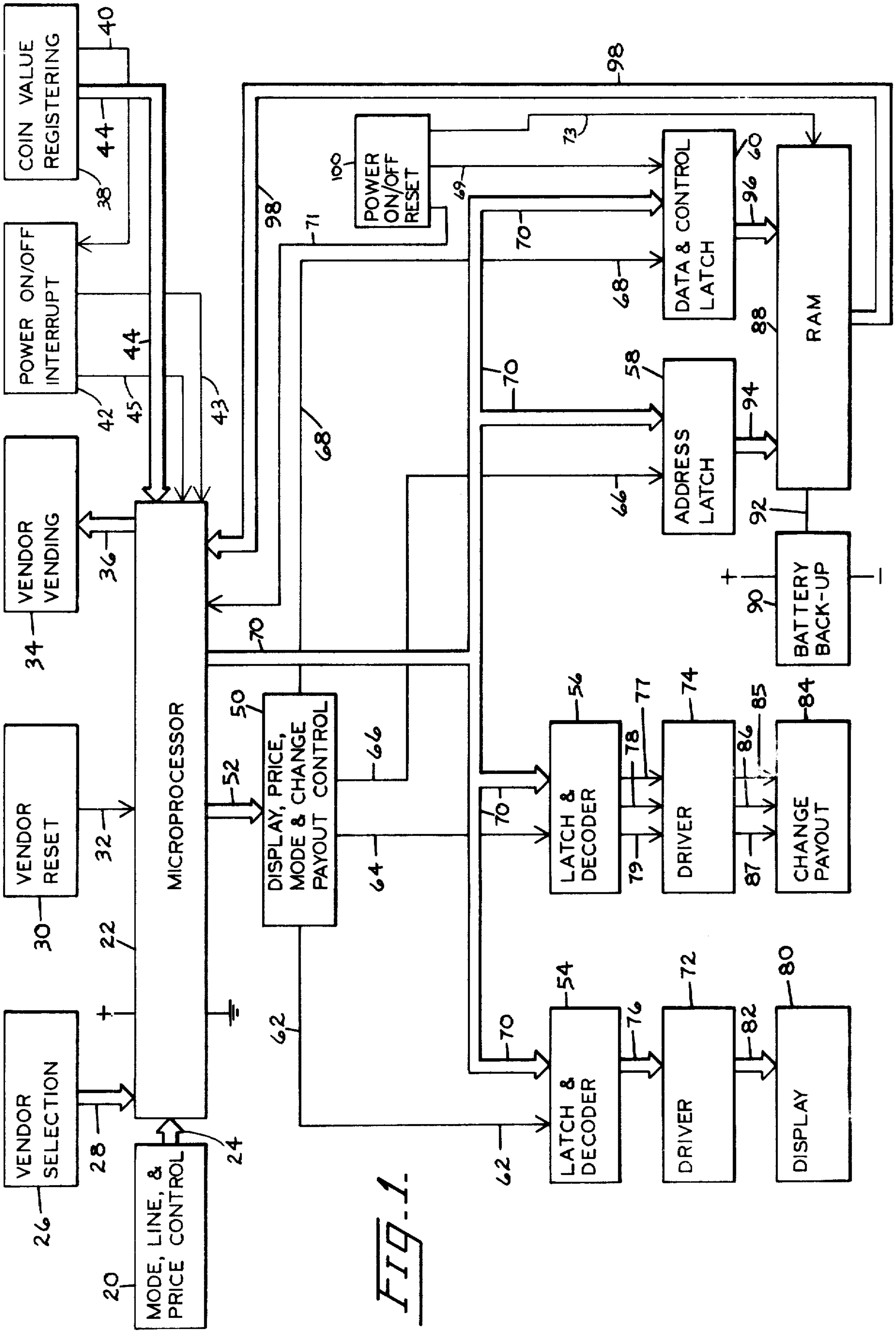
FIG. 1 is a block diagram of one preferred embodiment of Control Device that is provided by the present invention.

Referring to the drawing in detail, the numeral 20 denotes a Mode, Line And Price Control block which is part of the preferred embodiment of Control Device that is provided by the present invention. The numeral 22 denotes a Microprocessor which has one terminal thereof connected to a source of positive voltage, which has another terminal thereof connected to ground, and which is connected to the Mode, Line, And Price Control block 20 by a cable 24. Various Microprocessors could be used in the preferred embodiment of Control Device of FIG. 1; but a Mostek MK3870 Microprocessor has been found to be very useful.

That Microprocessor includes many electronic components; but this description will refer primarily to the following components: an accumulator (accumulator A) a read only memory (ROM), and various of the sixty-four scratchpad registers (B), (C), (D), (E), (F), (G), (H), (J), (M), (N), (X1), (X2), (X3), (X4), (X5), (X6), (X7), (X8), line register (LR), line control register (LCR), price register (PR), price control register (PCR), and credit register. All data supplied to, or received from, Microprocessor 22 must be stored temporarily in accumulator A; and that data will be suitably processed by the arithmetic unit of that Microprocessor.

Where less than sixty-four scratchpad registers are used, no scratchpad register need store basically-different kinds of data at different times. However, if the number of product selection lines were to be increased greatly, the program could be changed to permit one or more scratchpad registers to be used to store basically-different kinds of data at different times. For example, a single scratchpad register could be used as register B or register C; because those registers never are used simultaneously. Further, in the present embodiment, the program could be changed to permit one or more scratchpad registers to be used to store basically-different kinds of data at different times.

The numeral 26 denotes a Vendor Selection block which is connected to the Microprocessor 22 by a cable 28. Various devices could be used in the Vendor Selection block 26; but the switches 222, 224, 226 and 228 of FIG. 8 have been found to be useful. Those switches are single-pole double-throw manually-operated switches; and the are connected in the "ladder" configuration that is commonly used in vending machines. The movable contacts of those switches normally are in "open" position; and the normally-open contacts of those switches are connected to the Microprocessor 22 by conductors 230, 232, 234 and 236 which constitute the cable 28.

The numeral 30 denotes a Vendor Reset block which is connected to the Microprocessor 22 by a conductor 32. Various devices could be used in the Vendor Reset block 30; but the single-pole single-throw switch 238 of FIG. 7 has been found to be useful. The normally-closed contact of that switch is connected to the Microprocessor 22 by the conductor 32.

Figures 6, 7, 8, 9:
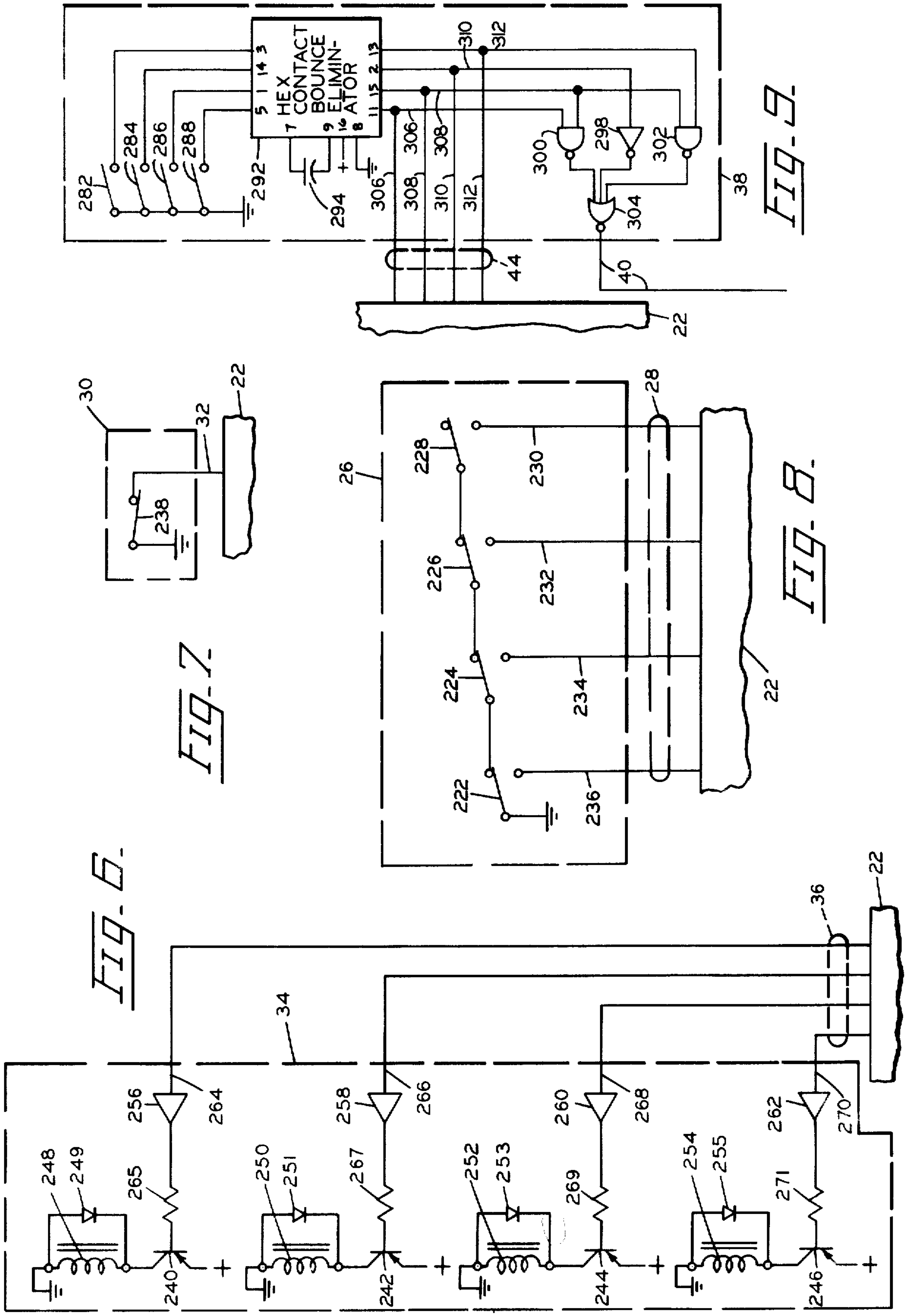
FIG. 6 is a diagrammatic view of components which can be used in the Vendor Vending block of FIG. 1.
FIG. 7 is a diagrammatic view of one component which can be used in the Vendor Reset block of FIG. 1.
FIG. 8 is a diagrammatic view of components which can be used in the Vendor Selection block of FIG. 1.
FIG. 9 is a diagrammatic view of components which can be used in the Coin Value Registering block of FIG. 1.

The numeral 34 denotes a Vendor Vending block which is connected to the Microprocessor 22 by a cable 36. Various devices could be used in the Vendor Vending block 34; but the PNP transistors 240, 242, 244 and 246 of FIG. 6 are quite usable. Relay coils 248, 250, 252 and 254 are connected between the collectors of those transistors and ground; and the emitters of those transistors are connected to the positive terminal of a source of voltage. Those relay coils operate relay contacts, not shown, of standard and usual type which can initiate the vending of products from a vending machine. A conductor 264, an amplifier 256 and a resistor 265 connect the Microprocessor 22 to the base of transistor 240. Conductor 266, an amplifier 258 and a resistor 267, conductor 268, an amplifier 260 and a resistor 269, and conductor 270, an amplifier 262 and a resistor 271 connect that Microprocessor to the bases of transistors 242, 244, and 246, respectively. Protective diodes 249, 251, 253 and 255 are connected in parallel with the relay coils 248, 250, 252 and 254, respectively. The conductors 264, 266, 268 and 270 constitute cable 36.

The numeral 38 denotes a Coin Value Registering block. Various devices could be used in the Coin Value Registering block 38; but the arrangement of devices shown in FIG. 9 is useful. Those devices include circuit-closing devices 282, 284, 286 and 288, which could be switches that have actuators extending into coin chutes for nickels, dimes, quarters and dollars, could be opto-couplers which have the components thereof disposed to develop an output when a nickel, dime, quarter or dollar passes through coin chutes adjacent those opto-couplers, or could be any other suitable money-sensing devices. One terminal of each of the circuit-closing devices 282, 284, 286 and 288 is connected to ground. The numeral 292 denotes an anti-bounce device which is intended to respond to the closing of any of the circuit-closing devices 282, 284, 286 and 288 to provide a bounce-free signal. Although various devices could be used as the anti-bounce device 292, the Motorola MC14490 Hex Contact Bounce Eliminator is useful. A capacitor 294 is connected to terminals 7 and 9 of that anti-bounce device. The other terminals of the circuit-closing devices 282, 284, 286 and 288 are connected, respectively, to terminals 3, 14, 1 and 5 of that anti-bounce device. Output terminal 11 of the anti-bounce device 292 is connected by a branched conductor 306 to one terminal of Microprocessor 22 and to one input of a NAND gate 300. Output terminal 15 of that anti-bounce device is connected by a branched conductor 308 to a further terminal of Microprocessor 22, to the other input of NAND gate 300 and to one input of a NAND gate 302. Output terminal 2 of that anti-bounce device is connected by a branched conductor 310 to another terminal of Microprocessor 22 and to the input of an inverter 298; and output terminal 13 of that anti-bounce device is connected by a branched conductor 312 to a still further terminal of Microprocessor and to the other input of NAND gate 302. A NOR gate 304 has the three inputs thereof connected to the outputs of NAND gate 300, inverter 298 and NAND gate 302. The output of that NOR gate is connected to one terminal of a Power On/Off Interrupt block 42 by a conductor 40. Branches of conductors 306, 308, 310 and 312 constitute a cable 44.

Referring particularly to FIG. 16, the numeral 520 denotes a resistor which has one terminal thereof connected to a source of unregulated voltage greater than five volts. A Zener diode 522, a diode 524, and a resistor 526 connect the other terminal of resistor 520 to ground. The junction between diode 524 and resistor 526 is connected to the base of an NPN transistor 528. A resistor 530 connects the collector of that transistor to a source of regulated plus five volts. The collector of that transistor also is connected to the input of an inverter 532; and the output of that inverter is connected to the input of a buffer amplifier 534 and to one terminal of a resistor 536. The other terminal of that resistor is connected to one input of a NAND gate 540 and to one terminal of a capacitor 538 which has the other terminal thereof grounded. The output of buffer amplifier 534 is connected to a conductor 45, the conductor 40 extends to the other input of NAND gate 540, and a conductor 43 is connected to the output of that NAND gate.

During normal operation of the control device of the present invention, the source of unregulated voltage, resistor 520, Zener diode 522, diode 524 and resistor 526 cause a voltage to be applied to the base of transistor 528 which makes that transistor conductive. As a result, the voltage at the collector of that transistor, and hence at the input of inverter 532, will be a logic "0". The resulting logic "1" at the output of inverter 532 will be applied by buffer amplifier 534 to conductor 45, will be applied to the input of NAND gate 540 by resistor 536, and will charge capacitor 538. During normal operation of the control device, a logic "1" will appear on conductor 45 and at the left-hand input of NAND gate 540; and, except when money is inserted, a "1" will appear on conductor 40. Consequently, during normal operation of the control device, a logic "1" will appear on conductor 40 except when money is inserted.

In the event the power fails or is cut off, the unregulated voltage at the left-hand terminal of resistor 520 will start to decrease; and, prior to the time the regulated plus five volts start to decrease, the Zener-reduced voltage will fall to a value at which transistor 528 will become non-conductive. At that time, the collector voltage will become logic "1"; and inverter 532 will apply a logic "0" to buffer amplifier 534 and to the RC network constituted by resistor 536 and capacitor 538. Immediately, the logic state of conductor 45 will become a "0"; but, for a short time, the logic state of conductor 43 will be responsive to the logic state of conductor 40. Once capacitor 538 has fully discharged, the resulting zero at the left-hand input of NAND gate 540 will force a "1" to appear at the output of that NAND gate, and hence on conductor 43.

The numeral 50 denotes a Display, Price, Mode, And Change Payout Control block. Various devices could be used in that block; but one-half of a Motorola MC14556B Binary To 1-of-4 Decoder has been found to be useful. A three conductor cable 52 extends from the Microprocessor 22 to terminals 1, 2 and 3 of that half of that Decoder. Those conductors supply, respectively, an output strobe, an output select A signal, and an output select B signal to that half of that Decoder.

Figure 11:
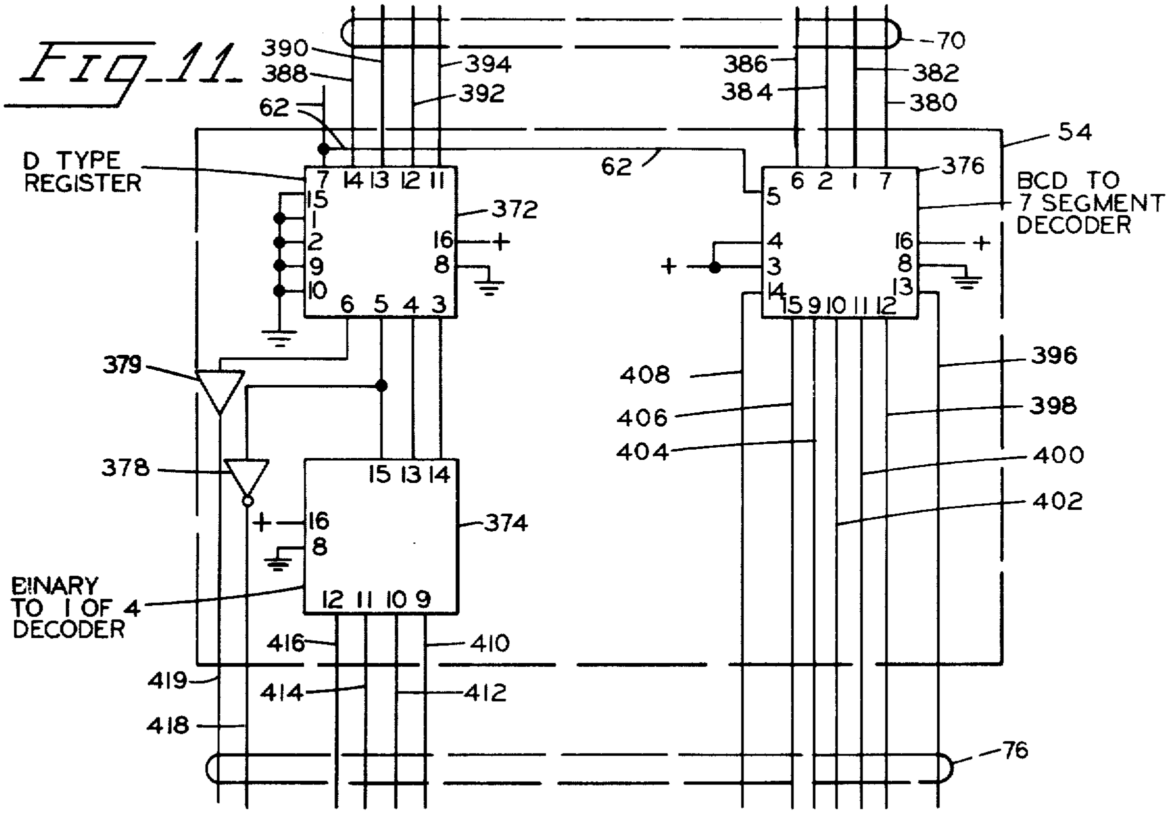
FIG. 11 is a view of the components of the Latch & Decoder block for the Display block of FIG. 1.

The numeral 54 denotes a Latch & Decoder block. Various components could be used in that block; but, as indicated by FIG. 11, a Motorola MC14076B D Type Register 372, the other half 374 of the Motorola MC14556B Binary to 1-of-4 Decoder, a Motorola MC14511B BCD-to-Seven Segment Decoder 376, an inverter 378, and a buffer amplifier 379 have been found to be useful. A conductor 62 extends from terminal 7 (the Q3 terminal) of the Decoder half of block 50 to terminal 7 (the clock terminal) of Register 372 and to terminal 5 of the Decoder 376. Conductors 380, 382, 384 and 386 of an eight-conductor cable 70 extend from the Microprocessor 22 to terminals 7, 1, 2 and 6 of the Decoder 376; and conductors 388, 390, 392 and 394 of that cable extend to terminals 14–11 of the Register 372. Terminals 3, 4 and 5 of that Register are connected, respectively, to terminals 14, 13 and 15 of the Decoder 374. Terminal 6 of Register 372 is connected, by buffer amplifier 379, to a conductor 419 which is a part of a thirteen-conductor cable 76 that extends to a Driver block 72. The inverter 378 also connects terminal 5 of Register 372 to a conductor 418 which is part of that cable. Conductors 410, 412, 414 and 416 of cable 76 are connected, respectively, to terminals 9–12 of Decoder 374. Terminals 1, 2, 8, 9, 10 and 15 of the Register 372 are connected to ground. Terminal 16 of that Register is connected to the positive terminal of the source of voltage. Terminals 3 and 4 of the Decoder 376 are connected to that positive terminal of that source of voltage; and terminals 13, 12, 11, 10, 9, 15 and 14 are connected, respectively, to conductors 396, 398, 400, 402, 404, 406 and 408 of cable 76.

Figure 12:
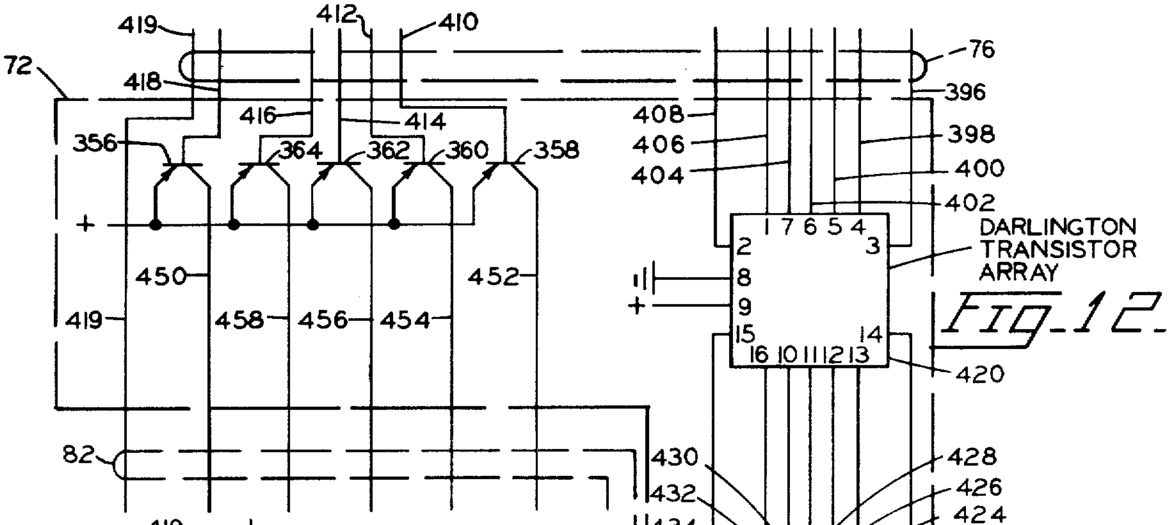
FIG. 12 is a view of the components of the Driver block for the Display block of FIG. 1.

Various components could be used in the Driver block 72. However, as shown by FIG. 12, a Motorola MC1416 Darlington Transistor Array 420, seven resistors 422, 424, 426, 428, 430, 432 and 434, and five PNP transistors 356, 358, 360, 362 and 364 have been found to be useful. Terminals 3, 4, 5, 6, 7, 1 and 2 of Array 420 are connected, respectively, to conductors 396, 398, 400, 402, 404, 406 and 408 of cable 76. Terminal 8 of that Driver is connected to ground, and terminal 9 is connected to the positive terminal of the source of voltage. The resistors 422, 424, 426, 428, 430, 432 and 434 connect terminals 14, 13, 12, 11, 10, 16 and 15 of Driver 420 to conductors 436, 438, 440, 442, 444, 446 and 448 of a thirteen-conductor cable 82 which extends to a Display block 80. The bases of transistors 356, 358, 360, 362 and 364 are connected, respectively, to conductors 418, 410, 412, 414 and 416. The emitters of those transistors are connected together and to the positive terminal of the source of voltage. The collectors of those transistors are connected by conductors 450, 452, 454, 456 and 458 of cable 82 to the Display block 80. Conductor 419 extends through FIG. 12 as part of cables 76 and 82 and serves to control a selectively-illuminated decimal point.

Figure 13:
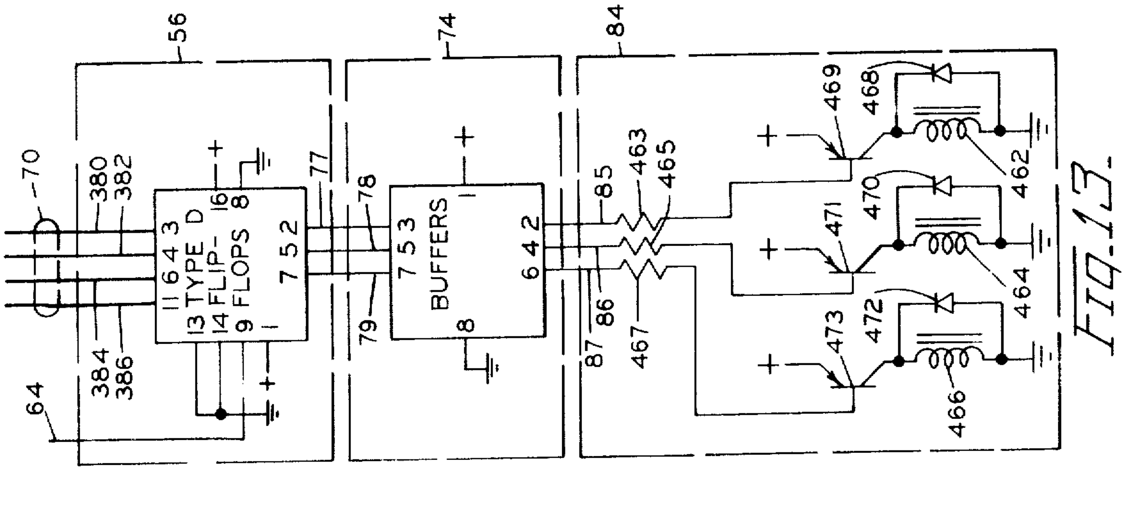
FIG. 13 is a view of the components of the Change Payout block of FIG. 1 and of the Driver and Latch & Decoder blocks therefor which also are shown in FIG. 1.

The numeral 56 denotes a Latch & Decoder block which is shown in detail by FIG. 13. Various devices could be used in that block; but a Motorola MC14174B Hex Type D Flip-Flop has been found to be useful.

Conductors 380, 382, 384 and 386 of cable 70 are connected to terminals 3, 4, 6 and 11 of that Flip-Flop. Terminals 8, 13 and 14 of that Flip-Flop are connected to ground, terminals 1 and 16 are connected to the positive terminal of the source of voltage, and terminals 10, 12, and 15 are not connected. A conductor 64 extends from terminal 4 (the $\bar{Q}0$ terminal) of the half Decoder of block 50 to terminal 9 of the Flip-Flop of block 56. Terminals 2, 5 and 7 of that Flip-Flop are connected, respectively, to conductors 77, 78 and 79 which extend to a Driver block 74. That Driver block is shown in detail by FIG. 13.

Various devices could be used in the block 74; but a Motorola MC14050-B Hex Non-Inverting Buffer has been found to be useful. Terminals 3, 5 and 7 of that Buffer are connected, respectively, to conductors 77, 78 and 79. Terminals 2, 4 and 6 of that Buffer are connected, respectively, to conductors 85, 86 and 87 which extend to a Change Payout block 84. That change Payout block also is shown by FIG. 13.

Various devices could be used in the block 84; but, as shown by FIG. 13, three PNP transistors 469, 471 and 473 have been found to be useful. Solenoids 462, 464 and 466 are connected between the collectors of those transistors and ground; and the emitters of those transistors are connected to the positive terminal of the source of voltage. Resistors 463, 465 and 467 connect the conductors 85, 86 and 87, which are connected to terminals 2, 4 and 6 of the Buffer, to the bases of the transistors 469, 471 and 473, respectively. Three diodes 468, 470 and 472 are connected in parallel with the solenoids 462, 464 and 466 respectively. Solenoid 462 will cause an ejector to dispense a nickel each time it is energized, solenoid 464 will cause a second ejector to dispense a dime each time it is energized, and solenoid 466 will cause a third ejector to dispense a quarter each time it is energized. Those coins will pass to a coin cup at the exterior of the vending machine.

Figure 14:
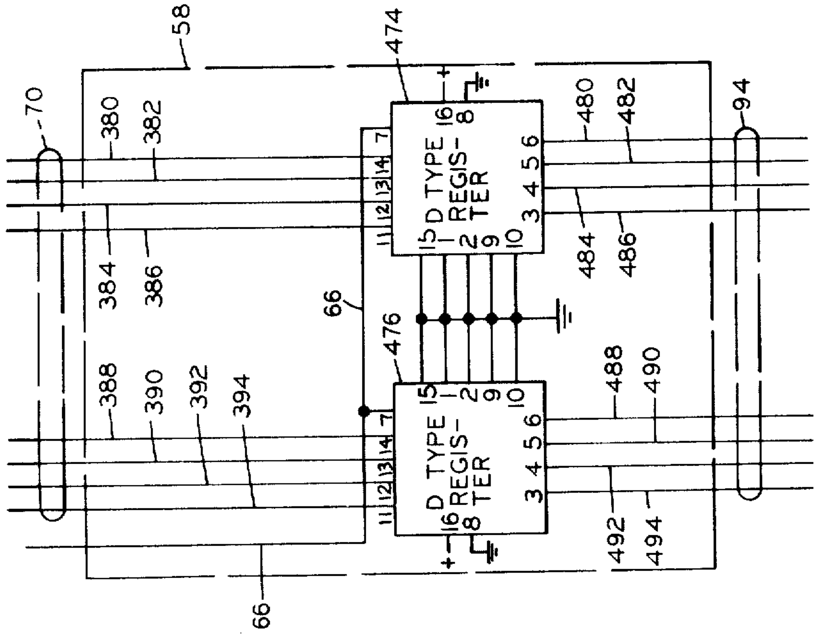
FIG. 14 is a view of the components of the Address Latch block of FIG. 1.

The numeral 58 denotes an Address Latch block. Various devices could be included in that block; but, as shown by FIG. 14, two Motorola MC14076B D type Registers 474 and 476 have been found to be useful. Conductors 380, 382, 384 and 386 respectively, of cable 70 are connectd to terminals 14, 13, 12 and 11 of Register 474. Terminal 16 of that Register is connected to the positive terminal of the source of voltage; and terminals 8, 15, 1, 2, 9 and 10 are connected to ground. A conductor 66 connects terminal 5 (the $\bar{Q}1$ terminal) of the half Decoder of block 50 to terminal 7 of Register 474 and also to terminal 7 of Register 476. Conductors 388, 390 392 and 394, respectively, of cable 70 are connected to terminals 14, 13, 12 and 11 of Register 476. Terminals 15, 1, 2, 9, 10 and 8 of that Register are connected to ground; and terminal 16 of that Register is connected to the positive terminal of the source of voltage. An eight-conductor cable 94 extends from the block 58 to a RAM block 88. Conductors 480, 482, 484 and 486 of that cable are connected, respectively, to terminals 6, 5, 4 and 3 of Register 474; and conductors 488, 490, 492 and 494 of that cable are connected, respectively, to terminals 6, 5, 4 and 3 of Register 476.

Figure 15:
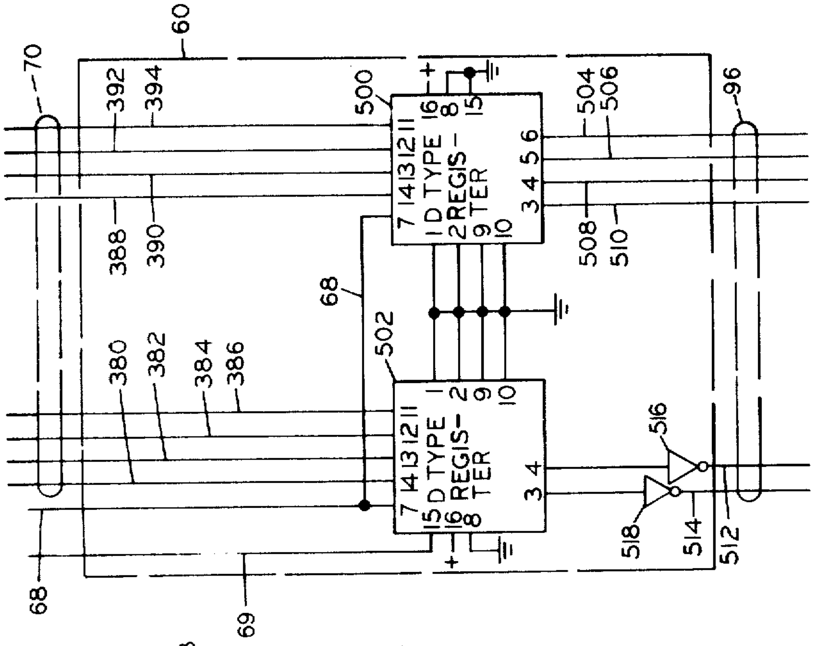
FIG. 15 is a view of the components of the Data & Control Latch block of FIG. 1.

The numeral 60 denotes a Data and Control Latch block. Various devices could be used in that block; but, as shown by FIG. 15, two Motorola MC14076B D type Registers 500 and 502 have been found to be useful. Terminals 1, 2, 9, 10, 8 and 15 of the Register 500, and terminals 1, 2, 9, 10 and 8 of the Register 502 are connected to ground; and terminals 16 of each of those Registers are connected to the positive terminal of the voltage source. A conductor 68 extends from terminal 6 (the $\bar{Q}2$ terminal) of the half Decoder of block 50 to the clock terminals 7 of Registers 500 and 502; and a conductor 69 extends between terminal 15 of the Register 502 and a Power On/Off Reset block 100. Conductors 394, 392, 390 and 388 of cable 70 extend, respectively, to terminals 11-14 of Register 500, and conductors 386, 384, 382 and 380 of that cable extend, respectively, to terminals 11-14 of Register 502. Conductors 504, 506, 508 and 510 of a six-conductor cable 96 extend from terminals 6-3, respectively, of Register 500 to RAM block 88. An inverter 516 connects terminal 4 of Register 502 to conductor 512, and an inverter 518 connects terminal 3 of Register 502 to conductor 514. Both of those conductors are parts of cable 96 and extend to RAM block 88.

Various devices could be used in the RAM block 88, but a Motorola MC145101 256×4 Bit Static RAM has been found to be useful. Terminal 22 of that RAM block is connected to a source of positive voltage, namely, a conventional Battery Back-up block 90, by a conductor 92; and terminals 8 and 18 of that RAM block are connected to ground. Conductors 480, 482, 484, 486, 488, 490, 492 and 494 of the eight-conductor cable 94 that extend from the Address Latch block 58 in FIG. 14 extend, respectively, to the terminals 1, 2, 3, 4, 7, 6, 5 and 21 of the RAM block 88. Conductors 504, 506, 508, 510, 512 and 514 of the six-conductor cable 96 that extend from the Data and Control Latch block 60 in FIG. 15 extend, respectively, to the terminals 15, 13, 11, 9, 19 and 20 of that RAM block. A four-conductor cable 98 connects the terminals 10, 12, 14 and 16 of that RAM block to Microprocessor 22. A conductor 73 extends from Power On/Off Reset block 100 to terminal 17 of that RAM block.

For convenience, selected memory locations within the RAM block 88 have been assigned line numbers 1-18. The following chart lists the relation of the stored data to, and lists the memory locations for, those line numbers:

| Line No. | Stored Data Relates To | Memory Locations in RAM block 88 |
|---|---|---|
| 1 | Selection Line 1 | 2 and 3 |
| 2 | Selection Line 2 | 4 and 5 |
| 3 | Selection Line 3 | 6 and 7 |
| 4 | Selection Line 4 | 8 and 9 |
| 5 | Long/short vend | 10 and 11 |
| 6 | Change limitation | 12 and 13 |
| 7 | Running count of quarters paid out as change | 14-17 |
| 8 | Running count of dimes paid out as change | 18-21 |
| 9 | Running count of nickels paid out as change | 22-25 |
| 10 | Running count of total sales | 26-29 |
| 11 | Running count of dispensed lines 1 items | 30-33 |
| 12 | Running count of dispensed line 2 items | 34-37 |
| 13 | Running count of dispensed line 3 items | 38-41 |
| 14 | Running count of dispensed line | 42-45 |

-continued

| Line No. | Stored Data Relates To | Memory Locations in RAM block 88 |
|---|---|---|
| | 4 items | |
| 15 | Running total of accepted dollars | 46-49 |
| 16 | Running total of accepted quarters | 50-53 |
| 17 | Running total of accepted dimes | 54-57 |
| 18 | Running total of accepted nickels | 58-61 |

Each memory location in RAM block 88 has the capability of storing four bits of data. Because the data related to each of lines 1-6 requires eight bits, two RAM memory locations are used for the data corresponding to each of those lines, all as shown by the foregoing chart. The data for each of lines 7-18 requires sixteen bits, and hence four RAM memory locations are used for the data corresponding to each of those lines, all as shown by the foregoing chart.

If a line number has data which requires just two memory locations in the RAM block 88, as is the case with each of line numbers 1-6, and if that data is to be read, the data is the lower-number memory location will be read into accumulator A and then transferred into a scratchpad register. Thereafter, the data in the higher-number memory location will be read into that accumulator, shifted and combined with the data in the scratchpad register to provide an eight bit word. Conversely, when data for a line number which has two memory locations in RAM block 88 is to be written into those memory locations, the data for the lower-number memory location will be written in that memory location, and thereafter the data for the higher-number location will be written in that memory location.

If a line number has data which requires four memory locations in the RAM block 88, as is the case with each of line numbers 7-18, and if that data is to be read, the data in the lowest-number memory location for that line number will be read into accumulator A and then transferred into a scratchpad register. Thereafter the data in the second-lowest number memory location for that line number will be read into that accumulator, shifted and then combined with the data in the scratchpad register to provide an eight bit word. Thereupon, the data corresponding to the second-highest number memory location for that line number will be read into accumulator A and then transferred into a further scratchpad register. Thereafter, the data in the highest-number memory location for that line number will be read into that accumulator, shifted and then combined with the shifted data in the further scratchpad register to form a second eight bit word.

When data for a line number which has four memory locations in RAM block 88 is to be written into those memory locations, the data for the lowest-number memory location for that line number will be written in that memory location, and the data for the second-lowest number memory location for that line number will be written in that memory location. Thereafter, the data for the second-highest number memory location for that line number will be written in that memory location, and then the data for the highest-number memory location for that line number will be written into that memory location.

Referring particularly to FIG. 17, the numeral 542 denotes a resistor which has one terminal thereof connected to the source of unregulated voltage. The other terminal of that resistor is connected to ground by a Zener diode 544, a diode 546, and a resistor 548. A diode 543 is connected in parallel with the resistor 542; and a grounded capacitor 545 is connected to the right-hand terminals of the diode 543 and resistor 542. The upper terminal of resistor 548 is connected to the base of an NPN transistor 550, which has the collector thereof connected to the regulated plus five volts and which has its emitter connected to ground by a serially-connected diode 551 and resistor 552. A junction 553 between the diode 551 and resistor 552 is connected to the input of a buffer amplifier 554 and to conductor 73. The output of buffer amplifier 554 is connected to a conductor 71 and also to the input of an inverter 556. The output of that inverter is connected to conductor 69. In the normal operation of the control device, the unregulated voltage will charge the capacitor 545 to cause Zener diode 544, diode 546 and resistor 548 to cause transistor 550 to be conductive. As a result, the voltage at the junction 553 normally will have a logic state of "1"; thereby making the normal logic states of conductors 71 and 73 "1" and the normal logic state of conductor 69 "0".

In the event the power fails or is cut off, the unregulated voltage will start to decrease. At an unregulated voltage level, which is less than the unregulated voltage level at which the logic state of conductor 45 of FIG. 16 changed from "1" to "0", the voltage at the base of transistor 550 will decrease sufficiently to render that transistor non-conductive. At this time, the plus five volts will not yet have started to decrease; and hence, as the logic states of conductors 71 and 73 become "0", the logic state of conductor 69 will become a "1". However, if the plus five volts progressively decreases, the logic state of conductor 69 also will be "0". At that time, the logic states of conductors 40, 43 and 45 of FIG. 16 also will be "0".

At the instant when power is subsequently restored, no change in the logic state of any of conductors 40, 43, 45, 69, 71 and 73 of FIGS. 16 and 17 will occur. However, as the regulated voltage rises to its normal value of five volts, the input of inverter 532 in FIG. 16 will see a logic "1", because transistor 528 will momentarily remain non-conductive. Consequently, that inverter will maintain a logic "0" on conductor 45, at the left hand input of NAND gate 540, and at the upper input of capacitor 538. Thereupon, that NAND gate will provide a "1" on conductor 43. Even though the regulated voltage rises to its normal value of five volts, the transistor 550 in FIG. 17 will remain non-conductive until the unregulated voltage rises sufficiently to render that transistor conductive; and hence the logic states of conductors 71 and 73 will continue to be "0", but inverter 556 will provide a "1" on conductor 69. The register 502 in FIG. 15 will respond to the "1" which conductor 69 applies to input 15 thereof to make certain that "0"s appear at its outputs 3 and 4. The inverters 518 and 516 will respond to those "0"s to apply "1"s to conductors 514 and 512, respectively; and the RAM block 88 will respond to those "1"s" to operate only in the "read only" mode. The "0" on conductor 71 will keep the Microprocessor 22 essentially inactive. All of this means that a failure or removal of power will be unable to effect an accidental and undesired change in any data in RAM block 88.

As the unregulated voltage continues to rise, it will reach a level at which transistor 550 will again become conductive; and, thereupon, the logic states of conductors 69, 71 and 73 will become "0", "1" and "1", respectively. At this time, the Microprocessor 22 will again become responsive to the program from the ROM. As that unregulated voltage increases toward its normal value, the transistor 528 will become conductive. Thereupon, the input of inverter 532 will "see" a "0", and that inverter will cause a "1" to appear on conductor 45 and will start to charge capacitor 538. After a short delay, due to the time constant of the RC network constituted by resistor 536 and capacitor 538, the NAND gate 540 will provide an output which is controlled by the logic state of conductor 40. As the logic state of conductor 69 became a "1", the RAM block 88 no longer needed to be kept in the "read only" mode. Consequently, the subsequent removal of the logic "1" interrupts which the loss of power caused to appear on conductor 43, could not effect an accidental and undesired change in any data in RAM block 88. That logic "1" interrupt would be removed as soon as a logic "1" appeared on conductor 40 and inverter 532 applied a "1" to the left-hand input of NAND gate 540, as transistor 528 became conductive.

Figures 2, 3, 4, 5:
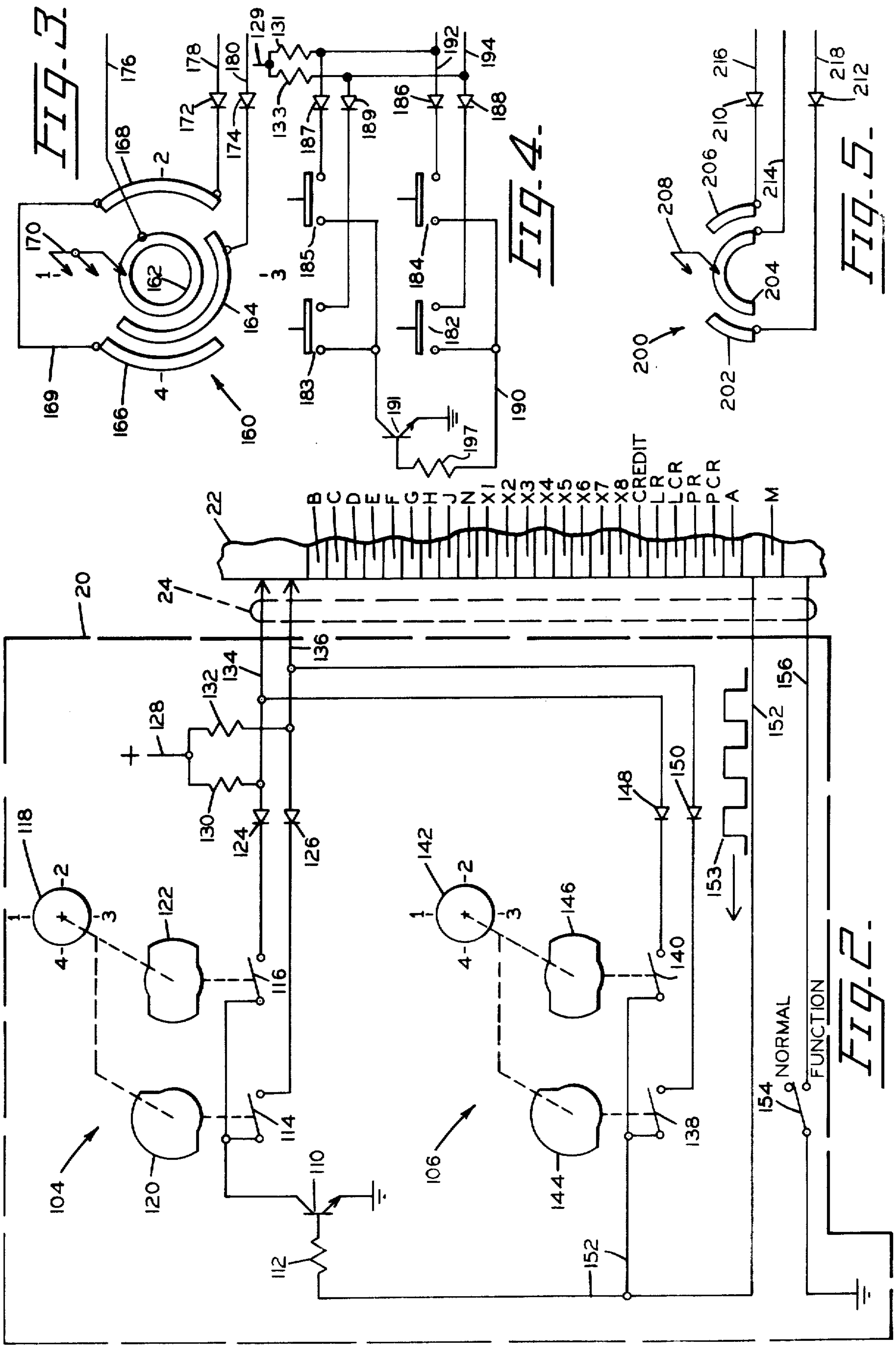
FIG. 2 is a schematic diagram of one preferred arrangement of components for the Mode, Line, And Price Control block of FIG. 1 when the Control Device of FIG. 1 operates as shown by the flow chart of FIGS. 18A–18E.
FIG. 3 is a diagrammatic view of a switch that can be substituted for either of the switches of FIG. 2.
FIG. 4 is a diagrammatic view of two groups of two swtiches which can be used as the components for the Mode, Line, And Price Control block of FIG. 1 when the Control Device of FIG. 1 operates as shown by the flow chart of FIGS. 19A–19E.
FIG. 5 is a diagrammatic view of a switch that can be substituted for either of the groups of switches of FIG. 4.

Whenever a switch 154 of FIG. 2 is in its "Normal" open position, the control device will respond to the insertion of money and to the actuation of the switches in the Vendor Selection block 26 to cause the vending machine to dispense desired products or services. Also, where appropriate, that control device will cause the Change Payout block 84 to effect the dispensing of change. In doing so, that control device will be operating in a manner which is very similar to the manner in which the 1974 Motorola price-setting control device operated; and hence it is not believed to be necessary to describe the credit-accumulating, product-dispensing or change-making operations of the control device of the present invention in detail. However, it should be noted that the control device of the present invention temporarily stores the numbers of each denomination of money which is inserted by a patron to effect the dispensing of a desired product or service and then, after that product or service has been dispensed, adds those numbers to running counts in RAM block 88.

Specifically, as each denomination of money is inserted, the Coin Value Registering block 38 will provide a logic "0" on conductor 40; and NAND gate 540 of FIG. 16 will respond to that "0" to develop a logic "1" interrupt on conductor 43. The Microprocessor 22 will recognize that such interrupt was due to the insertion of money, and not due to a loss of power, because line 45 will continue to have a logic "1" thereon. As a result, that Microprocessor will cause the program to start executing its money-registering sub-routine--regardless of what routine or sub-routine it was executing when that interrupt was developed. During that money-registering sub-routine, the signal which the Microprocessor 22 receives from the Coin Value Registering block 38 via conductor 312, as a nickel momentarily actuates switch 282 of that block, will cause the program to effect the incrementing of the number in scratchpad register X8, which temporarily stores the numbers of nickels inserted in any money-registering operation. Similarly, the signal which the Microprocessor 22 receives from the Coin Value Registering block 38 via conductor 310, as a dime momentarily actuates switch 284 of that block, will cause the program to effect the incrementing of the number in scratchpad register X7, which temporarily stores the number of dimes inserted in any money-registering operation. Also, the signal which the Microprocessor 22 receives from the Coin Value Registering block 38 via conductor 308, as a quarter momentarily actuates switch 286 of that block, will cause the program to effect the incrementing of the number of scratchpad register X6, which temporarily stores the numbers of quarters inserted in any money-registering operation. Further the signal which the Microprocessor 22 receives from the Coin Value Registering block 38 via conductor 306, as a dollar momentarily actuates switch 288 of that block, will cause the program to effect the incrementing of the number in scratchpad register X5, which temporarily stores the numbers of dollars inserted in any money-registering operation. After the desired product or service has been dispensed, the program will cause the numbers in registers X8, X7, X6 and X5 to be added to the running counts in corresponding memory locations in RAM block 88. In this way, the control device provides a permanent record of the total number of accepted nickels, dimes, quarters and dollars.

Referring particularly to FIG. 2, the numeral 104 generally denotes a manually-operable switch, the numeral 106 generally denotes a further manually-operable switch, and the numeral 110 denotes an NPN transistor. The emitter of that transistor is grounded, and the collector of that transistor is connected to movable contacts 114 and 116 of switch 104. A conductor 152 and a resistor 112 connect the Microprocessor 22 to the base of that transistor. Conductor 152 also is connected to movable contacts 138 and 140 of switch 106.

A long-dwell cam 120 is associated with movable contact 114 of switch 104, and a two-dwell cam 122 is associated with movable contact 116 of that switch. A knob 118 is selectively actuatable, in the clockwise or counter clockwise direction, to simultaneously move the cams 120 and 122; and that knob can be set in any one of four detent-held positions, namely, positions 1, 2, 3 and 4. In position 1, both contacts 114 and 116 are open, but in position 2, contacts 114 are open and contacts 116 are closed. In position 3, contacts 114 are closed and contacts 116 are open; but in position 4, contacts 114 and 116 are closed. A conductor 128, a resistor 130, and a diode 124 connect the positive terminal of the regulated voltage source to stationary contact 116; and that conductor, a resistor 132 and a diode 126 connect that positive terminal to the stationary contact 114.

A long-dwell cam 144 is associated with movable contact 138 of switch 106, and a two-dwell cam 146 is associated with movable contact 140. A knob 142 is selectively actuatable, in the clockwise or counter clockwise direction, to simultaneously move the cams 144 and 146; and that knob can be set in any one of four detent-held positions, namely positions 1, 2, 3 and 4. In position 1, both contacts 138 and 140 are open, but in position 2, contacts 138 are open and contacts 140 are closed. In position 3, contacts 138 are closed and contacts 140 are open, and in position 4, both contacts 138 and 140 are closed. Conductor 128, resistor 130 and a diode 148 connect the positive terminal of the voltage source to stationary contact 140; and that conductor, resistor 132 and a diode 150 connect the positive terminal of the voltage source to stationary contact 138. A conductor 134 connects a terminal of Microprocessor 22 to the anodes of diodes 124 and 148; and a conductor 136 connects a further terminal of that Microprocessor to the anodes of diodes 126 and 150.

The Microprocessor 22 supplies a waveform 153 on conductor 152 that alternately provides short duration positive voltage signals and zero voltage signals, which serve as logic "1's" and "0's" on that conductor. Those positive voltage signals will forward bias transistor 110; and will, whenever contacts 114 and 116 are closed, cause that transistor to forward bias diodes 124 and 126. Those zero voltage signals will, whenever contacts 138 and 140 are closed, forward bias diodes 148 and 150.

The switch 154 is a manually-operated mode switch which has the movable contact thereof grounded; and the stationary contact of that switch is connected to Microprocessor 22 by a conductor 156. The conductors 134, 136, 152 and 156 are parts of cable 24 of FIG. 1.

Referring particularly to FIG. 3, the numeral 160 generally denotes a switch that can be substituted for either of the switches 104 or 106 of FIG. 2. That switch has a ring contact 162, an arc-segment contact 164, a second arc-segment contact 166, a third arc-segment contact 168, a movable contact 170 with three brushes, and a jumper 169 which interconnects arc-segment contacts 166 and 168. A diode 172 has the cathode thereof connected to arc-segment contact 168, and a diode 174 has the cathode thereof connected to arc-segment contact 164. A conductor 176 is connected to ring contact 162, a conductor 178 is connected to the anode of diode 172, and a conductor 180 is connected to the anode of diode 174. A knob, not shown, can actuate the movable contact 170 into any one of four detent-held positions, namely, positions 1, 2, 3 and 4.

The switch 160 can be substituted for the switch 104 of FIG. 2 by disconnecting the collector of transistor 110 from the movable contacts 114 and 116 of switch 104 and connecting it to conductor 176, by disconnecting the anode of diode 124 from resistor 130 and conductor 134 and by connecting conductor 178 to that resistor and to that conductor, and by disconnecting the anode of diode 126 from resistor 132 and conductor 136 and by connecting conductor 180 to that resistor and to that conductor. The switch 160 also can be substituted for switch 106 of FIG. 2 by disconnecting the movable contacts 138 and 140 from conductor 152 and by connecting that conductor to conductor 176, by disconnecting the anode of diode 148 from resistor 130 and conductor 134 and by connecting conductor 178 to that resistor and conductor, and by disconnecting the anode of diode 150 from resistor 132 and conductor 136 and by connecting conductor 180 to that resistor and conductor.

Referring particularly to FIG. 4, the numerals 182 and 184 denote two push button switches that are operable individually; and the numerals 183 and 185 denote two further push button switches that are operable individually. A conductor 190 is connected to the left-hand stationary contacts of both of push button switches 182 and 184; and an NPN transistor 191 has the collector thereof connected to the left-hand stationary contacts of both of push button switches 183 and 185. A resistor 197 connects the base of that transistor to conductor 190; and the emitter of that transistor is grounded. A diode 186 has the cathode thereof connected to the right-hand stationary contact of push button switch 184, and a diode 188 has the cathode thereof connected to the right-hand stationary contact of push button switch 182. A diode 187 has the cathode thereof connected to the right-hand stationary contact of push button switch 185 and a diode 189 has the cathode thereof connected to the right-hand stationary contact of push button switch 183. A conductor 192 is connected to the anodes of diodes 186 and 187, and a conductor 194 is connected to the anodes of diodes 188 and 189. A conductor 129 and a resistor 131 connect the positive terminal of the regulated voltage source to conductor 192; and conductor 129 and a resistor 133 connect the positive terminal of the regulated voltage source to conductor 194.

The switches 182–185, and conductors 129, 190, 192 and 194, the diodes 186–189, the resistors 131, 133 and 197, and transistor 191 of FIG. 4 could, respectively, be substituted for the conductors 128, 152, 134 and 136, the diodes 148, 124, 150 and 126, the resistors 130, 132 and 112, and transistor 110 of FIG. 2 if the flow chart of FIGS. 19A–E is substituted for the flow chart of FIGS. 18A–E. The conductors 192 and 194 would be connected to those terminals of Microprocessor 22 to which the conductors 134 and 136 are connected in FIG. 2, and conductor 190 would be connected to that terminal of that Microprocessor to which conductor 152 is connected in FIG. 2.

Referring particularly to FIG. 5, the numeral 200 generally denotes a switch that could be substituted for the push button switches 182 and 184 or the push button switches 183 and 185 of FIG. 4. That switch includes three arcuate contacts 202, 204 and 206 and a movable contact 208 with two brushes. A diode 210 has the cathode thereof connected to the contact 206, a diode 212 has the cathode thereof connected to the contact 202, and conductors 214, 216 and 218 are connected, respectively, to contact 204, the anode of diode 210, and the anode of diode 212.

To substitute the switch 200 for the push button switches 183 and 185 of FIG. 4, the collector of transistor 197 should be disconnected from the left-hand stationary contacts of switches 183 and 185 and connected to conductor 214, the anode of diode 187 should be disconnected from resistor 131 and conductor 192 and conductor 216 should be connected to that resistor and conductor, and the anode of diode 189 should be disconnected from resistor 133 and conductor 194 and conductor 218 should be connected to that resistor and conductor. To substitute the switch 200 for the push button switches 182 and 184 of FIG. 4, the conductor 190 should be disconnected from the left-hand stationary contacts of switches 182 and 184 and connected to conductor 214, and the anode of diode 186 should be disconnected from resistor 131 and conductor 192 and conductor 216 should be connected to that resistor and conductor, and the anode of diode 188 should be disconnected from resistor 133 and conductor 194 and conductor 218 should be connected to that resistor and conductor.

Procedure For Setting Prices

Figure 10:
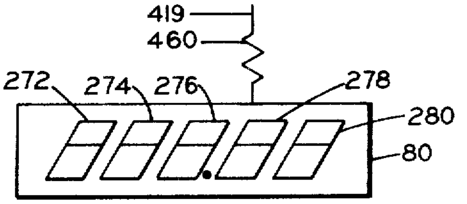
FIG. 10 is a view showing a display which can be used as the Display block of FIG. 1.

Whenever the operator of a vending machine, that is equipped with the control device of the present invention, wishes to check or change the price of one or more of the products offered by that vending machine, he will shift the movable contact of switch 154 of FIG. 2 from its "Normal" open position to its "Function" closed position. In the flow chart of FIGS. 18A–18E, the numeral 902 represents the step of determining whether switch 154 of FIG. 2 is in its "Function" or "Normal" position. If the program, which is permanently stored in the ROM, and a copy of which is attached hereto and made a part hereof, determines that switch 154 is in its "Function" position, Microprocessor 22 will respond to the ground level signal on conductor 156 of FIG. 2 to initiate a sequence of operations. During that sequence of operations, the program will (a) cause the line register to be set to zero, as indicated by block 904, (b) cause the line control register to be set to have the eight-bit word 00000100 therein, as indicated by block 906, (c) cause the price control register to be set to have the eight-bit word 00000100 therein, as shown by block 908, and (d) set the Display 80 to cause the readouts 272 and 274 of FIG. 10 to display 0's and to cause the decimal point and the readouts 276, 278 and 280 to be dark, as indicated by block 910. The program then will cause (1) a positive voltage to appear on conductor 152, as indicated by block 912, (2) the logic values on conductors 134 and 136 of FIG. 2 to be read into accumulator A as the eight-bit code word 00XX0000, as indicated by block 914, and (3) the value in accumulator A to be stored in register B, as indicated by block 916. Each of the X's in that eight-bit code word can be a logic "0" or "1", as determined by the setting of the knob 118 of switch 104 of FIG. 2. The program will cause a comparison to be made between the code word in accumulator A and the previously-set eight bit word in the line control register, as indicated by block 918. The hereinbefore-described eight-bit words that were set in the line control register and in the price control register are intended to be, and are, unique words. Although other unique words could be used, the eight-bit words 00000100 have been found to be useful. Because a unique word was set in the line control register, the hereinbefore described comparison between that unique word and the code word in accumulator A will, regardless of the logic values on conductors 134 and 136, produce a unique comparison word which will result in the program causing the code word in register B to be stored in that line control register, as indicated by block 920. As pointed out hereinbefore, that code word is 00XX0000.

At this time, the program will again proceed through the steps indicated by blocks 912, 914 and 916; but it should be noted that a further code word was read into accumulator A in the repreated step 914. As a result, the next comparison made during the step represented by block 918 will be between the original code word in the line control register and the further code word in accumulator A. The resulting comparison word produced during step 918 will be 00000000, because no change occurred in the logic states on conductors 134 and 136; and hence the original and further code words are the same. That all-zero comparison word will result in the program causing the voltage on conductor 152 to drop to zero, as indicated by block 922 and as shown by the left-hand portion of waveform 153 in FIG. 2. The program then will cause the logic values on conductors 134 and 136 to be read into accumulator A as a still further code word, as indicated by block 924. Thereupon, the program will cause that still further code word to be stored in register C, as indicated by block 926. Further, the program will cause a comparison to be made between the still further code word in accumulator A and the initially-set unique eight-bit word in the price control register as indicated by block 928. Because a unique word was set in the price control register, the hereinbefore described comparison between that unique word and the code word in accumulator A will, regardless of the logic values on conductors 134 and 136, produce a unique comparison word which will result in the program causing the code word in register C to be stored in that price control register, as indicated by block 930. As pointed out hereinbefore, that code word is 00XX0000.

At this time, the program will again proceed through the steps indicated by blocks 912, 914, 916, 918, 922, 924 and 926; but it should be noted that yet another code word was read into accumulator A in the repeated step 924. As a result, the next comparison made during the step represented by block 928 will be between the still further code word in the Price Control register and the yet another code word in accumulator A. The resulting comparison word produced during step 928 will be 00000000, because no change occurred in the logic states on conductors 134 and 136; and hence the still further code word and the yet another code word are the same. That all-zero comparison word will result in the program determining whether any of the selection switches 222, 224, 226 and 228 of FIG. 8 has been actuated, as indicated by block 932.

If it is assumed that all of those selection switches are in the un-actuated positions shown by FIG. 8, the program will determine whether the switch 154 still is in its "Function" position, as shown by block 934. Thereupon, if that switch is in that position, the program will then cause the steps 912, 914, 916, 918, 922, 924, 926, 928, 932 and 934 to be repeated endlessly until the operator either actuates one of the selection switches 222, 224, 226 and 228 of FIG. 8, actuates the knob 118 of FIG. 2, actuates the knob 142 of FIG. 2, or shifts switch 154 to its "Normal" position.

It should be noted that during the first subcycle which the program performs after the switch 154 of FIG. 2 is shifted from its "Normal" to its "Function" position, the step 906 will set the unique eight-bit word 00000100 in the line control register, and the step 908 will set that same unique eight-bit word in the price control register. Those two steps will not be parts of any subsequent cycles of FIGS. 18A–18E which occur while switch 154 is in its "Function" position; and those subsequent sub-routines will not include any steps which will set that unique eight-bit word in either of those registers. Instead, the eight-bit words which will be set in the line control register, during those subsequent sub-routines, will be the eight-bit words which step 942 senses in register B and then stores in that line control register. Similarly, the eight-bit words which will be set in the price control register, during those subsequent sub-routines, will be the eight-bit words which step 966 senses in register C and then stores in that price control register.

Figures 18, 18C:
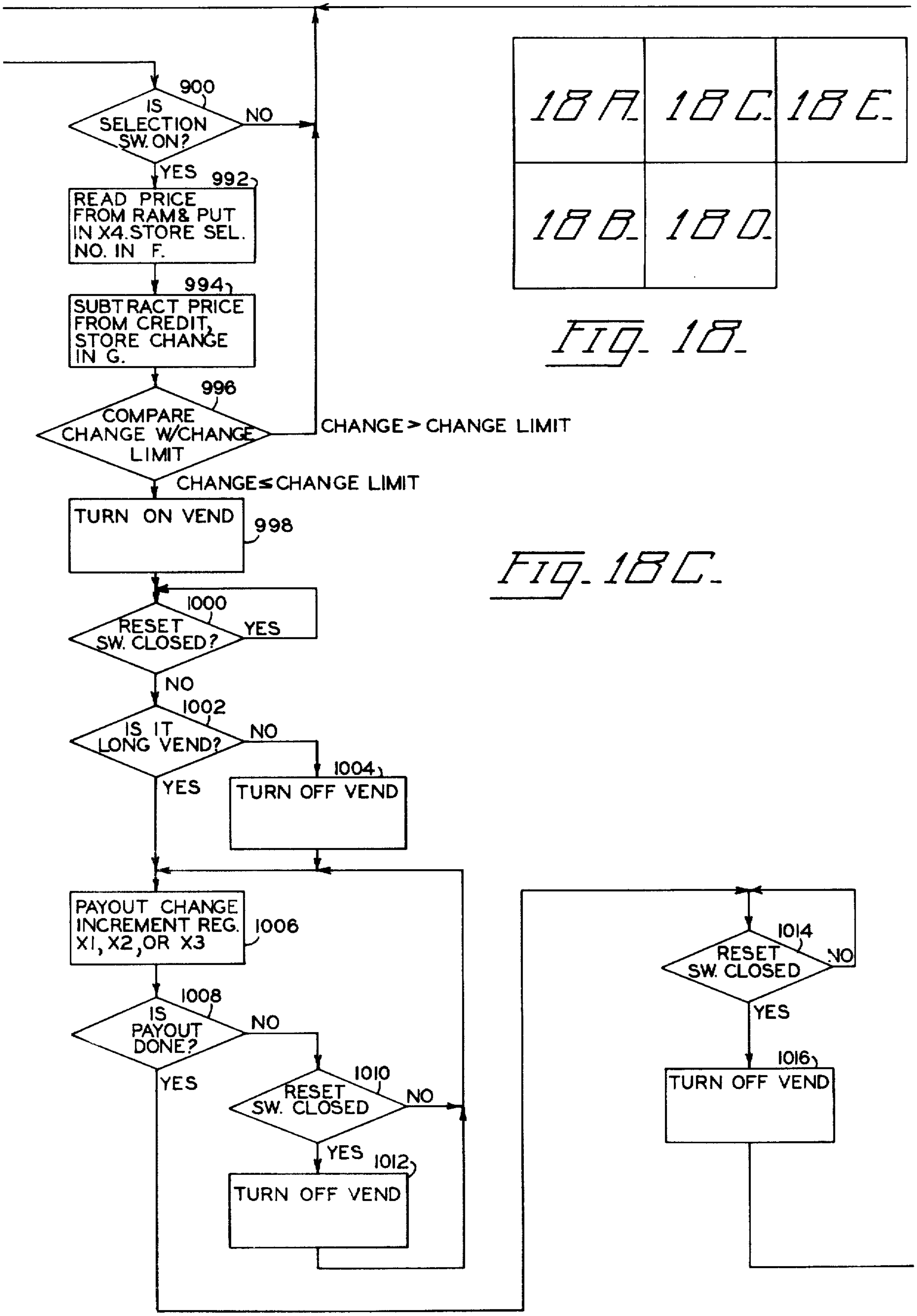
FIG. 18 shows the orientation of FIGS. 18A through 18E, FIGS. 18A through 18E constitute a flow chart of the operation of the control device of FIG. 1 when it is equipped with the switches of FIGS. 2.
Figure 18A:
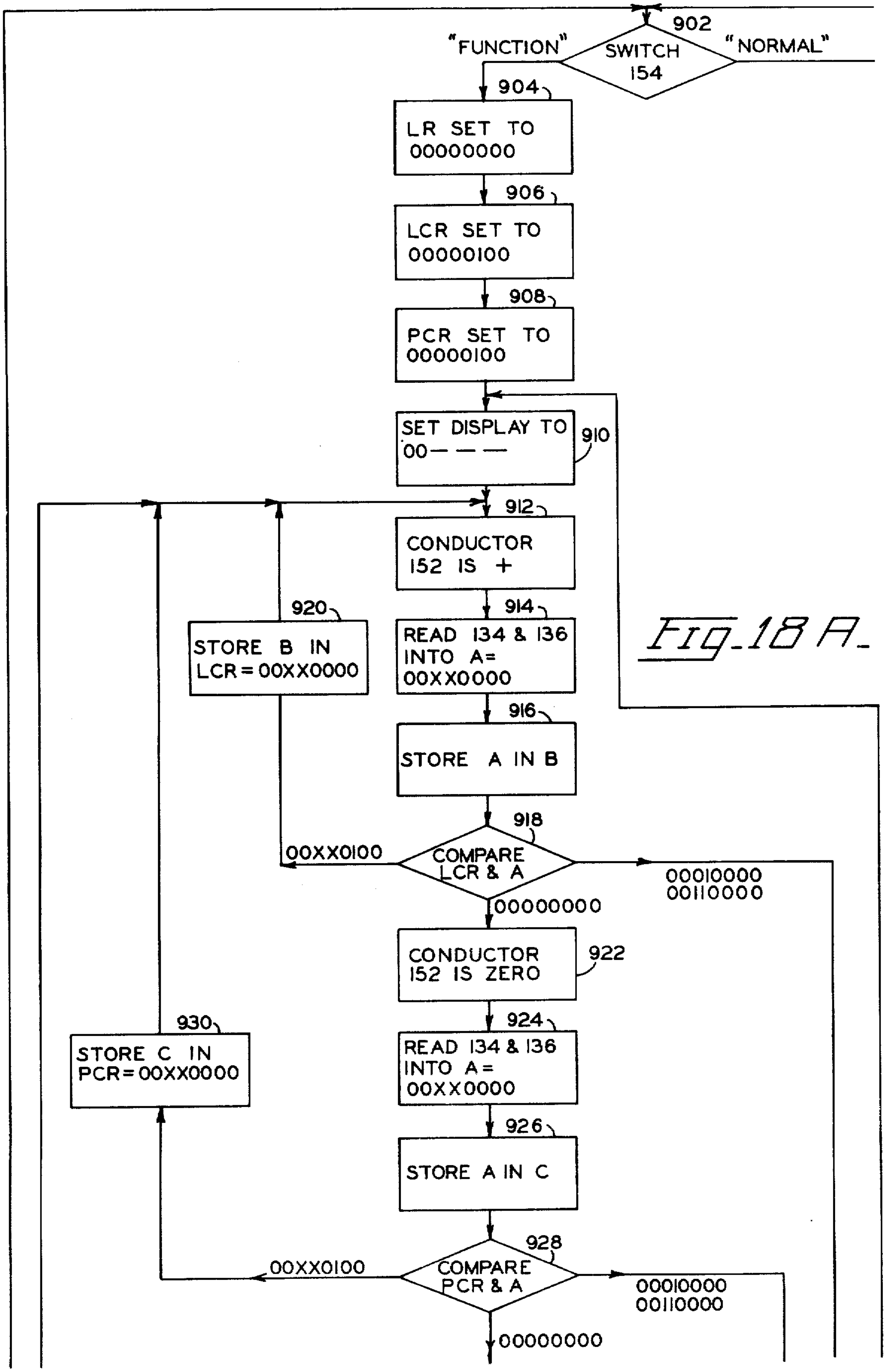
Figure 18B:
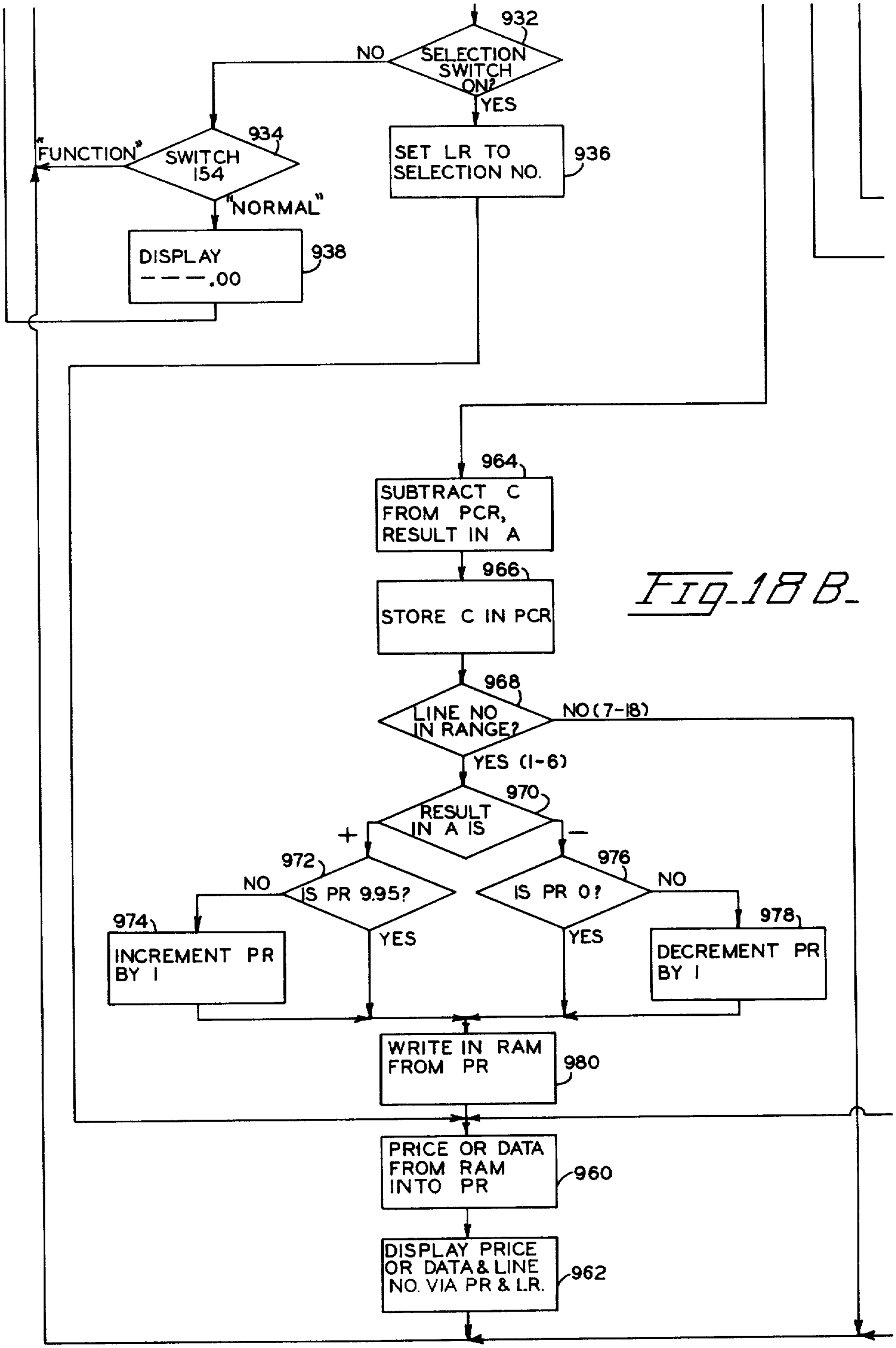
Figure 18D:
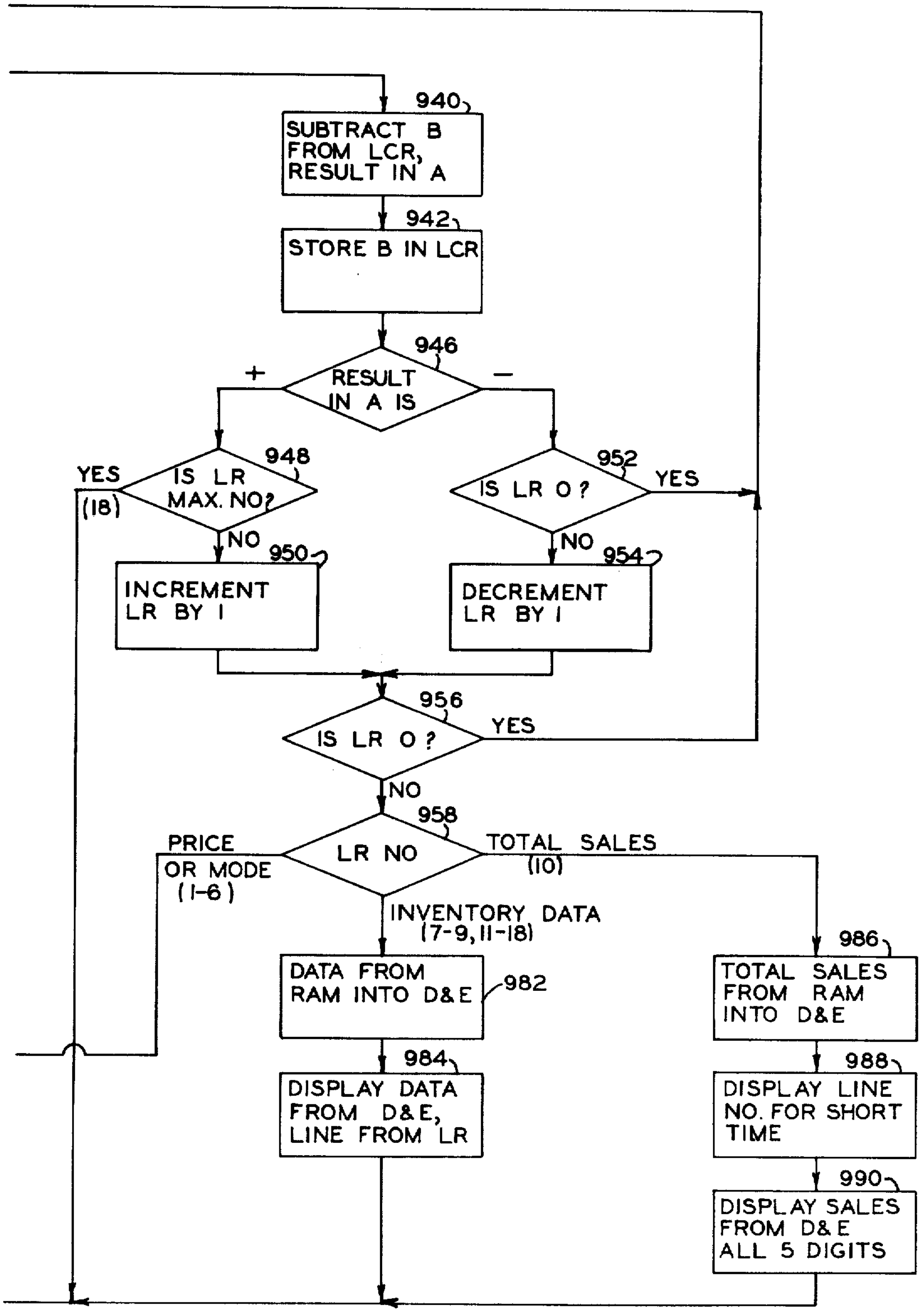

If it is assumed that the knob 118 of FIG. 2 is actuated by the operator, the comparison represented by block 918 of the next-succeeding cycle will produce one of the two eight-bit comparison words shown in FIG. 18A. Specifically, if that knob was actuated in the clockwise direction from position 1 to position 2 in FIG. 2, the resulting comparison word would be 00010000. If that knob was actuated in the clockwise direction from position 2 to position 3 in FIG. 2, the resulting comparison word would be 00110000. If that knob was actuated in the clockwise direction from position 3 to position 4 in FIG. 2 the resulting comparison word again would be 00010000, if that knob was actuated in the clockwise direction from position 4 to position 1 the resulting comparison word again would be 00110000, and if that knob was actuated in the clockwise direction from position 1 to position 2 the resulting comparison word would once again be 00010000. If the knob 118 were initially in position 1 and were actuated in the counterclockwise direction to position 4, the resulting comparison word would be 00110000, if that knob was actuated in the counterclockwise direction from position 4 to position 3 the resulting comparison word would be 00010000, if that knob was actuated in the counterclockwise direction from position 3 to position 2 the resulting comparison word again would be 00110000, if that knob was actuated in the counterclockwise direction from position 2 to position 1 the resulting comparison word again would be 00010000, and if that knob was actuated in the counterclockwise direction from position 1 to position 4 the resulting comparison word would once again be 00110000. This means that as the knob 118 is successively actuated in a given direction, step 918 will produce one or the other of two specifically-different resulting comparison words. The purpose of producing two different resulting comparison words is to enable Microprocessor 22 to recognize that a change has been made in the setting of the knob 118 of switch 104.

It should be noted that whether the resulting comparison word was 00010000 or 00110000, the program would respond to that word to subtract the code word in register B from the immediately-preceding code word in the line control register and to store the consequent result word in accumulator A, as indicated by the block 940. Also, it should be noted that whenever the knob 118 is actuated to a given position the code word in register B will be the code word corresponding to that position and will be wholly independent of the direction through which that knob was actuated to reach that given position and will not represent any specific line number. However, it must be noted that the immediately-preceding code word in the line control register will represent the code of the immediately-preceding position of that knob, and hence that code word, and also the result word produced by step 940, will be a function of the direction through which that knob was actuated to reach that given position. Specifically, as knob 118 is successively actuated in the clockwise direction from position 1 to and through each of positions 2, 3 and 4, the result words produced by step 940 will be:

| Knob Position | Result Word |
|---|---|
| 1 to 2 | 00010000 |
| 2 to 3 | 00010000 |
| 3 to 4 | 00010000 |
| 4 to 1 | 11010000 |

On the other hand, as knob 118 is successively actuated in the counter clockwise direction from position 1 to and through each of positions 4, 3 and 2, the result words produced by step 940 will be:

| Knob Position | Result Word |
|---|---|
| 1 to 4 | 00110000 |
| 4 to 3 | 11110000 |
| 3 to 2 | 11110000 |
| 2 to 1 | 11110000 |

After the result word developed by step 940 is stored in accumulator A, the program will cause the code word in register B to be stored in the line control register, as indicated by block 942.

When the result word produced by step 940 has a zero in the third position from the left, Microprocessor 22 will treat that word as though it represented a positive value. Conversely, when the result word produced by step 940 has a one in that third position, that Microprocessor will treat that word as though it represented a negative value. The Microprocessor 22 will, after the code word in register B has been stored in the line control register as indicated hereinabove, determine whether the result word produced by step 940 has a positive value or a negative value, as indicated by step 946.

If it is assumed that the result word is a positive value, the program will, as indicated by block 948, determine whether the line number in the line register is 18. The maximum line number in the embodiment described herein is 18; and, if it is assumed that the line number in the line register is 18, the program will determine that fact in step 948, and then will re-initiate the sequence of operations including steps 912, 914, 916, 918, 922, 924, 926, 928, 932 and 934. It will be noted that steps 922, 924, 926, 928, 932 and 934, rather than steps 940, 942, 946 and 948, were included in that sequence; but that is the case because the comparison word from step 918 was all zeros—due to the fact that no change occurred in the setting of knob 118 of switch 104.

If, however, the line number in the line register is less than 18, then the step indicated by block 948 would produce a "no" answer; and the program would respond to that answer to cause the line number in the line register to be incremented by 1, as indicated by block 950. Thereafter, the program will determine whether the incremented line number in the line register is zero or greater. Since the line number has just been incremented by 1, it will, of course, be greater than zero; and hence the determination in step 956 will produce a "no" answer.

At this time, the program will again sense the value of the incremented line number in the line register, as indicated by block 958. If that incremented line number is any one of 1 through 6, the program will cause the price or mode-controlling data in the corresponding location in the RAM block 88 to be loaded into the price register, as indicated by block 960. Further, the program will cause the line number from the line register and the price or mode-controlling data from the price register to be displayed by the Display 80, as indicated by block 962. The line numbers will be displayed by the readout display 274, the readout 272 will be dark, and the price or mode-controlling data will be displayed by a decimal point and two or more of the readouts 276, 278, 280. Line numbers 1-4 correspond to locations in RAM block 88 where prices are stored and line numbers 5 and 6 correspond to locations in that RAM block where mode-controlling data is stored. The program will cause the Display 80 to remain unchanged until one of the hereinbefore-described switch actuations takes place.

In the immediately-preceding portion of the description, it was assumed that in step 958 the line number in the line register was any one of 1 through 6. However, if that line number had been 10, the program would, as indicated by block 986, have caused the data in RAM block 88, which corresponds to the total sales, to be loaded into the registers D and E. Thereupon, as indicated by block 988, the program would have caused the readouts 272 and 274 to display the line number 10 for a short period of time, as for example two seconds. At the end of that short period of time, the program would, as indicated by block 990, have caused the value of the total sales from registers D and E to be displayed in decimal form by the decimal point and the required numbers of the readouts 272, 274, 276, 278 and 280. Only those readouts representing significant digits of the total sales would be illuminated. The display developed as a result of step 990 would remain until one of the hereinbefore-described switch actuations takes place.

If step 958 had indicated that the line number in the line register was any one of 7–9 or 11–18, the program would, as indicated by step 982, have loaded the data from the location in RAM block 88 corresponding to that line number into registers D and E. Further, as indicated by step 984, the program would have caused the Display 80 to simultaneously display the line number and the data corresponding to that line numbber. That display would remain unchanged until one of the hereinbefore-described switch actuations takes place.

If it was assumed that the line number was 7, that line number would have been shown by the readout 274, and the data corresponding to that line would have represented the number of quarters which had been paid out as change by the change-dispensing mechanism of the vending machine. The sixteen bit number which is stored in RAM block 88, and which corresponds to line 7, will represent a running count of the number of quarters that have been dispensed during change-making operations of the control device. It should be noted that the said running count cannot be changed or reset by anyone, other than by causing the vending machine to perform a change-making operation wherein quarters are dispensed; and hence that running count is a true running total of the number of quarters that have been paid out in making change.

If the number of dispensed quarters increases to 999, and a further quarter is then dispensed as change, the numeric value of that running count in RAM block 88 will be caused to be a zero; and the Display 80 will display a zero. Specifically, the readout 272 will be dark; the readout 274 will display the line number 7, the readouts 276 and 278 will be dark, and the readout 280 will display a zero.

If the line number in the line register had been 8, the readout 274 would have indicated an 8, and the readout 272 would have been dark. The data displayed by one or more of the readouts 276, 278 and 280 would have represented a running count of the number of dimes which had been dispensed during change-making operations of the control device. As indicated hereinbefore in connection with the running count of quarters, the data in the RAM block corresponding to the running count of dimes can not be reset; and it will be appropriately displayed by one or more of the readouts 276, 278 and 280.

If the line number in the line register had been 9, that number would have been displayed by readout 274; and the data corresponding thereto in RAM block 88 would have been the number of nickels dispensed during change-making operations. As indicated hereinbefore in connection with the running counts of quarter and dimes, the running count of nickels can not be reset; and it will be appropriately displayed by one or more of the readouts 276, 278 and 280.

If the number in the line register had been 11, that number would have been displayed by the readouts 272 and 274; and the data corresponding thereto would have represented a running total of the number of products or services which had been dispensed in response to selection switch 222, which controls selection line 1. As in the case of the running counts of coins dispensed during change-making operations, the running count of dispensed products for selection line 1 is never reset; and that number is displayed by one or more of the readouts 276, 278 and 280. If the number in the line register had been 12, that number would have been displayed by the readouts 272 and 274; and the data corresponding thereto would have represented a running total of the number of products or services which had been dispensed in response to selection switch 224, which controls selection line 2. If the number in the line register had been 13, that number would have been displayed by the readouts 272 and 274; and the data corresponding thereto would have represented a running total of the number of products or services which had been dispensed in response to selection switch 226, which controls selection line 3. If the number in the line register had been 14, that number would have been displayed by the readouts 272 and 274; and the data corresponding thereto would have represented a running total of the number of products or services which had been dispensed in response to selection switch 228, which controls selection line 4.

If the number in the line register had been 15, it would have been displayed by the readouts 272 and 274, and it would have represented a running count of the number of dollars which had been accepted during vending operations. As in the case of the running counts of coins dispensed during change-making operations, the running count of accepted dollars can not be reset, and will be displayed by one or more of the readouts 276, 278 and 280. If the number in the line register had been 16, it would have been displayed by the readouts 272 and 274; and it would have represented a running count of the number of quarters which had been accepted during vending operations. As in the case of the running counts of coins dispensed during change-making operations, the running count of accepted dimes can not be reset, and will be displayed by one or more of the readouts 276, 278 and 280. If the number had been 18, it would have been displayed by the readouts 272 and 274, and it would have represented a running count of the number of nickels which had been accepted during vending operations. As in the case of the running counts of coins dispensed during change-making operations, the running count of accepted nickels can not be reset, and will be displayed by one or more of the readouts 276, 278 and 280.

If it is assumed that the knob 118 of switch 104 is actuated from position 2 back to position 1, the comparison word produced by step 918 would again be 00010000, but the subtraction step 940 would produce a result word 11110000 which would be stored in accumulator A. During step 942 the code word stored in register B would be 00110000. The result word 11110000 is treated by Microprocessor 22 as a negative value, as indicated by step 946; and the program would then, as indicated by step 952, determine whether the number in the line register is zero. If that number is zero, and hence can not be decremented, the program will repeat the cycle of steps 910, 912, 914, 916, 918, 922, 924, 926, 928 932 and 934 to 912. That cycle of steps will be followed rather than the cycle of steps 910, 912, 914, 916, 918, 940, 942, 946 and 952, because the knob 118 of switch 104 had not been actuated; and hence the comparison step 918 would have produced a comparison word consisting of zeros. If the number in the line register had been greater than zero, the 952 step would have produced a "no" answer; and then the number in that line register would have been decremented by 1, as indicated by block 954.

If the decremented line number had been zero, the 956 step would have produced a "yes"; and then the program would have repeated the steps 910, 912, 914, 916, 918, 922, 924, 926,928,932 and 934 back to 912, as previously indicated. On the other hand, if the decremented line number had been one or greater, the 956 step would have produced a "no", which then would have led to the displaying of the appropriate line number and the appropriate price or data in the manner described hereinbefore when the number obtained as a result of steps 940, 942 and 946 produced a number which was regarded by the Microprocessor 22 as a positive value.

It will be noted that when a "yes" was obtained as a result of step 952, the program repeated the steps 910, 912, 914, 916, 918, 922, 924, 926, 928, 932 and 934 back to 912. Actually, the program could have been written so that "yes" would merely have caused a repeating of the steps 912, 914, 916, 918, 922, 924, 926, 928, 932 and 934. However, the "yes" which is obtained as a result of step 956 must cause the program to repeat step 910 as well as steps 912, 914, 916, 918, 922, 924, 926, 928, 932 and 934; and it was easier to write the program so that both "yes's", obtained as a result of steps 952 and 956, call for the repeating of step 910 as well as of steps 912, 914, 916, 918, 922, 924, 926, 928, 932 and 934.

As soon as the operator of the control device has selected a desired line number, he will be able to see the particular price or data corresponding to that line. If he has selected any one of lines 1 through 4, he can change the price corresponding to any one of those lines. If he has selected either 5 or 6; he can change the mode-controlling data corresponding to either of those lines.

If it is assumed that the knob 142 of FIG. 2 is actuated by the operator, the next comparison represented by block 928 will produce one of the two eight-bit comparison words shown in FIG. 18A. Consecutive actuations of that knob in the same direction will cause step 928 to alternately provide the resulting comparison words 00010000 and 00110000, just as successive actuations of knob 118 in the same directiion caused step 918 to alternately provide those same resulting comparison words, all as pointed out hereinbefore. Those two resulting comparison words enable Microprocessor 22 to recognize that a change has been made in the setting of the knob 142 of switch 106.

Whether the resulting comparison word was 00010000 or 00110000, the program would respond to that word to subtract the code word in register C from the immediately-preceding code word in the price control register and to store the consequent result word in accumulator A, as indicated by the block 964. Also, it should be noted that whenever the knob 142 is actuated to a given position, the code word in register C will be the code word corresponding to that position and will be wholly independent of the direction through which that knob was actuated to reach that given position, and will not represent any specific line number. However, it must be noted that the immediately preceding code word in the price control register will represent the code of the immediately preceding position of that knob, and hence that code word, and also the result word produced by step 964, will be a function of the direction through which that knob was actuated to reach that given position. Thus, the Knob Position and Result Word charts for knob 118 are equally applicable to knob 142.

After the result word developed by step 964 is stored in accumulator A, the program will cause the code word in register C to be stored in the price control register, as indicated by block 966.

If the line number previously set by switch 104 was any one of 7 through 18, step 968 would cause the program to repeat steps 912, 914, 916, 918, 922, 924, 926, 928, 932 and 934 and back to 912 until one of the hereinbefore-described switch actuations takes place. However, if the line number which was set by switch 104 was any one of 1 through 6, a "yes" would be obtained as a result of step 968.

When the result word produced by step 964 has a zero in the third position from the left, Microprocessor 22 will treat that word as though it represented a positive value. Conversely, when the result word produced by step 964 has a one in that third position, the program will treat that word as though it represented a negative value. The Microprocessor 22 will, after the code word in register C has been stored in the price control register as indicated hereinabove, determine whether the result word produced by step 964 has a positive value or a negative value, as indicated by step 970.

If it is assumed that the result word is a positive value the program will, as indicated by block 972, determine whether the value in the price register is $9.95. If that value is less than $9.95, the program will cause the number in the price register to be incremented by 1, as indicated by step 974; but if that value is $9.95, there would have been no incrementing of the number in the price register. In this way, the maximum scheduled sales price of $9.95 can not be exceeded.

Whether the value in the price register is, or is not, incremented, the program will cause the number in that price register to be written into the location in the RAM block 88 which corresponds to the scheduled line number, as indicated by step 980. The program then will cause the newly-written number in that RAM block location to be written into the price register, as indicated by step 960. Thereupon, the program will cause the Display 80 to simultaneously display the line number and also the price or the mode-controlling data corresponding thereto, as indicated by the step 962.

Step 960 is provided to make certain that any new value in the price register, due to step 974, has actually been written into the RAM block 88. Step 960 could actually be omitted; but it is useful in providing a very high degree of certainty that any such new value has actually been written into the RAM block 88. The incrementing performed by step 974 actually increases the number in the price register by one; but that one represents a predetermined monetary value—which in the case of U.S. currency is five cents.

If the subtraction step 964 has caused the result word in accumulator A to be treated by Microprocessor 22 as a negative value, as indicated by the minus sign at the right of block 970, the program would then determine whether the number in the price register was zero, as indicated by step 976. If that number was not zero, as indicated by the "no" at the right of block 976, that number would be decremented by one, as indicated by step 978. However, if the number in the price register was zero, as indicated by the "yes" below block 976, the number in the price register would not be decremented.

In either event, the program would write the number in the price register into the appropriate location in RAM block 88, as indicated by step 980 and as was described hereinbefore. Also as described hereinbefore, the price or mode-controlling data from that RAM block will be written into the price register, and then will be displayed by the Display 80, together with the corresponding line number. The prices, which can be stored in the locations in RAM block 88 which correspond to line numbers 1-4, can be set from zero to $9.95 in increments—which in the United States are five cent increments.

If the line number is 5, the data in the corresponding location in RAM block 88 will determine whether the control device provides a short vend or a long vend mode of operation for the vending machine. In the preferred embodiment of the control device, an all-zero eight-bit word in that location would cause the control device to provide the "short vend" mode of operation for the vending machine, and any other eight-bit word in that location would cause the control device to provide the "long vend" mode of operation for the vending machine. In each of those modes of operation, the control device supplies driving power to the vending machine throughout the duration of the scheduled vend time.

If the line number is 6, and if an all-zero eight-bit word is set in the location in RAM block 88 which corresponds to line 6, the control device will not impose any limit on the amount of change which the vending machine can be called upon to supply during any given product-dispensing or service-dispensing operation. At such time, the vending machine will be in the "no change limit" mode. However, if the eight-bit word in that location is set to represent any value from $0.05 through $9.95, the vending machine can not be required, during any given product-dispensing or service-dispensing operation, to dispense change exceeding that value. At that time, the vending machine will be in the "change limit" mode. If a patron were to insert so much money that the difference between the price of the product or service selected by him and the amount of inserted money was greater than the value of the eight-bit word in the RAM block 88 location corresponding to line 6, the vending machine would not respond to the actuation of the selection switch for that product or service, all as will be explained hereinafter.

As long as the switch 154 is left in its "Function" position, any one or all of lines 1-18 can be checked. Further, if desired, the prices corresponding to lines 1-4 can be changed; and, if desired, the mode-controlling data corresponding to lines 5 and 6 can be changed. However, although the data corresponding to lines 7 through 18 can be displayed and can be noted and recorded by the operator of the control device, none of the data can be changed by the operator.

In the foregoing description, it was pointed out that knob 118 of FIG. 2 could be actuated in the clockwise direction from position 1 to position 2, from position 2 to position 3, from position 3 to position 4, from position 4 to position 1, and from position 1 to position 2. Further, it was pointed out that knob 118 could be actuated in the counter clockwise direction from position 1 to position 4, from position 4 to position 3, from position 3 to position 2, from position 2 to position 1, and from position 1 to position 4. It should be noted that more or fewer clockwise actuations of that knob can be effected, and also that more or fewer counter clockwise actuations of that knob can be effected. Because the knob 118 controls the selection of the line number, because an operator usually wishes to check the price or data corresponding to each line, and because step 904 automatically sets the number of the line register to zero when switch 154 is shifted to its "Function" position, an operator will usually actuate that knob from a given position and then check or change the price or data which appears on the Display 80 before again actuating that knob.

Each time the knob 118 is actuated in the clockwise direction, from a given position to the next-adjacent position, step 950 will increment the number in the line register by 1 unless step 948 determines that the number in that line register is 18. Although an operator will usually check or change the price or data on each adjacent line, and hence will usually actuate knob 118 only once per change of line number, an operator ca actuate that knob repeatedly in the clockwise direction to increment the number in the line register up to the number 18. The operator does not need to halt or pause in his actuation of knob 118 in the clockwise direction and, instead, can rotate that knob as rapidly as he wishes through as many quarter-turns as he wishes. Each time the knob moves into one of its positions, a line number and the corresponding price or data will appear on the Display 80.

The prices which correspond to lines one, two, three and four can be similar to, or can be greatly different from, each other. Specifically, the price for each of those lines can be any price from zero through $9.95. Once a vending machine has been readied for service, any subsequent changes in the prices of the products therein will usually be relatively small; and hence, extensive incrementing of a price corresponding to a given line usually occurs only when the vending machine is first being readied for service. If it is assumed that the product corresponding to selection line 1 of a vending machine is to have a price of $1.15, and if it further is assumed that when the operator used knob 118 to select the line number corresponding to selection line 1, the initial price in the RAM block 88 location corresponding to that line number was determined to be $0.15, the operator would have to provide twenty increments for that initial price. To provide those twenty increments, the operator would merely actuate the knob 142 through five complete revolutions. During each revolution, the program would automatically perform the cycle of steps 912, 914, 916, 918, 922, 924, 926, 928, 964, 966, 968, 970, 972, 974, 980, 960 and 962 four successive times. At the end of the fifth complete revolution of that knob, the program would perform the subroutine of steps 912, 914, 916, 918, 922, 924, 926, 928, 932 and 934, and then continue to repeat that cycle until a further switch actuation took place. The Display 80 would simultaneously display the selected line number and the newly-set price.

If an operator wished to decrease the price set for any given line, he would actuate knob 118 to select the corresponding line number, and then would actuate knob 142 in the counterclockwise direction through whatever quarter turns are needed to provide the required decrementing of the price for that line. Each counterclockwise quarter-turn actuation of knob 142 would cause the program to follow the cycle of steps 912, 914, 916, 918, 922, 924, 296, 928, 964, 966, 968, 970, 976, 978, 980, 960 and 962. After the last of any desired number of quarter-turn actuations of knob 142 had produced the desired decrementing of the price for the selected line, the next cycle of the program would include steps 912, 914, 916, 918, 922, 924, 926, 928, 932 and 934; and that cycle would be repeated endlessly until a further switch actuation took place.

The operator can set the mode-controlling data, which corresponds to line numbers 5 and 6, in the same manner in which he sets the prices that correspond to line numbers 1-4. All he needs to do is actuate knob 118 in the appropriate direction for the required number of times to select line 5 or line 6, and then actuate knob 142 in the appropriate direction for the required number of times to select the desired mode-controlling number. The selected line number and the selected mode-controlling number will be displaced immediately, automatically and simultaneously by Display 80; and hence the operator will know when he has set the desired mode-controlling number.

Before returning the switch 154 to its "Normal" position, the operator may want to actuate each of selection switches 222, 224, 226 and 228 of FIG. 8 and note the price which is displayed as each of those selection switches is actuated. By doing so, the operator can satisfy himself that the price which he wanted to set for the product or service corresponding to each of those selection switch has actually been set. If the operator learned that he had inadvertently failed to set the desired price for any given line, he could immediately set that price by actuating knob 142.

Before closing the vending machine to put it back in service, the operator will shift switch 154 to its "Normal" position. Thereupon, the program will cause Display 80 to display the decimal point and to display zero's on readouts 278 and 280, but to permit readouts 272, 274 and 276 to be dark. Specifically, as that switch is so shifted, the program will be operating through steps 912, 914, 916, 918, 922, 924, 926, 928, 932 and 934; and, when step 934 is next reached, it will cause step 938 to provide the desired blanking of readouts 272, 274 and 276 and the desired displaying of the decimal point and of zero's in readouts 278 and 280. Also, as switch 154 is so shifted, the program will cause the mode-controlling data corresponding to line 5 to be stored in register H and will cause the mode-controlling data corresponding to line 6 to be stored in register M. Moreover, as switch 154 is moved to its "Normal" position, step 900 of the program will determine whether any of the selection switches 222, 224, 226 and 228 of FIG. 8 has been actuated to its "on" position. If the answer is "no", as indicated to the right of block 900, the program will continuously operate through the steps 902 and 900 until one of those selection switches is actuated.

Before actuating any of the selection switches 222, 224, 226 and 228, a patron should insert enough money to equal or exceed the price of the desired product or service. If it is assumed that a nickel is inserted, the switch 282 of FIG. 9 will be actuated; and the Hex Contact Bounce Eliminator 292 will apply logic "0" to conductor 312. That "0" will cause NAND gate 302 and NOR gate 304 to apply a "0" to conductor 40; and NAND gate 540 of FIG. 16 will respond to that "0" to apply a "1" to conductor 43—thereby supplying an interrupt to Microprocessor 22. As pointed out hereinbefore, that Microprocessor will recognize that the interrupt was due to the insertion of money, and not to a loss of power, because a "1" will continue to appear on conductor 45.

The "0" on conductor 312 also will be applied to the accumulator A of Microprocessor 22, along with "1's" on each of conductors 306, 308 and 310; and the resulting word will cause the program to recognize that a nickel has been inserted. Thereupon the program will add a nickel value to the value in the credit register within Microprocessor 22, and also will cause the new total in that credit register to be displayed by the decimal point and by readouts 276, 278 and 280 of Display 80. That addition to the value in the credit register and that displaying of that new total will be done in the same general manner in which the Motorola device performed similar operations, and hence will not be described here. However, in the present control device, the program also will increment the value in X8 by one—to keep a running count of the number of nickels which were inserted as part of the total amount of money needed to equal or exceed the sales price.

Similarly, as a dime, quarter or dollar are inserted, the actuation of switches 284, 286 and 288 respectively, of FIG. 9 will cause "0's" to appear on lines 310, 308 and 306, respectively. Each of those "0's" will cause a "0" to appear on line 40, and a "1" to appear on line 43; and each of those "0's" on conductors 310, 308 and 306 will cause accumulator A to develop a word which represents "1's" on three of the conductors 306, 308, 310 and 312 and which represents a "0" on the fourth of those conductors. The program will determine which of the conductors 306, 308, 310 and 312 has the "0" on it and it will correspondingly increase the monetary value in the credit register, display the new total in that register, and also will increment by one the value in the corresponding registers X7, X6 and X5. In this way, the control device temporarily stores and displays the total monetary value of each unit of money that is inserted, and the numbers of the units of money that are inserted.

As soon as enough money is inserted and one of the selection switches is actuated to its "on" position, the answer provided by step 900 will become "yes". Thereupon, step 992 of the program will (a) cause the price which is stored in the location of RAM block 88 corresponding to that selection switch to be written into register X4 and (b) cause the number of that selection line to be written into register F. Step 994 of the program will cause the price, which has been written into register X4, to be subtracted from the total value of credit which was accumulated in the credit register as money was inserted. The difference between that price and that total value of credit will be the amount of change which should be dispensed; and that difference will be stored in register G. Step 996 of the program will (a) check the data in register M to determine whether that data, which corresponds to line 6, is zero or is some monetary value (b) compare the amount of change with that monetary value. If that data in that register was zero, the control device would impose no limit upon the amount of change that was to be paid out; and hence a signal would be provided which would enable step 998 of the program to supply a Turn On Vend signal. However, if the data stored in register M had a monetary value, and if the amount of change determined by step 994 exceeded that monetary value, step 996 would provide a signal which would cause the program to repeat the steps 902, 900, 992, 994 and 996 until a different selection line was actuated to its "on" position.

If the patron then actuates a selection switch which corresponds to a product or service that has a price which is so close to the credit, due to the previously-inserted money, that the amount of change is equal to or less than the monetary value corresponding to line 6, as determined by register M, the signal from step 996 will cause the program to initiate the Turn On Vend signal 998. Thereafter, step 1000 of the program will determine whether the reset switch 238 of the Vender Reset 30 is still closed—thereby indicating that the vending machine has not yet completed its vending operation. If the answer to that step is "yes", the program will continuously repeat step 1000 until the vending machine does open reset switch 238. As soon as step 1000 senses that the vending machine has opened switch 238, it will provide a "no" signal which will cause step 1002 to determine whether the data, which is stored in register H and which corresponds to line 5, is set to call for a long vend. If that data is not set to call for a long vend, the resulting "no" signal will cause step 1004 of the program to provide a Turn Vend Off signal, and then initiate the paying out of change, as indicated by block 1006. On the other hand, if the data in register H is set to call for a long vend, step 1002 of the program will provide a "yes" answer which will initiate the paying out of change by step 1006.

The paying out of the change can be effected by one of the change-dispensing mechanisms customarily used in the vending machine art; and hence the paying out of change need not be described in detail. However, whenever a signal is developed to effect the dispensing of a quarter as change, the number in register X1 will be incremented by one, whenever a signal is developed to effect the dispensing of a dime as change, the number in register X2 will be incremented by one, and whenever a signal is developed to effect the dispensing of a nickel as change, the number in register X3 will be incremented by one. In this way, the control device makes a record of the total number of quarters, of the total number of dimes, and of the total number of nickels that were paid out to provide the required change for each product-vending or service-vending operation.

Throughout the time the change is being dispensed, the program will repeatedly execute the subroutine which includes steps 1006, 1008, and 1010 and possibly 1012. Specifically, step 1008 will determine whether the paying out of change has been completed; and, if the answer is "no", step 1010 will determine whether the vending machine has re-closed reset switch 238. If that switch has not re-closed, a "no" answer will be provided by step 1010; and, thereupon, the program will repeat steps 1006, 1008 and 1010 until the paying out of change is completed or that reset switch is re-closed. On the other hand, if step 1010 provides a "yes" answer, step 1012 will provide a Turn Off Vend signal, and then will cause the program to repeat steps 1006, 1008, 1010 and 1012 until the paying out of change is completed.

As soon as the paying out of change is completed, step 1008 will supply a "yes" answer; and step 1014 will determine whether the vending machine has re-closed reset switch 238. If that reset switch still is open, a "no" signal at the right of step 1014 will cause the program to circulate through that step until that reset switch is reclosed. At such time a "yes" signal will be developed at the bottom of step 1014; and the program will provide a Turn Vend Off signal, as indicated by block 1016.

By the time the program provides the Turn Off Vend signal of step 1016, the inserted money will have been accredited and the resulting total value of credit will have been displayed, the product or service will have been dispensed, any change will have been dispensed, and the inserted money will have passed to the money box within the vending machine. However, some additional record-keeping operations will be performed by the control device. In the event the driving power to the vending machine is cut off as a result of step 1004 or of step 1012, the Turn Off Vend signal of step 1016 will, in part, be redundant. However, at the time the Turn Off Vend signal of step 1016 occurs, the program will initiate the record-keeping operations of the control device.

Figure 18E:
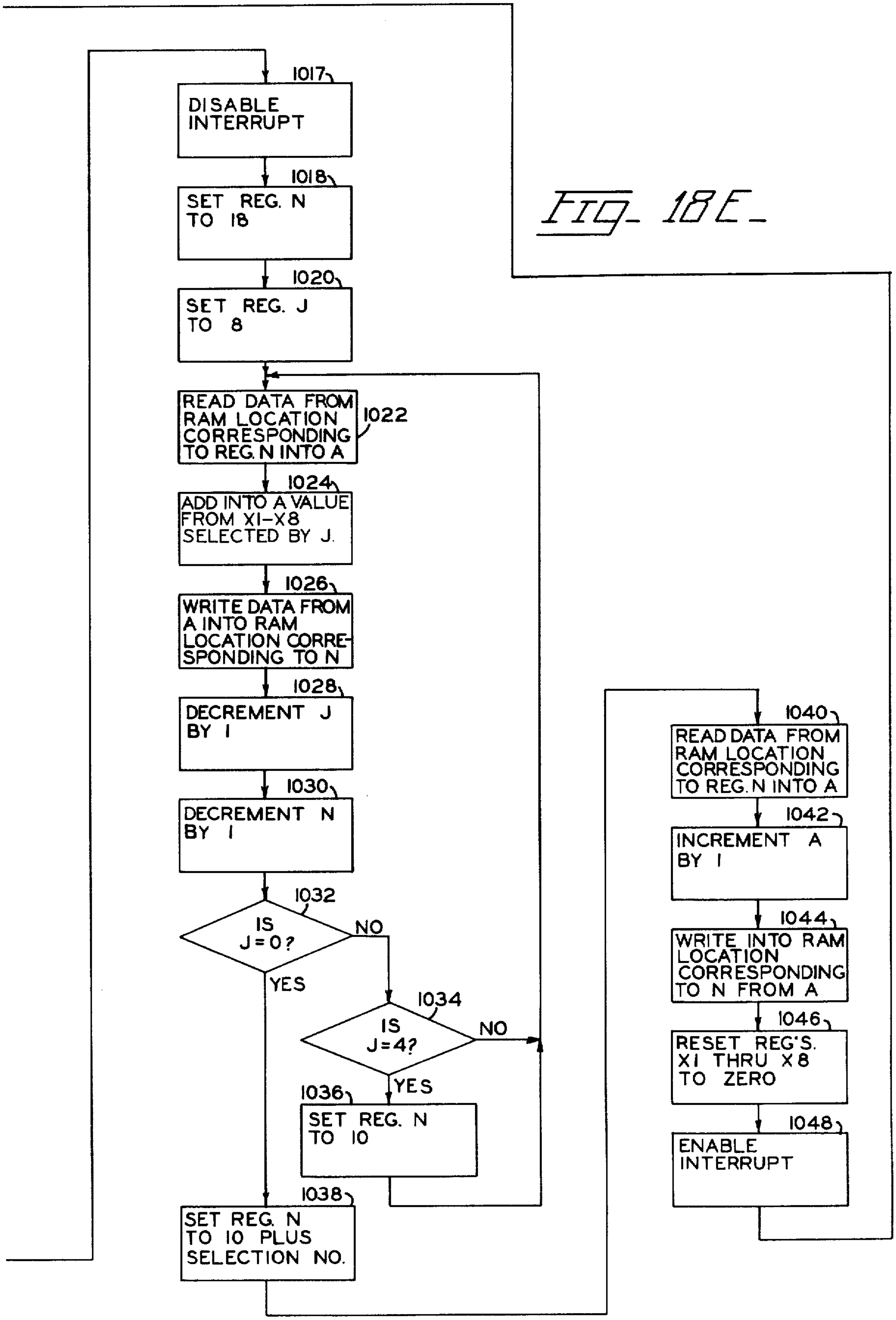

Included in those record-keeping operations is step 1018 in FIG. 18E, wherein register N is set to line number 18. That line number is the same line number which was discussed previously in connection with step 958. In the latter step, the program merely called for the data, in the memory location in RAM block 88 which corresponds to line 18, to be displayed; but step 1018 causes register N to be set to line number 18 to permit data to be written from register X8 into the RAM block location which corresponds to line number 18. Also, the program will cause register J to be set to the number 8, as indicated by step 1020; and that setting will make certain that all of the registers X8 through X1 will be "read" in sequence during the record-keeping operations.

In step 1022, the program will cause the data, in the memory location of the RAM block 88 which was selected by register N, namely, the memory location corresponding to line number 18, to be written into accumulator A. Step 1024 will add the value in the register, which is selected by register J—namely the value in register X8—to the value which was written into accumulator A by step 1022 to provide a resulting sum. If that resulting sum is between zero and nine hundred and ninety-nine, it will be represented in accumulator A by a corresponding word. However, if that resulting sum is one thousand, it will be represented in accumulator A as zero; and if that resulting sum is between one thousand and one and one thousand nine hundred and ninety-nine, it will be represented in accumulator A as a number between one and nine hundred and ninety-nine. In step 1026, the resulting sum will be written into the location of RAM block 88 which corresponds to line number 18, that was selected by register N in step 1018. That resulting sum will constitute an up-dated running count of the number of nickels which have been inserted and accepted in the immediately-concluded, and all preceding, transactions wherein a product or service was dispensed.

Step 1028 will decrement the number in register J from 8 to 7; and step 1030 will decrement the line number in register N from 18 to 17. In step 1032, the program will ask whether the decremented number in register J is 0; and, if the answer is "no"—as will be the case in the assumed illustration, step 1034 will then determine whether the decremented number in register J is 4. In the assumed illustration the answer will again be "no"; and hence the program will repeat the steps 1022, 1024, 1026, 1028, 1030, 1032 and 1034. As step 1022 is repeated, data will be read from the RAM block 88 location which corresponds to line number 17, because the number in register N was previously decremented from 18 to 17. Similarly, when step 1024 is repeated, the value which is added into accumulator A will be the value in the register X7, because the number in register J was previously decremented from 8 to 7. The resulting sum, which will be written into the RAM block 88 location which corresponds to line number 17 in step 1026, will constitute an up-dated running count of the number of dimes which have been inserted and accepted in the immediately-concluded, and all preceding, transactions wherein a product or service was dispensed.

During the ensuing step 1028 the number in register J will be decremented from 7 to 6; and, during the ensuing step 1030, the line number in register N will be decremented from 17 to 16. The question in step 1032 of whether the number in register J is zero will again be answered "no", and in step 1034 the question of whether the number in that register is 4 will again be "no". Thereupon the program will again repeat steps 1022, 1024, 1026, 1028, 1030, 1032 and 1034—with data from the RAM block 88 location which corresponds to line number 16 being read into accumulator A, with data from register X6 being added to that data, with the resulting sum being written into the RAM block 88 location which corresponds to line number 16, with the line number in register N decremented to 15, with the number in register J decremented to 5, with step 1032 providing a "no", and with step 1034 providing a "no". Consequently, the program will again repeat steps 1022, 1024, 1026, 1028, 1030, 1032 and 1034 with data from the RAM block 88 location which corresponds to line number 15 being read into accumulator A, with data from register X5 being added to that data, with the resulting sum being written into the RAM block 88 location which corresponds to line number 15, with the line number in register N decremented to 14, with number in register J decrement to 4, and with step 1032 providing a "no", but with step 1034 providing a "yes". Thereupon, step 1036 will change the line number in register N to 10, and will cause the program to repeat steps 1022, 1024, 1026, 1028, 1030, 1032 and 1034—with data from the RAM block 88 location which corresponds to line number 10 being read into accumulator A, with data from register X4 being added to that data, with the resulting sum being written into the RAM block 88 location which corresponds to line number 10, with the line number in register N decremented to 9, with the number in register J decremented to 3, with step 1032 providing a "no", and with step 1034 providing a "no".

Thereupon, the program will again repeat steps 1022, 1024, 1026, 1028, 1030, 1032 and 1034—with data from the RAM block 88 location which corresponds to line number 9 being read into accumulator A, with data from register X3 being added to that data, with the resulting sum being written into the RAM block 88 location which corresponds to line number 9, with the line number in register N decremented to 8, and with the number in register J decremented to 2, with step 1032 providing a "no", and with step 1034 providing a "no". The program will again repeat steps 1022, 1024, 1026, 1028, 1030, 1032 and 1034—with data from the RAM block 88 location which corresponds to line number 8 being read into accumulator A, with data from register X2 being added to that data, with the resulting sum being written into the RAM block 88 location which corresponds to line number 8, with the line number in register N decremented from 8 to 7, with the number in register J decremented to 1, with step 1032 providing a "no", and with step 1034 providing a "no". Once again, the program will repeat steps 1022, 1024, 1026, 1028, 1030 and 1032—with data from the RAM block 88 location which corresponds to line number 7 being read into accumulator A, with data from register X1 being added to that data, with the resulting sum being written into the RAM block 88 location which corresponds to line number 7, with the line number N decremented to 6, with the number in register J decrement to 0, and with step 1032 providing a "yes".

During the immediately-preceding eight cycles, the number in register X8 which represents accepted nickels was added to the running count of nickels in the RAM block 88 location corresponding to line number 18, the number in register X7 which represents accepted dimes was added to the running count of dimes in the RAM block 88 location corresponding to line number 17, the number in register X6 which represents accepted quarters was added to the running count of dimes in the RAM block 88 location corresponding to line number 16, the number in register X5 which represents accepted dollars was added to the running count of dollars in the RAM block 88 location corresponding to line number 15, the number in register X4 which represents the price of the dispensed product or service was added to the running count of the total sales of dispensed products and services in the RAM block 88 location corresponding to line number 10, the number in register X3 which represents nickels dispensed as change was added to the running count of nickels dispensed as change in the RAM block 88 location corresponding to line number 9, the number in register X2 which represents dimes dispensed as change was added to the running count of dimes dispensed as change in the RAM block 88 location corresponding to line number 8, and the number in register X1 which represents quarters dispensed as change was added to the running count of quarters dispensed as change in the RAM block 88 location corresponding to line number 7.

The "yes", provided by step 1032 of the last of the eight immediately-preceding cycles, will cause step 1038 of the program to set the number in register N to 10 plus the number of the selection line. As indicated previously, selection switch 222 corresponds to selection line 1, selection switch 224 corresponds to selection line 2, selection switch 226 corresponds to selection line 3, and selection switch 228 corresponds to selection line 4; and the appropriate number of those four numbers was previously stored in register F by step 992. In the described embodiment, the number set in register N by step 1038 will be 11, 12, 13 or 14. Step 1040 will cause the data, in the RAM block 88 location corresponding to the 11, 12, 13 or 14 in register N, to be written into accumulator A. That data will constitute a running account of the number of times a product or service corresponding to selection line 1, 2, 3 or 4 has been dispensed. Step 1042 will increment the number in accumulator A, and will thereby up-date that running account to include the product or service dispensed by the just-concluded vending operation. Step 1044 will write the incremented running count into the RAM block 88 location which corresponds to the 11, 12, 13 or 14 in register N. Step 1046 then will cause all of the registers X1 through X8 to be reset to zero. Moreover, that step will cause the program to repeat steps 902 and 900 continuously until a further switch actuation occurs.

It will be noted that the control device of the present invention does not require the operator to press a load switch or to take any other action to fix an incremented or decremented price for any given line. Instead, the incrementing of a price is automatically effected by step 974 and is automatically written into the appropriate RAM block 88 location by step 980. Similarly, the decrementing of a price is automatically effected by step 978 and is automatically written into the appropriate RAM block 88 location by step 980. Further, it will be noted that once a price has been set, it will remain unchanged as knob 118 of FIG. 2 is actuated to select a different line number. Moreover, that price will remain unchanged until knob 118 is used to again select the line number for which that price was set and then uses knob 142 to change that price.

It will be noted that an operator does not have to set the knob 142 in any given position when he uses the knob 118 to select the line whose price he wishes to check or change. Further, it will be noted that as the operator uses the latter knob to select that line, the position in which knob 142 is resting will not change or affect the price which is stored in the RAM block 88 for the newly-selected line. This is due to the fact that shortly after knob 142 has been actuated to change a price, the steps 924, 926, 928, 964 and 966 will make the code words in the price control register and in accumulator A be the same during step 928; and hence the program will circulate through steps 932, 934, 912, 914, 916, 918, 922, 924, 926, 928 and back to 932 until that knob is actuated. As long as the program circulates through those steps it can not cause step 974 to increment, or cause step 978 to decrement, any price. As a result, an operator can check to see what price is already set for each given line and then, if he wishes to do so, leave that price unchanged or actuate the knob 142 to change the price.

In checking the prices corresponding to the line numbers assigned to various products, an operator will usually check those line numbers in ascending order. Consequently, the operator will usually actuate knob 118 in the clockwise direction. However, if at any time the operator wishes to check a lower-value line number, he need only actuate that knob in the counter clockwise direction the number of positions that are needed to cause the desired lower-value line number to be interrogated.

As long as the switch 154 of FIG. 2 is left in its "Function" position, the alternating positive and negative values of waveform 153 will coact with switches 104 and 106 to control the logic states on conductors 134 and 136; and the Microprocessor 22 will alternately compare the eight-bit words which correspond to those logic states with the eight-bit words in the line control register and in the price control register. By providing the short duration positive and negative values of waveform 153, the present invention immediately senses each and every change in the position of knob 118 or of knob 142. Yet, by having Microprocessor 22 effect changes in the eight-bit word in the line control register only when a difference is sensed between the eight-bit words in the accumulator A and in that line control register, the control device of the present invention avoids undesired changes in the eight-bit word in that line number register. Similarly, by having the Microprocessor 22 effect changes in the eight-bit word in the price control register only when a difference is sensed between the eight-bit words in accumulator A and in that price control register, the control device of the present invention avoids undesired changes in the eight-bit word in that price control register.

If the switch 160 of FIG. 3 were substituted for the switch 104 or for the switch 106 of FIG. 2, the operator would actuate the knob of switch 160 in the same way in which he would actuate the knob 118 of switch 104 or the knob 142 of switch 106. Moreover, in position 1 of switch 160, the logic states of conductors 178 and 134 and also of conductors 180 and 136 would, when a "0" appeared on conductor 176, be "1's", whereas in position 2, the logic state of conductors 180 and 136 would be "1" but the logic state of conductors 178 and 134 would be "0". In position 3 of the switch 160, the logic states of conductors 180 and 136 would be "0" and the logic state of conductors 178 and 134 would be "1", whereas in position 4, the logic states of all of those conductors would be "0". Where the switch 160 was substituted for switch 104, it would be rotated in the clockwise direction to increment a line number and would be rotated in the counterclockwise direction to decrement a line number. Where switch 160 was substituted for switch 106 it would be rotated in the clockwise direction to increment a price or some mode-controlling data and would be rotated in the counterclockwise direction to decrement a price or some mode-controlling data.

Steps 1017 and 1048 of FIG. 18E are not significant during the normal operation of the control device, and hence were not mentioned in the preceding description of the record-keeping operations of FIG. 18E. However, those steps perform functions which can be very important in the event the power fails or is cut off.

As the program reaches step 1017 in FIG. 18E, that step will send a Disable Interrupt signal to the Microprocessor 22 which will keep that Microprocessor from making an immediate response to any interrupt which could be developed, by the Power On/Off Interrupt block 42 of FIGS. 1 and 16, in the event the power failed or was cut off. Consequently, throughout the time the program performs the sub-routines of steps 1018, 1020, 1022, 1024, 1026, 1028, 1030, 1032, 1034, 1036, 1038, 1040, 1042, 1044 and 1046, the interrupt signal from block 42 will not be able to interrupt, delay or otherwise interfere with the record-keeping steps of FIG. 18E. This is important; because it will keep any failure or cutting off of power from destroying or adversely affecting any of the important running counts in the various memory locations in RAM block 88. Further, it will make certain that all of the additions to those running counts, which are provided by the steps of FIG. 18E, will be suitably made even though the voltage from the power supply will be progressively decreasing; because the total time required for all of the sub-routines of FIG. 18E is less than five milliseconds. That length of time is so short, relative to the time required for the voltage from the power supply to fall below five volts, that if the routine of FIG. 18E has begun, it will be completed before a loss of power could cause the voltage to fall far enough to interrupt, delay or otherwise interfere with that routine.

As the program completes step 1046 and then performs step 1048, an Enable Interrupt signal will be supplied to Microprocessor 22 which will enable that Microprocessor to respond to any interrupt signal which had been developed by the Power On/Off Interrupt block 42 subsequent to the time step 1017 of FIG. 18E supplied the Disable Interrupt signal. Thereupon, the Microprocessor will essentially become inactive and the RAM block 88 will be in a "read only" mode until power is restored.

It should be noted that if the power fails or is cut off prior to the time the program reaches step 1017, the interrupt from Power On/Off Interrupt block 42 will not permit the routine of FIG. 18E to be initiated; and hence the running counts in the various memory locations in RAM block 88 will remain unchanged. However, if the power does not fail or is not cut off prior to the time the program reaches step 1017, the interrupt from Power On/Off Interrupt block 42 will not be able to halt, delay or otherwise affect the completion of the routine of FIG. 18E. Once that routine is completed, step 1048 will permit the Microprocessor 22 to respond to the interrupt from block 42.

The Battery Back-Up block 90 of FIG. 1 can be of standard and usual design; and, during normal operation of the control device, it will not furnish power to RAM block 88 but will connect the positive terminal of the voltage supply to that RAM block by conductor 92. However, in the event the power fails or is cut off, that Battery Back-Up block will directly provide power to RAM block 88 to preserve the data stored within the various memory locations in that RAM block.

Specifically, if the power fails or is cut off, and thereby causes the voltage from the power supply to fall below two and eight-tenths volts, the Battery Back-Up block will begin supplying power to RAM block 88. That RAM block is able to preserve all of the words, numbers and data which are stored therein, as long as the voltage which is supplied to that block remains above two volts. The Battery Back-Up block 90 will be able to supply at least two volts to RAM block 88 for many months; and hence will be able to prevent loss or impairment of the words, numbers and data which are stored in that RAM block throughout all normal power loss periods.

Referring particularly to FIGS. 19A–19E, the flow chart represented thereby illustrates the operation of the control device of FIG. 1 when the switches of FIG. 4 have been substituted for the switches of FIG. 2. That flow chart has many steps, namely 900, 902, 904, 910, 912, 922, 932, 934, 936, 938, 948, 950, 952, 954, 956, 958, 960, 962, 972, 974, 976, 978, 980, 982, 984, 986, 988, 990, 992, 994, 996, 998, 1000, 1002, 1004, 1006, 1008, 1010, 1012, 1014, 1016, 1017, 1018, 1020, 1022, 1024, 1026, 1028, 1030, 1032, 1034, 1036, 1038, 1040, 1042, 1044, 1046 and 1048, which are identical to identically-numbered steps in the flow chart of FIGS. 18A–18E. However, some steps of the flow chart of FIGS. 18A–18E, namely, 906, 908, 914, 916, 918, 920, 924, 926, 928, 930, 940, 942, 946, 964, 966, 968 and 970 are not used in the flow chart of FIGS. 19A–19E. Further, some steps namely, 1050, 1052, 1054, 1056, 1058, 1060, 1062, 1064, 1066 and 1068 of the latter flow chart are not in the flow chart of FIGS. 18A–18E.

The basic reason for the differences between the flow charts of FIGS. 18A–18E and of FIGS. 19A–19E is that the switches of FIG. 2 provide distinctive codes in each of the positions thereof and will provide those codes irrespective of the direction of actuation of those switches. As a result, the flow chart of FIGS. 18A–18E needs the steps 906, 914, 916, 918 and 920, which are variously related to accumulator A, register B and the line control register, to sense the direction of actuation of the switch 104, and thereby determine whether that switch was actuated to increment or decrement the line number. Similarly, that flow chart needs steps 908, 924, 926, 928 and 930, which are variously related to accumulator A, register C and the price control register, to sense the direction of actuation of the switch 106, and thereby determine whether that switch was actuated to increment or decrement price or mode-controlling data. In contrast, switch 183 of FIG. 4 will always, whenever it is closed and re-opened, effect a decrementing of a line number, whereas the switch 185 will always, whenever it is closed and re-opened, effect an incrementing of a line number. Similarly, the switch 182 of FIG. 4 will always, whenever it is closed and re-opened, effect a decrementing of a price or of mode-controlling data, whereas switch 184 will always, whenever it is closed and re-opened, effect an incrementing of a price or of mode-controlling data.

If step 912 of the flow chart of FIGS. 19A–19E determines that a positive value is appearing on line 152 of FIG. 2, step 1050 will determine whether switch 183 is closed. If the answer is "no", step 1052 will then determine whether switch 185 is closed. If the answer again is "no", the program for the flow chart of FIGS. 19A–19E will perform steps 922, 1054, 1056, 932, 934, 912, 1050 and 1052, in about the same manner in which the program for the flow chart of FIGS. 18A–18E performed the steps 922, 924, 926, 928, 932, 934, 912, 914, 916 and 918.

If step 922 of the flow chart of FIGS. 19A–19E determines that a zero value is appearing on line 152 of FIG. 2, step 1054 will determine whether switch 182 is closed. If the answer is "no", step 1056 will then determine whether switch 184 is closed. If the answer again is "no", the program for the flow chart of FIGS. 19A–19E will perform steps 922, 1054, 1056, 932, 934, 912, 1050 and 1052, in about the same manner in which the program for the flow chart of FIGS. 18A–18E performed the steps 922, 924, 926, 928, 932, 934, 912, 914, 916 and 918.

If it is assumed that the operator closes switch 185, the next time step 1052 checks the state of switch 185, the program for the flow chart of FIGS. 19A–19E will, in step 1058, determine whether the operator has permitted that switch to re-open. If the answer is "no", that program will circulate around step 1058 until the operator does permit that switch to re-open—thereby avoiding all of the problems which could arise if the actuation of switch 185 caused it to close but the releasing of the switch button did not effect re-opening of that switch. Once step 1058 determines that switch 185 has re-opened, the program for the flow chart of FIGS. 19A–19E will initiate step 948, and will then proceed to the appropriate ones of the succeeding steps 950, 956, 958, 960, 962, 982, 984, 986, 988 and 990—in the manner described hereinbefore in connection with the flow chart of FIGS. 18A–18E, unless the number in the line register had been 18. In the event that number had been 18, the program would have recirculated from step 948 through steps 912, 1050, 1052, 922, 1054, 1056, 932 and 934 back to 912 until some further switch actuation took place. However, if that line number had not been 18, the closing and re-opening of switch 185 would have caused the program to automatically effect an incrementing of the number in the line register by one.

If it is assumed that the operator closed switch 183 instead of switch 185, the next time step 1050 checks the state of switch 183, the program for the flow chart of FIGS. 19A–19E will, in step 1060, determine whether the operator has permitted the switch 183 to re-open. If the answer is "no" that program will circulate around step 1060 until the operator does permit that switch to re-open—thereby avoiding all of the problems which could arise if the actuation of the switch 183 caused it to close but the releasing of the switch button did not effect re-opening of that switch. Once step 1060 determines that switch 183 has re-opened, the program for the flow chart of FIGS. 19A–19E will initiate step 952, and will then proceed to the appropriate ones of the succeeding steps 954, 956, 958, 960, 962, 982, 984, 986, 988 and 990—in the manner described hereinbefore in connection with the flow chart of FIGS. 18A–18E, unless the number in that line register is zero. In the event that number had been zero, the program would have recirculated from step 952 through steps 910, 912, 1050, 1052, 922, 1054, 1056, 932 and 934 back to step 912 until some further switch actuation took place. However, if that line number had not been zero, the closing and re-opening of switch 183 would have caused the program to automatically effect a decrementing of the number in the line register by one. This means that each time the operator closes and re-opens the switch 183, he will effect a decrementing of the number in the line register until that number reaches zero; and that each time that operator closes and re-opens the switch 185, he will effect an incrementing of the number in the line register until that number reaches 18.

If it is assumed that the operator has selected the line number he desires, and if it further is assumed that he closed the switch 184, step 1056 will provide a "yes". Step 1066 then will determine whether the operator permitted that switch to re-open; and, if he had not done so, the program would recirculate around step 1066 until that switch did re-open. Thereafter, step 1068 would determine whether the selected line number was any one of 1–6; and, if the answer was "no", the program would recirculate through steps 912, 1050, 1052, 922, 1054, 1056, 932 and 934 back to step 912. However, if step 1068 determined that the selected line number was any one of 1–6, the resulting "yes" answer would cause the program to initiate appropriate ones of steps 972, 974, 980, 960 and 962 in the manner described hereinbefore in connection with the flow chart of FIGS. 18A–18E. It should be noted that as the switch 184 was closed and then permitted to re-open, the price or the mode-controlling data in the RAM block 88 location corresponding to the previously-selected line number was automatically incremented by one, unless that price or mode-controlling data corresponded to $9.95.

If it is assumed that the operator closed switch 182, step 1054 will provide a "yes". Step 1062 then will determine whether the operator permitted that switch to re-open; and, if he had not done so, the program would recirculate around step 1062 until that switch did re-open. Thereafter, step 1064 would determine whether the selected line number was any one of 1-6; and, if the answer was "no", the program would recirculate through steps 912, 1050, 1052, 922, 1054, 1056, 932 and 934 back to step 912. However, if step 1064 determined that the selected line number was any one of 1–6, the resulting "yes" answer would cause the program to initiate appropriate ones of the steps 976, 978, 980, 960 and 962 in the manner described hereinbefore in connection with the flow chart of FIGS. 18A–18E. It should be noted that as the switch 182 was closed and then permitted to re-open, the price or the mode-controlling data in the RAM block 88 location corresponding to the previously selected line number was automatically decremented by one, unless that price or mode-controlling data corresponded to zero.

Figures 19, 19C:
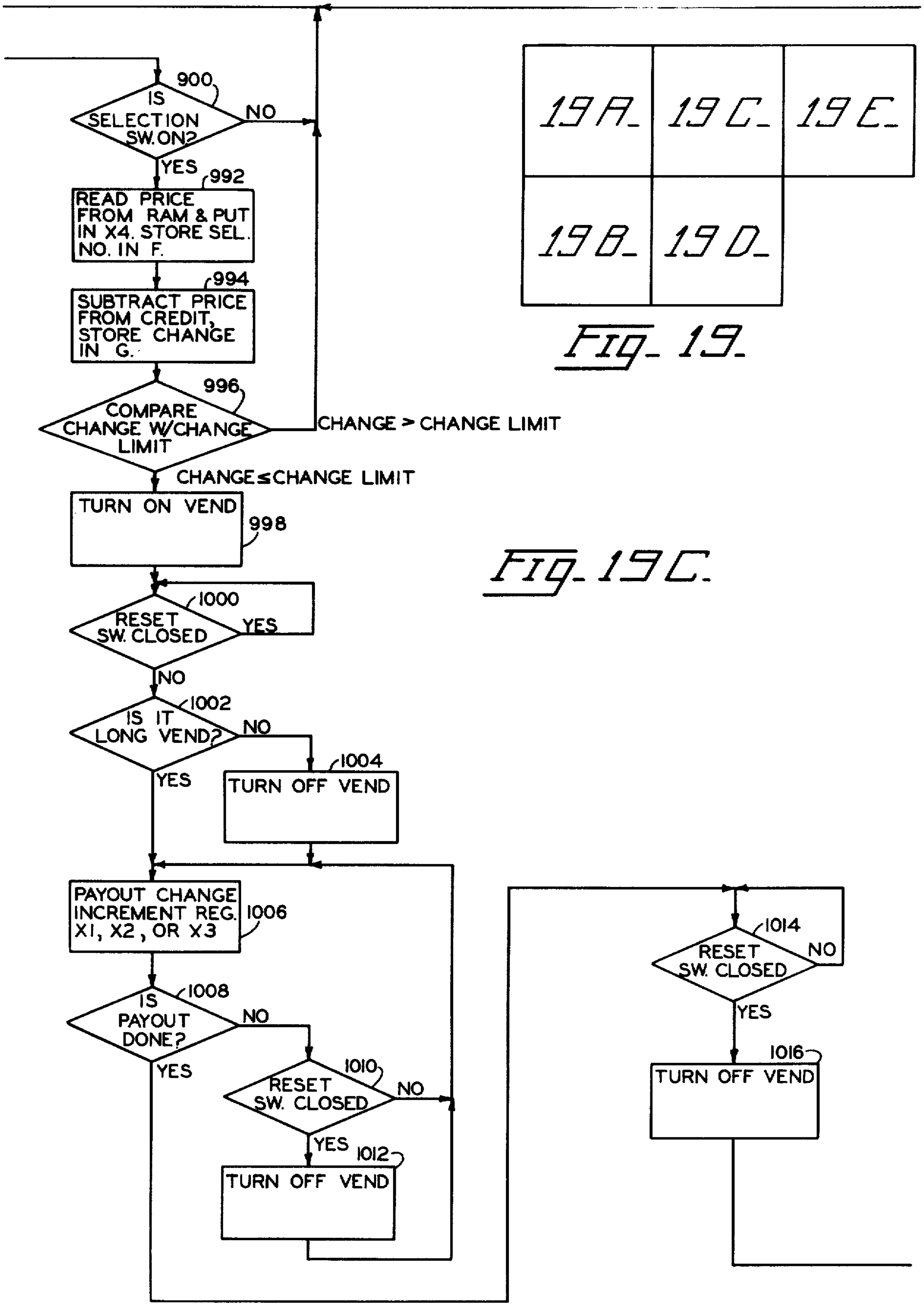
FIG. 19 shows the orientation of FIGS. 19A through 19E, and FIGS. 19A through 19E constitute a flow chart of the operation of the control device of FIG. 1 when it is equipped with the groups of switches of FIG. 4.
Figure 19A:
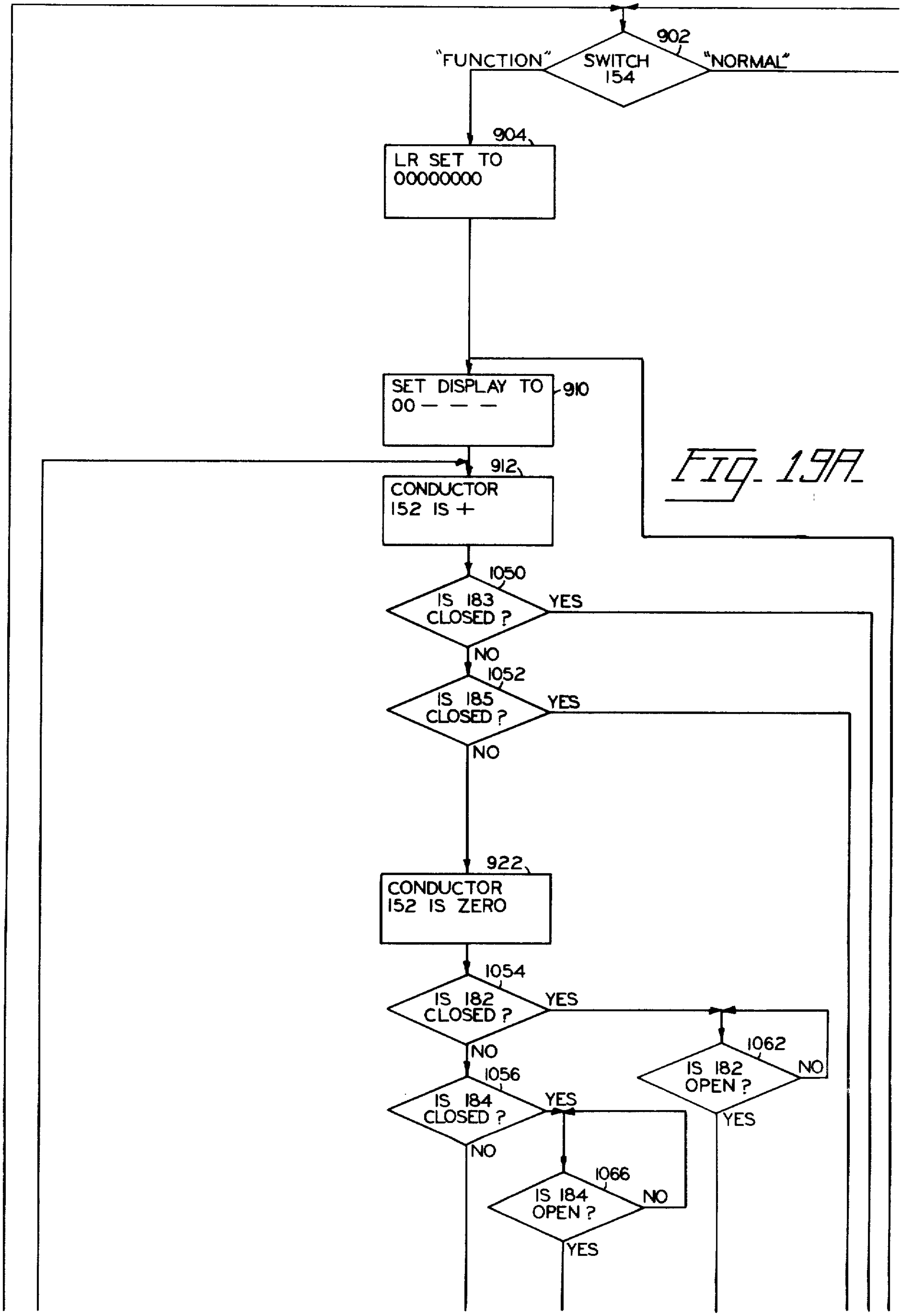
Figure 19B:
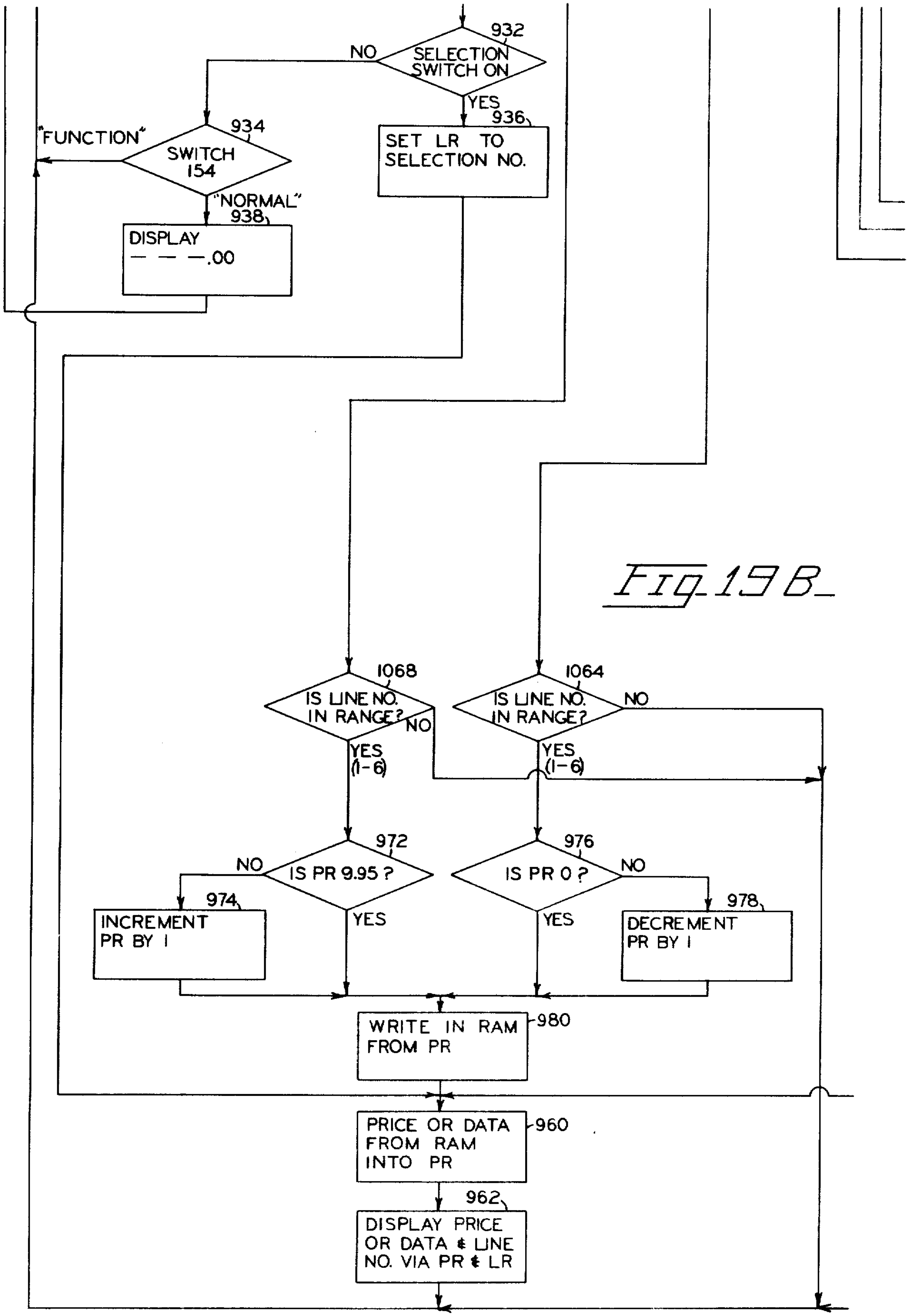
Figure 19D:
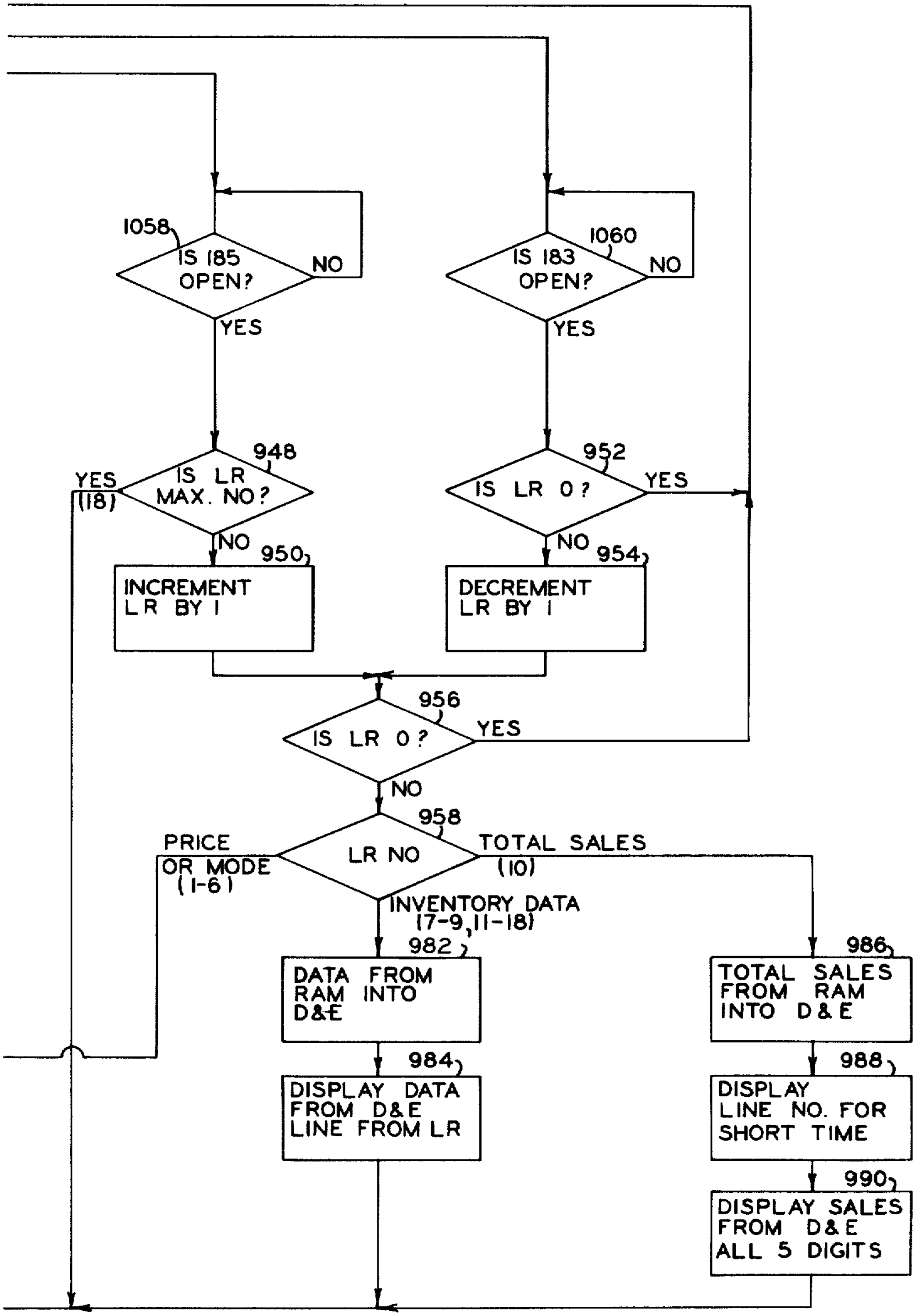
Figure 19E:
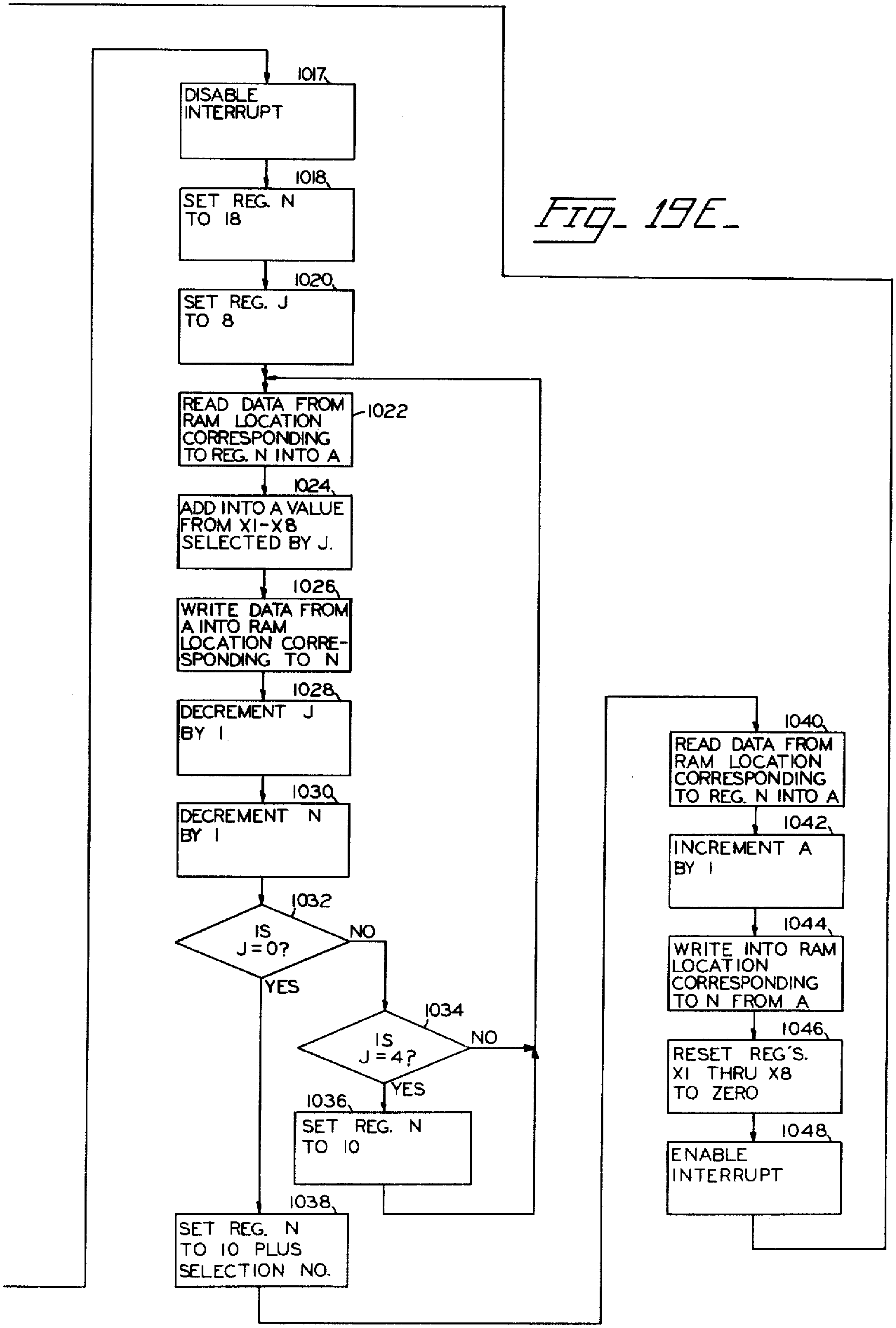

All of the steps in FIGS. 19C and 19E are identical to the identically-numbered steps of FIGS. 18C and 18E. As a result the steps in FIGS. 19C and 19E will not be described here.

If the switch 200 of FIG. 5 were substituted for the switch 104 or for the switch 106 of FIG. 2, the flow chart of FIGS. 19A–19E, and not the flow chart of FIGS. 18A–18E would represent the resulting operation of the control device. This is the case because the signals which are provided by switch 200 are similar to those which are provided by switches 182 and 184 or by switches 183 and 185 of FIG. 4, and are un-like those which are provided by switches 104 and 106 of FIG. 2. Where switch 200 is used to provide signals comparable to those provided by switch 182 or 183, the knob of switch 200 will cause the movable contact 208 to engage, and then move back from, the contact 202. When switch 200 is used to provide signals comparable to those provided by switch 184 or 185, the knob of switch 200 will cause the movable contact 208 to engage, and then move back from, the contact 206. The switch 200 thus provides a "closed" and "re-opened" type of signal—as do the switches 182–185, whereas the switches 104 and 106 of FIG. 2 provide position-coded signals.

As indicated by FIGS. 2–5, different forms of switches can be used in the control device to enable the operator to select the desired line number and also to set the desired price or the desired mode-controlling data for each line number. However, irrespective of the kind of switch that is used, the control device of the present invention provides advantages over control devices for vending machines which utilize the selection switches of the vending machine to select the lines whose prices are to be set. In the first place, because the switches 104 and 106 are located immediately adjacent each other, and because any substitutes for those switches also could be located immediately adjacent each other, the operator does not have to reach around to the opened front of the vending machine to actuate a selection switch and then reach around inside that opened vending machine to operate a price-setting switch. Instead, the operator can stand immediately adjacent the switches which are used to select the line number and to set the price or mode-controlling data, and then he can select that line and set that price or data while watching the readout of FIG. 10. In that way, the operator can quickly and precisely set the desired price and data for each numbered line, and see that the desired settings have been effected.

Where several selection switches of a vending machine are connected to one price line from the control device of the present invention, as can be done where a number of products are to be sold at the same price, the operator does not need to check and re-set the price for all of those selection switches when the basic price for all of those products is changed. Instead, the operator need only select the price line to which all of those selection switches are connected, and then set the desired price for that price line. As a result, that operator need not press each of the selection switches individually.

The control device of the present invention is very useful in vending machines wherein at least one coin must be inserted, and its value accredited, before the pressing of a selection switch can initiate any action. Specifically, in some vending machines, at least one coin must be inserted, and its value accredited, before the pressing of one of the selection switches can initiate any action; and those vending machines usually respond to the pressing of a selection switch to illuminate a sign which indicates that the patron should make another selection unless the patron has inserted enough money to match or exceed the price corresponding to the pressed selection switch. The control device of the present invention avoids any and all price-setting complications which could arise in any such vending machine when the selection switches were used to select the lines whose prices were to be set; and it does so by using the switch 104, or the switches of FIGS. 3-5, rather than the vending machine selection switches to select the line numbers. The switch 104, and the switches of FIGS. 3-5, can be used to select the desired line number without any need of the operator inserting any coins.

Although the control device of the present invention uses the switches of FIGS. 2-5 to select the desired line numbers and to set the prices or data for the selected lines, the appropriate program of that control device enables the operator of vending machines, which do not require the insertion and accrediting of money before a selection switch is effective, to make a final check of the prices which have been set. Specifically, that program enables the operator, before he opens the switch 154 of FIG. 2, to press each selection switch and see on the readout of FIG. 10 the line number and the price corresponding to that line. Having thus satisfied himself that each selection swich has the desired price set therefor, the operator will re-open switch 154 and then close the vending machine to put it in condition to be operated by patrons.

If, while the operator is setting prices or setting mode-controlling data for one or more of the lines, something distracts his attention, he will not have to try to remember the selection line with which he was working before his attention was distracted. Specifically, if a patron asks him to dispense one of the products therein, he can do so without any risk of losing track of the line whose price or data he was setting, because Displays 272 and 274 will automatically show him the number of the last line which he was checking. As a result, the control device of the present invention obviates any and all loss of time which could result if an operator felt unsure about the number of the line he was working with and, to be certain, checked two or more lines which he had previously checked. Further, the control device of the present invention avoids a situation where an operator, whose attention has been distracted, thereafter fails to reset the price for one or more lines because he thinks he had been working with lines which were one or two numbers above the line with which he had actually been working when he was distracted.

The switch 154 of FIG. 2 is useful in keeping the operator from accidentally causing a product to be vended while the vending machine is open for the purpose of checking and setting prices and mode-controlling data. In some vending machines, particularly beverage-dispensing machines, liquid can spill onto the floor if the vending machine is permitted to initiate a vending operation while that vending machine is open. By providing the switch 154 of FIG. 2, the likelihood of having a vending machine spill product onto the floor when the vending machine is open can be virtually eliminated.

The switch 154 of FIG. 2 also is useful in enabling the Control device to have the Display block 80 display one type of information when that control device is operating the vending machine in the product-dispensing and change-making mode and to display an entirely different type of information when that control device is operating the vending machine in the price-setting or data-setting mode. Specifically, when the switch 154 is open, the control device will hold the vending machine in the product-dispensing and change-making mode; and, at such time, the readouts 276, 278 and 280 will display, in decimal form, the value of any money inserted in the vending machine and the readouts 272 and 274 will remain un-illuminated. On the other hand, when the switch 154 is closed, the readouts 272 and 274 will display a selected line number and the readouts 276, 278 and 280 will display the price, or the mode-controlling data, which is being set for that line.

The blocks 50, 54, 56, 58 and 60 of FIG. 1 have, to simplify and clarify the explanation of the structure and operation of the control device, been shown as being separate from the Microprocessor 22. Those blocks can, and preferably will, be eliminated; and the functions performed thereby will be performed by components within that Microprocessor and by the program for the control device.

The RAM block 88 is described as being equipped with a RAM. Although other forms of memories could be used in place of a RAM, a RAM is preferred because of its economy of space and cost.

The Microprocessor 22 must supply or respond to signals on a total of thirty-two conductors; but it can supply or respond to only one eight-bit word at a time. Consequently, the thirty-two conductors which must receive signals from, or supply signals to, that Microprocessor have been divided into four groups, so that Microprocessor need supply or receive only one eight-bit word at any one time. Specifically, the four conductors in cable 28 and the four conductors in cable 36 constitute one group of eight conductors. Signals from the Vendor Selection block 26 will be supplied to the Microprocessor 22 via four conductors of cable 28 and will constitute the least significant bits of an eight-bit word; and the most significant bits of that word will be used to develop signals that will be applied to the Vendor Vending block 34 by the four conductors of cable 36. The second group of eight conductors are the four conductors of cable 44 and the four conductors of cable 98; and the third group of eight conductors are the eight conductors of cable 70. The last group of eight conductors include the conductor 32 which connects the Vendor Reset block 30 to the Microprocessor 22, the four conductors of cable 24 which connects the Mode, Line, And Price Control block 20 to that Microprocessor, two of the conductors of the cable 52 which connects that Microprocessor to the Display, Price, Mode, and Change Payout Control block 50, and conductor 45 which connects the Power On/Off interrupt block 42 to that Microprocessor. Whenever the Microprocessor 22 "reads" any data on an eight-conductor cable, it will "read" all eight bits of each eight-bit word into accumulator A. However, while that eight-bit word is in that accumulator, the program will cause all of the bits, which are not of interest at that instant, to be converted to "0's". In this way the Microprocessor can respond to just those particular bits, of each eight-bit word, in which it is interested.

The program, which is stored within the ROM, becomes active as soon as the vending machine is connected to a source of power. As long as the switch 154 of FIG. 2 remains in its "Normal" position, that program will call for scanning of the lines which correspond to the selection switches in the Vendor Selection block 26. When money has been inserted, and when one of the switches 222, 224, 226 and 228 of FIG. 8 is actuated, that program will cause the vending machine to dispense the desired product or service, will dispense any change that may be required, will perform the record-keeping operations of FIGS. 18E or 19E, and will then await a further patron-initiated operation.

The foregoing description has been directed to a control device that can be used with a vending machine which has four selection switches and that can provide two specifically-different mode control alternatives for that vending machine. However, that control device can be used with a vending machine which has up to forty selection lines, and it can provide several specially different mode control alternatives for that vending machine. However, where that control device is used with a vending machine which has more than thirty selection lines, the number of four-bit memory locations in the RAM block 88, in which the running counts of the products and services corresponding to the various selection lines are stored, can be reduced from four to three per selection line. Where that is done, each group of three four-bit memory locations can be arranged to store a running count of nine hundred and ninety-nine before it passes through zero to start a further running count.

Each group of memory locations, in RAM block 88, which corresponds to one of lines 1–4 can store any one of two hundred prices from $0.00 to $9.95; but, at any given time, each such group will store just one price. Each group of memory locations, in RAM block 88, which corresponds to either of lines 5 and 6 could store data corresponding to any one of two hundred different modes of operation; but, at any given time, each such group will store data corresponding to just one mode. In the foregoing description, the group of memory locations corresponding to line 5 stored data corresponding to a single selection "short vend" mode or to a single selection "long vend" mode; and the group of memory locations corresponding to line 6 stored a given change-limiting price. Where desired, the group of memory locations corresponding to line 5 could store data corresponding to any one of several modes. For example, that group of memory locations could store data corresponding to: a single selection "short vend" mode by storing 0.00 in those locations, a single selection "long vend" mode by storing 0.05 in those locations, a multi-selection "short vend" mode by storing 0.10 in those locations, or a multi-selection "long vend" mode by storing 0.15 in those locations. Other locations could be reversed for data corresponding to still further modes of operation. To set the mode-controlling data corresponding to either of lines 5 and 6, all that need be done is use the line selecting switch or switches or FIGS. 2–5 to select the desired line number, and then use the price or data-selecting switch or switches of those views to set the particular data corresponding to the desired mode. Thus the selecting of line 5 and the selecting of 0.05 would automatically set the control device in operation in the single selection "long vend" mode. Similarly, the selecting of line 6 and the selecting of 0.45 would automatically set the control device in operation in the change-limiting mode where the maximum amount of change that could be dispensed would be forty-five cents.

Although mode-controlling data, for any data-storing location corresponding to any given line, can be stored in the form of any one of two hundred different words, only one of those words can be stored in that data-storing location at any one time. Consequently, it will be desirable to group any modes of operation of the vending machine which are alternative in nature, and to store the mode-controlling word corresponding to just one of those alternative modes in the data-storing location corresponding to any given line. For example, it will be desirable to group the "exact change" and "over-credit" modes, and to store the mode-controlling word corresponding to just one of those modes in the data-storing location corresponding to a first line. Similarly, it will be desirable to group the "full escrow", "tube escrow", and "no escrow" modes, and to store the mode-controlling word corresponding to just one of those three modes in the data-storing location corresponding to a second line. Further, it will be desirable to group the "time out" and "no time out" modes, and to store the mode-controlling word corresponding to just one of those modes in the data-storing location corresponding to a third line. Additionally, it will be desirable to group the "single vend" and "multiple vend" modes, and to store the mode-controlling word corresponding to just one of those modes in the data-storing location corresponding to a fourth line. Moreover, it will be desirable to group the "nickel-nickel" payout mode and nickel-dime payout mode, and to store the mode-controlling word corresponding to just one of those modes in the data-storing location corresponding to a fifth line.

The modes of operation of the preceding paragraph, as well as the previously-described "long vend" and "short vend" modes and the "change limit" and "no change limit" modes, are known in the art; but those modes of operation usually are selected by the actuation of switches that are directly connected to circuit components which generate mode-establishing signals. In the control device provided by the present invention, the mode-controlling data for one of a plurality of predetermined, alternative modes of operation is stored in a selected location in RAM block 88 and also in a scratchpad register such as register H or M; and the program will, during each overall cycle of operation of the vending machine, check that mode-controlling data and cause a corresponding sub-routine to operate that vending machine in that mode. The manner in which the control device of the present invention senses for, and responds to, mode-controlling data has been described hereinbefore, will regard to the change limit and no change limit modes, in connection with step 996 of FIGS. 18C and 19C. Also, the manner in which that control device senses for, and responds to, mode-controlling data has been described hereinbefore, with regard to the short vend and long vend modes, in connection with steps 1002 and 1004 of those views. Where the vending machines is to be operated in still further modes, the flow charts of FIGS. 18A–18E and 19A–19E will be expanded to include steps and sub-routines corresponding to those various modes.

If, for example, mode-controlling data calling for the exact change mode were stored in RAM block 88 and in a scratchpad register, and if the nickel dispensing tube were empty at the start of an overall cycle of operation of the vending machine, the program would, subsequent to step 994 in FIG. 18C or in FIG. 19C, determine whether a nickel would have to be paid out as part of the change; and, if the program determined that a nickel would have to be paid out as part of the change, it would circulate through steps 902, 900, 992 and 994—in the same way that program circulates through those steps whenever the vending machine is in the change limit mode and the amount of change exceeds the change limit. However, if mode-controlling data calling for the over-credit mode were stored in RAM block 88 and in a scratchpad register, and if the nickel dispensing tube were empty at the start of an overall cycle of operation of the vending machine, the program would, subsequent to step 994 in FIG. 18C or in FIG. 19C, cause step 1006 to pay out the change—even if a nickel was supposed to, but could not, be paid out as part of that change.

The program for the control device can include generally-similar sub-routines for the other modes described hereinbefore. Importantly, the mode-controlling data for just one of a plurality of alternative modes will be stored in a single data-storing location for a given line; and that line can be selected by appropriate actuation of line-selecting switch 104 of FIG. 2 or of line-selecting switches 183 and 185 of FIG. 4. The mode-controlling data for that line can be set by appropriate actuation of price or data setting switch 106 of FIG. 2 or of price or data setting switches 182 and 184 of FIG. 4.

If it is desirable for the operator of a vending machine to know the percentage of operations of that vending machine in one or the other of two phases of a given mode of operation, the program will be written to respond to the signal, which calls for the vending machine to operate in one of those phases, to increment a running count in a data-storing location within the RAM block 88 and will respond to the signal, which calls for that vending machine to operate in the other of those phases, to increment a running count in a further data-storing location within that RAM block. For example, if the operator of a vending machine wishes to know the percentage of overall cycles of operations of that vending machine wherein patrons insert money and do or do not select products requiring more change than is permitted by the change limit mode, the program will be written to cause the signal which is developed at the right-hand side of step 996 in FIGS. 18C and 19C to increment a running count in one data-storing location within RAM block 88, and to cause the signal which is developed at the bottom of that step to increment a running count in another data-storing location within that RAM block. Each of those data-storing locations will have a line number; and the operator can use switch 104 of FIG. 2 or switches 183 and 185 of FIG. 4 to select the desired number. Thereupon, step 958 and steps similar to steps 982 and 984 will cause the data from those data-storing locations to be read into scratchpad registers such as D and E and then display the desired line number and the corresponding running count. Information regarding the percentage of overall cycles of operation of the vending machine wherein the required change exceeded the change limit could be used by the operator of that vending machine in deciding what limitation he should set on the amount of change which can be paid out.

If desired, the control device of the present invention could be equipped with a Cancel Sale Switch; and such a switch would be required if the vending machine was to be operable in the full escrow mode. Where the control device is equipped with such a switch, the program would be written so that whenever that switch was actuated, the values in the registers X1, X2 and X3 would be reduced to zero and would not be added to the running count of quarters, dimes and nickels respectively, which are stored in RAM block 88.

Further, if desired the control device of the present invention could be equipped with an inventory switch which would enable the operator to quickly effect the dispensing of all of the coins held in the change-dispensing tubes. In such event, the program would be written so the numbers of coins which were dispensed when that switch was actuated would not be written into the registers X1, X2 and X3. Alternatively, that program could be written so those numbers would be written into those registers, but those numbers would not be added to running counts in the locations in the RAM block 88 which correspond to nickels, dimes and quarters that have been dispensed during change-making operations.

Where a Mostek MK3870 Microprocessor is used as the Microprocessor 22, cable 28 will be connected to its pins 3–6, cable 36 will be connected to its pins 19–16, cable 52 will be connected to its pins 37, 36 and 7, cable 24 will be connected to its pins 35,34 and 24–25, cable 70 will be connected to its pins 8–15, cable 44 will be connected to its pins 33–30, and cable 98 will be connected to its pins 29–26. More particularly, where a Mostek MK3870 Microprocessor is used as the Microprocessor 22, the following conductors, cables, and sources will be connected to the following pins:

| Pin No. | Conductor |
|---|---|
| 2 | Oscillator (Not Shown) |
| 3 | 236 |
| 4 | 234 |
| 5 | 232 |
| 6 | 230 |
| 7 | 52 |
| 8 | 380 |
| 9 | 382 |
| 10 | 384 |
| 11 | 386 |
| 12 | 388 |
| 13 | 390 |
| 14 | 392 |
| 15 | 394 |
| 16 | 270 |
| 17 | 268 |
| 18 | 266 |
| 19 | 264 |
| 20 | GROUND |
| 22 | 134 |
| 23 | 136 |
| 24 | 156 |
| 25 | 32 |
| 26 | 98 |
| 27 | 98 |
| 28 | 98 |
| 29 | 98 |
| 30 | 306 |
| 31 | 308 |
| 32 | 310 |
| 33 | 312 |
| 34 | 152 |
| 35 | 45 |
| 36 | 52 |
| 37 | 52 |
| 38 | 43 |
| 39 | 71 |
| 40 | +5v |
| 1 | not used |
| 21 | not used |

If some other Microprocessor is used, those conductors, cables and sources will be connected to similarly functioning pins of that Microprocessor.

The switches shown in FIGS. 2–5 are desirable because they utilize only two of the I/O lines of the Microprocessor 22. In any control device wherein more than two I/O lines are available for the switches that select the desired lines in the RAM block 88 and that can write desired data into the data-storing locations corresponding to those lines, a switch could be used which required more than two I/O lines. Thus, a plural-position switch which automatically developed a distinctively-different code in each of the positions thereof and which utilized more than two conductors could be used.

Where one of such plural-position switches was used as the line switch in the control device of the present invention, the program could be written to sense the code for the instantaneous position of that switch and compare it with the code which was one position higher than the code in the line control register to see if there was a match. If no match was found, the program could sense the code for the instantaneous position of that switch and compare it with the code which was one position lower than the code in the line control register to see if there was a match. If no match was found in either of those comparisons, the program would recognize that the position of the switch had not been changed. If a match was found in either of those comparisons, that match would indicate that the switch had been actuated, and it also would indicate the direction in which that switch had been actuated. If one of such plural-position switches was used as the price-setting switch, the comparisons would be made with the codes that were one position higher and one position lower than the code in the price control register.

Alternatively, the program could use a code chart to determine whether such a plural-position switch had been actuated and, if so, in which direction it had been actuated. Specifically, a code chart for the line number could take the form of switch-position data that was stored in a read only memory, and the program for the control device could be written to respond to the code in the line control register to sequentially address two particular locations in that memory. One of those two locations would contain a code which corresponded to, but which was always one switch position higher than, the code in the line control register; and the other of those two locations would contain a code which corresponded to, but which was always one switch position lower than, the code in that register. The codes in each of those two locations would, in sequence, be compared with the code representing the instantaneous position of the switch. If no match was found in either of those comparisons, the program would recognize that the position of the switch had not been changed. However, if a match was found in either of those comparisons, that match would indicate that the position of the switch had been changed, and also would indicate the direction in which that position had been changed. A code chart also could be provided for the price or mode data; and it could take the form of switch-position data that was stored in that read only memory, and the program for the control device could be written to respond to the code in the price control register to sequentially address two further locations in that memory. One of those two further locations would contain a code which corresponded to, but which was always one switch position higher than, the code in the price control register; and the other of those two further locations would contain a code which corresponded to, but which was always one switch position lower than, the code in that register.

Each of the switches 104, 106 and 160 of FIGS. 2 and 3 has four positions and develops a distinctively-different code of each of those positions. If desired, however, those switches could be made so they had as few as three positions that provided distinctively-different codes. Alternatively, those switches could be made so they had five or more positions that provided distinctively-different codes. Where any of such switches were used, different comparison words and different result words would have to be used in the program for the control device. However, the selection of the codes for the various positions of such switches, and the selection of the comparison words and the result words to be used in the program, are within the skill of the art and need not be described herein.

If desired, each of the switches 104, 106 and 160 of FIGS. 2 and 3 could be made so it had a large number of positions; and, in such event, several of those positions would develop the same code. For example, if any of those switches were made to have forty positions, ten of those positions could provide the same code, another ten of those positions could provide a second code, a further ten of those positions could provide a third code, and a still further ten of those positions could provide a fourth code. In that case, the four sets of ten positions would be interlaced to provide ten angularly-displaced groups of four positions that provided four distinctively-different codes. Such a switch could be used with the two conductors 134 and 136 of FIG. 2.

The running counts of the coins that are inserted and accepted, the running counts of the coins that are dispensed as change, and the running counts of the products that are vended, can be numeric counts or can be decimal-value counts. Less space of Display block 80 is needed to display a numeric count than is needed to display the corresponding decimal-value count. However, a decimal-value count obviates the need of multiplying a numeric count by a decimal multiplier.

Whereas the drawing and accompanying description have shown and described a preferred embodiment of the present invention, it should be apparent to those skilled in the art that various changes may be made in the form of the invention without affecting the scope thereof.

We claim:

1. A data writing and storing system for a money-actuated vending machine which has a data checking mode and a money-dependent dispensing mode and which has patron-operated selection switches and which has money-responsive units and which comprises a memory that has a plurality of selectable locations wherein data can be stored, one of said selectable locations storing a running count of information resulting from operation of said vending machine, further of said selectable locations storing prices of products to be vended by said vending machine, a temporary store in which a temporary count of said information can be held, controlling and interconnecting means which, during said dispensing mode, enable said data writing and storing system to respond to actuation of a desired one of said patron-operated selection switches and to the accumulation of sufficient credit due to the insertion of money in said money-responsive units to sense and respond to data that is stored within one of said further of said selectable locations to automatically initiate operations wherein said temporary count in said temporary store is incremented said data writing and storing system automatically adding each temporary count which is developed in said temporary store during a vending cycle of operation of said vending machine to said running count to provide a permanent running count that is repeatedly and automatically incremented during successive operations of said vending machine, a digital visual display readout comprising a predetermined number of digital visual display elements which can display indicia identifying said one of said selectable locations and which can display said running count or which can display indicia identifying various of said further selectable locations and which can display the prices therein, and switching means that is separate from and in addition to said patron-operated selection switches which can select said one or said further of said selectable locations and thereby cause said digital visual display readout to display said indicia identifying said one of said selectable locations and said running count stored in said one selectable location or which can display indicia identifying various of said further selectable locations and the prices therein, said running counts indicia and said prices indicia being selectably displayable at the option of an operator of said data writing and storing system data writing and storing system keeping said operator from altering or changing either of said running counts, other than by causing said data writing and storing system to receive by actuation of said switching means.

2. A data writing and storing system for a money-actuated vending machine which has a data checking mode and a money-dependent dispensing mode and which has patron-operated selection switches and which has money-responsive units and which comprises a memory that has a plurality of selectable data-storing locations wherein data can be stored, one of said selectable locations storing a running count of information resulting from operation of said vending machine, further of said selectable locations storing prices of products to be vended by said vending machine, switching means that is separate from and in addition to said patron-operated selection switches, controlling and interconnecting means which enable said switching means to address said one of said selectable locations and any of said further of said selectable locations during said data checking mode, said controlling and interconnecting means being adapted, during said dispensing mode, to cause said data writing and storing system to respond to the insertion of money which accumulates sufficient credit and to the selection of a product or service by actuation of the corresponding patron-operated selection switch to automatically initiate operations wherein said running count is incremented and said product or service is dispensed during an overall vending cycle of said vending machine, to respond to the insertion of money and to the selection of said second product or service to initiate operations wherein said second running count is incremented and a digital visual display readout comprising a predetermined number of digital visual display elements which can display indicia indentifying said one of said selectable locations and which can display said running count or which can display indicia identifying various of said further selectable locations and which can display the prices therein, said running count indicia and said prices indicia being selectably displayable at the option of an operator of said data writing and storing system by actuation of said switching means.

3. A data writing and storing system as claimed in claim 2, wherein said vending machine can operate in a change limit mode, and wherein said running count is of the number of times the required change exceeded the change limit.

4. A data writing and storing system for a money-actuated vending machine as claimed in claim 2 wherein said vending machine has means to dispense money units of a given denomination as change, wherein said information in said running count is a count of money units of said given denomination that are dispensed as change by said money-dispensing means, and wherein said controlling and interconnecting means enables said data writing and storing system to respond to a dispensing operation for a money unit of said given denomination to automatically initiate operations which will increment the said running count during an overall vending cycle of said vending machine.

5. A data writing and storing system which has a data checking mode and a money-dependent dispensing mode and which has patron-operated selection switches and which has money-responsive units and which comprises a memory that has a plurality of selectable data-storing locations wherein data can be stored, one of said selectable locations storing a running count of information resulting from operation of said vending machine, further of said selectable locations storing prices of products to be vended by said vending machine, switching means that is separate from and in addition to said patron-operated selection switches, controlling and interconnecting means which enable said switching means to address said one of said selectable locations and any of said further of said selectable locations during said data checking mode, said controlling and interconnecting means being adapted, during said dispensing mode, to cause said data writing and storing system to respond to the insertion of money which accumulates sufficient credit and to the selection of a product or service by actuation of the corresponding patron-operated selection switch to automatically initiate operations wherein said running count is incremented and said product or service is dispensed during an overall vending cycle of said vending machine, a digital visual display readout comprising a predetermined number of digital visual display elements which can display indicia identifying said one of said selectable locations and which can display said running count or which can display indicia indentifying various of said further selectable locations and which can display the prices therein, said running count indicia and said prices indicia being selectably displayable at the option of an operator of said data writing and storing system by actuation of said switching means, said controlling and interconnecting means being a programmed controlling and interconnecting means, a first of said switching means being usable to address said one or said further of said selectable locations, and a second of said switching means being usable to change the data stored in selectable locations other than said one selectable location, said controlling and interconnecting means automatically responding to the addressing of said one of said selectable locations by said first of said switching means to isolate said second of said switching means from said one selectable location, whereby said one selectable location provides a progressively-increased permanent running count of said information, said controlling and interconnecting means automatically responding to the addressing of said further of said selectable locations by said first of said switching means to permit said second of said switching means to change data in said further selectable locations.

6. A data writing and storing system which has a data checking mode and a money-dependent dispensing mode and which has patron-operated selection switches and which has money-responsive units and which comprises a memory that has a plurality of selectable data-storing locations wherein data can be stored, one of said selectable locations storing a running count of information resulting from operation of said vending machine, further of said selectable locations storing prices of products to be vended by said vending machine, switching means that is separate from and in addition to said patron-operated selection switches, controlling and interconnecting means which enable said switching means to address said one of said selectable locations and any of said further of said selectable locations during said data checking mode, said controlling and interconnecting means being adapted, during said dispensing mode, to cause said data writing and storing system to respond to the insertion of money which accumulates sufficient credit and to the selection of a product or service by actuation of the corresponding patron-operated selection switch to automatically initiate operations wherein said running count is incremented and said product or service is dispensed during an overall vending cycle of said vending machine, a digital visual display readout comprising a predetermined number of digital visual display elements which can display indicia identifying said one of said selectable locations and which can display said running count or which can display indicia identifying various of said further selectable locations and which can display the prices therein, said running count indicia and said prices indicia being selectively displayable at the option of an operator of said data writing and storing system by actuation of said switching means, said controlling and interconnecting means being a programmed controlling and interconnecting means, part of said digital visual display readout being adapted to display said indicia identifying said running count, said part plus another part of said digital visual display readout being adapted to display said running count, said controlling and interconnecting means responding to any addressing of said one of said selectable locations by said switching means to cause the first said part of said digital visual display readout to momentarily display indicia identifying said one of said selectable locations and then, after said indicia identifying said one of said selectable locations has disappeared, cause said other part of said digital visual display readout to display at least part of said running count.

7. A data writing and storing system for a money-actuated vending machine, which has a data checking and changing mode and a money-dependent dispensing mode and which has patron-operated selection switches and which has money-responsive units and which comprises a memory that has a plurality of selectable data-storing locations wherein selectively-changeable data can be stored, switching means, controlling and interconnecting means which enable said switching means to address any one of a desired number of said data-storing locations during said data checking and changing mode, said controlling and interconnecting means being adapted, during said dispensing mode, to respond to actuation of a desired one of said patron-operated selection switches and to the accumulation of sufficient credit due to the insertion of money in said money-responsive units to automatically sense and respond-to said selectively-changed data that is stored within said desired one of said selectable data-storing locations to automatically control a predetermined function of said vending machine, and a digital visual display readout comprising a predetermined number of digital visual display elements, which can display indicia corresponding to data stored within said selected data-storing location, said controlling and interconnecting means responding to the addressing of said one of said selectable data-storing locations by said switching means during said data checking and changing mode, but not during said dispensing mode, to cause said digital visual display readout to display indicia identifying said data-storing location and to display said indicia corresponding to data stored within said one of said selectable data-storing locations.

8. A control system for a money-actuated vending machine which has a data checking and changing mode and a money-dependent dispensing mode and which has patron-operated selection switches and which has money-reponsive units, and which comprises a programmable microprocessor operating under the control of a program a memory that has a selectable location wherein control data for said vending machine can be stored and that also has further selectable locations wherein selectively-changed data is stored, switching means that can provide signals, said microprocessor responding to one of said signals to cause the first said selectable location to be addressed, said switching means being adapted to provide a further signal, said microprocessor, whenever said one signal causes said microprocessor to address said first said selectable location, responding to control data that is stored in said first said selectable location to call for said vending machine to operate in one of a plurality of pre-set conditions, said further signal provided by said switching means being adapted to change said control data in said first said selectable location and thereby select the desired pre-set condition, and a change payout means which can dispense change, said microprocessor being adapted, during said dispensing mode, to respond to actuation of a desired one of said patron-operated selection switches and to the accumulation of sufficient credit due to the insertion of money in said money-responsive units to sense and respond to said selectively-changed data that is stored within a desired one of said further selectable locations to automatically effect the dispensing of the desired product or service, said microprocessor also determining which one of said pre-set conditions is called for by said control data in said first said selectable location and then causing said vending machine to dispense change via said change-dispensing means in accordance with said one of said pre-set conditions, said pre-set conditions including the dispensing of whatever amount of change is needed to match the difference between the value of inserted money and the price of a selected product or service and also including the dispensing of change which is equal to or less than a pre-set value.

9. A data writing and storing system for a money-actuated vending machine which has a data checking and changing mode and a money-dependent dispensing mode and which has patron-operated selection switches and which has money-responsive means and which comprises a memory that has a pluality of selectable data-storing locations wherein selectively-changeable control data can be stored, operator-controlled switching means that can provide signals, said patron-operated selection switches being able to provide signals, said money-responsive means responding to the insertion of money to develop signals, controlling and interconnecting means, said controlling and interconnecting means, during said data checking and changing mode, responding to a signal from said operator-controlled switching means to cause the corresponding desired selectable data-storing location to be addressed to enable the control data that is stored within said corresponding desired selectable data-storing location to be checked or changed, said controlling and interconnecting means, during said money-dependent dispensing mode, responding to a signal from said money-responsive means to develop a credit, said controlling and interconnecting means, during said money-dependent dispensing mode, responding to a signal from said money-responsive means to develop a credit, said controlling and interconnecting means, during said money-dependent dispensing mode, responding to a signal from one of said patron-operated selection switches to cause the corresponding desired selectable data-storing location to be addressed to enable the control data that is stored within said corresponding selectable data-storing location to be compared with said credit, said controlling and interconnecting means automatically acting, in the event said credit is sufficient, to control a predetermined function of said vending machine, said signal from said patron-operated selection switch being specific to the selectable data-storing location corresponding thereto and said controlling and interconnecting means responding to said signal to directly address said corresponding selectable data-storing location, said signal from said operator-controlled switching means being a step-inducing signal and said operator-controlled switching means providing said step-inducing signal in step-by-step manner, said controlling and interconnecting means responding to each actuation of said operator-controlled switching means, wherein said signal is provided, to address a different one of said desired number of selectable data-storing locations, said controlling and interconnecting means responding to a predetermined multiple of said step-inducing signal developed by said operator-controlled switching means to provide a corresponding change in address of said desired number of said data-storing locations.

10. A data writing and storing system for a money-actuated vending machine as claimed in claim 9 wherein said operator-controlled switching means includes a switch that has at least three positions and that provides said step-inducing signals in the form of coded non-decimal signals, and wherein said indicia identifying said desired one of said selectable locations are in decimal form.

11. A data writing and storing system for a money-actuated vending machine as claimed in claim 9 wherein said operator-controlled switching means comprises a switch that has at least three positions and that develops a distinctively-different coded signal in each of those positions, said switch developing three distinctively-different coded signals in one sequence to indicate that it is being moved in a direction wherein data-incrementing coded signals are developed as it is set in said three positions during said incrementing of said data of said predetermined type in said selectable data-storing locations in said memory, said switch developing three distinctively-different coded signals in a different sequence to indicate that it is being moved in the opposite direction as it is set in said three positions during said decrementing of said data of said predetermined type in said memory, said controlling and interconnecting means responding to said coded signals from said switch to change said data in said selectable data-storing locations in said memory.

12. A data writing and storing system for a money-actuated vending machine which has a data checking and changing mode and a money-dependent dispensing mode and which has patron-operated selection switches and which has money-responsive means and which comprises a memory that has a plurality of selectable data-storing locations wherein selectively-changeable control data can be stored, operator-controlled switching means that can provide signals, said patron-operated selection switches being able to provide signals, said money-responsive means responding to the insertion of money to develop signals, controlling and interconnecting means, said controlling and interconnecting means, during said data checking and changing mode, responding to a signal from said operator-controlled switching means to cause the corresponding desired selectable data-storing location to be addressed to enable the control data that is stored within said corresponding desired selectable data-storing location to be checked or changed, said controlling and interconnecting means, during said money-dependent dispensing mode, responding to a signal from said money-responsive means to develop a credit, said controlling and interconnecting means, during said money-dependent dispensing mode, responding to a signal from one of said patron-operated selection switches to cause the corresponding desired selectable data-storing location to be addressed to enable the control data that is stored within said corresponding selectable data-storing location to be compared with said credit, said controlling and interconnecting means automatically acting, in the event said credit is sufficient, to control a predetermined function of said vending machine, said signal from said patron-operated selection switch being specific to the selectable data-storing location corresponding thereto and said controlling and interconnecting means responding to said signal to directly address said corresponding selectable data-storing location, said signal from said operator-controlled switching means being a step-inducing signal and said operator-controlled switching means providing said step-inducing signal in step-by-step manner, said controlling and interconnecting means responding to each actuation of said operator-controlled switching means, wherein said signal is provided, to addres a different one of said desired number of selectable data-storing locations, said controlling and interconnecting means responding to a pre-determined multiple of said step-inducing signal developed by said operator-controlled switching means to provide a corresponding change in address of said desired number of said data-storing locations, said controlling and interconnecting means, during said data checking and changing mode, responding to a further signal from said operator-controlled switching means to change said data within the selectable data-storing location which said controlling and interconnecting means addressed in response to the first said signal from said operator-controlled switching means, said further signal from said operator-controlled switching means being a step-inducing signal and said operator-controlled switchiing means providing said step-inducing signal in step-by-step manner, said controlling and interconnecting means responding to each actuation of said operator-controlled switching means, wherein said further signal is provided, to change said data within the selectable data-storing location which said controlling and interconnecting means addressed in response to the first said signal from said operator-controlled switching means.

13. A data writing and storing system for a money-actuated vending machine which has a data checking and changing mode and a money-dependent dispensing mode and which has patron-operated selection switches and which has money-responsive means and which comprises a memory that has a plurality of selectable data-storing locations wherein selectively-changeable control data can be stored, operator-controlled switching means that can provide signals, said patron-operated selection switches being able to provide signals, said money-responsive means responding to the insertion of money to develop signals, controlling and interconnecting means, said controlling and interconnecting means, during said data checking and changing mode, responding to a signal from said operator-controlled switching means to cause the corresponding desired selectable data-storing location to be addressed to enable the control data that is stored within said corresponding desired selectable data-storing location to be checked or changed, said controlling and interconnecting means, during said money-dependent dispensing mode, responding to a signal from said money-responsive means to develop a credit, said controlling and interconnecting means, during said money-dependent dispensing mode, responding to a signal from one of patron-operated selection switches to cause the corresponding desired selectable data-storing location to be addressed to enable the control data that is stored within said corresponding selectable data-storing location to be compared with said credit, said controlling and interconnecting means automatically acting, in the event said credit is sufficient, to control a predetermined function of said vending machine, said signal from said patron-operated selection switch being specific to the selectable data-storing location corresponding thereto and said controlling and interconnecting means responding to said signal to directly address said corresponding selectable data-storing location, said signal from said operator-controlled switching means being a step-inducing signal and said operator-controlled switching means providing said step-inducing signal in step-by-step manner, said controlling and interconnecting means responding to each actuation of said operator-controlled switching means, wherein said signal is provided, to address a different one of said desired number of selectable data-storing locations, said controlling and interconnecting means responding to a predetermined multiple of said step-inducing signal developed by said operator-controlled switching means to provide a corresponding change in address of said desired number of said data-storing locations, and additional operator-controlled switching means that is independent of the first said operator-controlled switching means and that can provide a signal causing the control data tha is stored in any one of a desired number of said selectable data-storing locations to be changed while said data writing and storing system is in said data checking mode, said controlling and interconnecting means responding to signals from said additional operator-controlled switching means to apply data-changing signals to selectable data-storing locations.

14. A data writing and storing system for a money-actuated vending machine as claimed in claim 13 wherein data that is stored in a given selectable data-storing location within said memory provides a vend of a predetermined fixed duration for said vending machine, said additional switching means being adapted to change said control data in said given selectable data-storing location to enable it to provide a vend of a second and different predetermined fixed duration for said vending machine.

15. A data writing and storing system for a money-actuated vending machine which has a data checking and changing mode and a money-dependent dispensing mode and which has patron-operated selection switches and which has money-responsive means and which comprises a memory that has a plurality of selectable data-storing locations wherein selectively-changeable control data can be stored, operator-controlled switching means that can provide signals, said patron-operated selection switches being able to provide signals, said money-responsive means responding to the insertion of money to develop signals, controlling and interconnecting means, said controlling and interconnecting means, during said data checking and changing mode, responding to a signal from said operator-controlled switching means to cause the corresponding desired selectable data-storing location to be addressed to enable the control data that is stored within said corresponding desired selectable data-storing location to be checked or changed, said controlling and interconnecting means, during said money-dependent dispensing mode, responding to a signal from said money-responsive means to develop a credit, said controlling and interconnecting means, during said money-dependent dispensing mode, responding to a signal from one of said patron-operated selection switches to cause the corresponding desired selectable data-storing location to be addressed to enable the control data that is stored within said corresponding selectable data-storing location to be compared with said credit, said controlling and interconnecting means automatically acting, in the event said credit is sufficient, to control a predetermined function of said vending machine, said signal from said patron-operated selection switch being specific to the selectable data-storing location corresponding thereto and said controlling and interconnecting means responding to said signal to directly address said corresponding selectable data-storing location, said signal from said operator-controlled switching means being a step-inducing signal and said operator-controlled switching means providing said step-inducing signal in step-by-step manner, said controlling and interconnecting means responding to each actuation of said operator-controlled switching means, wherein said signal is provided, to address a different one of said desired number of selectable data-storing locations, said controlling and interconnecting means responding to a predetermined multiple of said step-inducing signal developed by said operator-controlled switching means to provide a corresponding change in address of said desired number of said data-storing locations, and a digital visual display readout comprising a predetermined number of digital visual display elements which can display the selectable data-storing location addressed by said operator-controlled switching means and also display indicia corresponding to data stored within said selected data-storing location, said controlling and interconnecting means responding to the addressing of said selectable data-storing location by said operator-controlled switching means during said data checking and changing mode to cause said digital visual display readout to display indicia identifying said data-storing location and to display said indicia corresponding to data stored within said selectable data-storing location.

16. A data writing and storing system for a money-actuated vending machine which has a data checking mode and a money dependent dispensing mode and which has patron-operated selection switches and which has money-responsive units and which comprises a memory that has a plurality of selectable data-storing locations wherein data can be stored, one of said selectable locations storing a running count of information resulting from operation of said vending machine, further of said selectable locations storing prices of products to be vended by said vending machine, switching means that is separate from and in addition to said patron-operated selection switches, controlling and interconnecting means which enable said switching means to address said one of said selectable locations and any of said further of said selectable locations during said data checking mode, said controlling and interconnecting means being adapted, during said dispensing mode, to cause said data writing and storing system to respond to the insertion of money which accumulates sufficient credit and to the selection of a product or service by actuation of the corresponding patron-operated selection switch to automatically initiate operations wherein said running count is incremented and said product or service is dispensed during an overall vending cycle of said vending machine, and a digital visual display readout comprising a predetermined number of digital visual display elements which can display indicia identifying said one of said selectable locations and which can display said running count or which can display indicia identifying various of said further selectable locations and which can display the prices therein, said running count indicia and said prices indicia being selectably displayable at the option of an operator of said data writing and storing system by actuation of said switching means, said switching means providing step-inducing signals in step-by-step manner, said controlling and interconnecting means responding to each actuation of said switching means to address a different one of said selectable locations.

17. A data writing and storing system for a money-actuated vending machine which has a data checking mode and a money-dependent dispensing mode and which has patron-operated selection switches and which has money-responsive units and which comprises a memory that has a plurality of selectable data-storing locations wherein data can be stored, one of said selectable locations storing a running count of information resulting from operation of said vending machine, further of said selectable locations storing prices of products to be vended by said vending machine, switching means that is separate from and in addition to said patron-operated selection switches, controlling and interconnecting means which enable said switching means to address said one of said selectable locations and any of said further of said selectable locations during said data checking mode, said controlling and interconnecting means being adapted, during said dispensing mode, to cause said data writing and storing system to respond to the insertion of money which accumulates sufficient credit and to the selection of a product or service by actuation of the corresponding patron-operated selection switch to automatically initiate operations wherein said running count is incremented and said product or service is dispensed during an overall vending cycle of said vending machine, and a digital visual display readout comprising a predetermined number of digital visual display elements which can display indicia identifying said one of said selectable locations and which can display said running count or which can display indicia identifying various of said further selectable locations and which can display the prices therein, said running count indicia and said prices indicia being selectably displayable at the option of an operator of said data writing and storing system by actuation of said switching means, said vending machine having means to dispense change, the data that is stored in a given selectable data-storing location within said memory permitting said vending machine to dispense change under one of two pre-set conditions, namely, the dispensing of whatever amount of change is needed to match the difference between the value of inserted money and the price of the selected product or service or the dispensing of change which is equal to or less than a pre-set value, said switching means being adapted to change said control data within said given selectable data-storing location within said memory to permit said vending machine to dispense change under the other of said two pre-set conditions.

18. A data writing and storing system for a money-actuated vending machine, which has a data checking and changing mode and a money-dependent dispensing mode and which has patron-operated selection switches and which has money-responsive units, and which comprises a memory that has a plurality of selectable data-storing locations wherein selectively-changeable data can be stored, switching means, controlling and interconnecting means which enable said switching means to address any one of a desired number of said data-storing locations during said data checking and changing mode, said controlling and interconnecting means being adapted, during said dispensing mode, to respond to actuation of a desired one of said patron-operated selection switches and to the accumulation of sufficient credit due to the insertion of money in said money-responsive units to automatically sense and respond to said selectively-changed data that is stored within said desired one of said selectable data-storing locations to automatically control a predetermined function of said vending machine, and a digital visual display readout comprising a predetermined number of digital visual display elements, which can display the data-storing location addressed by said switching means and also display indicia corresponding to data stored within said selected data-storing location, said controlling and interconnecting means responding to the addressing of said one of said selectable data-storing locations by said switching means during said data checking and changing mode, but not during said dispensing mode, to cause said digital visual display readout to display indicia identifying said data-storing location and to display said indicia corresponding to data stored within said one of said selectable data-storing locations, said switching means providing step-inducing signals in step-by-step manner, said controlling and interconnecting means responding to each actuation of said switching means to address a different one of said selectable locations.

19. A data writing and storing system for a money-actuated vending machine which has a data checking and changing mode and a money-dependent dispensing mode and which has patron-operated selection switches and which has money-responsive means and which comprises a memory that has a plurality of selectable data-storing locations wherein selectively-changeable control data can be stored, operator-controlled switching means that can provide signals, said patron-operated selection switches being able to provide signals, said money-responsive means responding to the insertion of money to develop signals, controlling and interconnecting means, said controlling and interconnecting means, during said data checking and changing mode, responding to a signal from said operator-controlled switching means to cause the corresponding desired selectable data-storing location to be addressed to enable the control data that is stored within said corresponding desired selectable data-storing location to be checked or changed, said controlling and interconnecting means, during said money-dependent dispensing mode, responding to a signal from said money-responsive means to develop a credit, said controlling and interconnecting means, during said money-dependent dispensing mode, responding to a signal from one of said patron-operated selection switches to cause the corresponding desired selectable data-storing location to be addressed to enable the control data that is stored within said corresponding selectable data-storing location to be compared with said credit, said controlling and interconnecting means automatically acting, in the event said credit is sufficient, to control a predetermined function of said vending machine, said signal from said patron-operated selection switch being specific to the selectable data-storing location corresponding thereto and said controlling and interconnecting means responding to said signal to directly address said corresponding selectable data-storing location, said operator-controlled switching means having one portion thereof that provides incrementing signals, said operator-controlled switching means having another portion thereof that provides decrementing signals, said controlling and interconnecting means responding to each actuation of said one portion of said operator-controlled switching means, wherein a signal is provided, to address a higher-number location of said desired number of selectable data-storing locations or to write a higher value for the control data in a data-storing location, said controlling and interconnecting means responding to eacb actuation of said other portion of said operator-controlled switching means, wherein a signal is provided, to address a lower-number location of said desired number of data-storing locations or to write a lower value for the control data in a data-storing location.

20. A data writing and storing system as claimed in claim 19 wherein said signal from said one portion of said operator-controlled switching means is a step-inducing signal, wherein said one portion of said operator-controlled switching means provides said step-inducing signal in step-by-step manner, wherein said signal from said other portion of said operator-controlled switching means is a step-inducing signal, and wherein said other portion of said operator-controlled switching means provides said step-inducing signal in step-by-step manner.

21. A data writing and storing system for a money-actuated vending machine which has a data checking and changing mode and a money-dependent dispensing mode and which has patron-operated selection switches and which has money-responsive means and which comprises a memory that has a plurality of selectable data-storing locations wherein selectively-changeable control data can be stored, operator-controlled switching means that can provide signals, said patron-operated selection switches being able to provide signals, said money-responsive means responding to the insertion of money to develop signals, controlling and interconnecting means, said controlling and interconnecting means, during said data checking and changing mode, responding to a signal from said operator-controlled switching means to cause the corresponding desired selectable data-storing location to be addressed to enable the control data that is stored within said corresponding desired selectable data-storing location to be checked or changed, said controlling and interconnected means, during said money-dependent dispensing mode, responding to a signal from said money-responsive means to develop a credit, said controlling and interconnecting means, during said money-dependent dispensing mode, responding to a signal from one of said patron-operated selection switches to cause the corresponding desired selectable data-storing location to be addressed to enable the control data that is stored within said corresponding selectable data-storing location to be compared with said credit, said controlling and interconnecting means automatically acting, in the event said credit is sufficient, to control a predetermined function of said vending machine, said signal from said patron-operated selection switch being specific to the selectable data-storing location corresponding thereto and said controlling and interconnecting means responding to said signal to directly address said corresponding selectable data-storing location, said operator-controlled switching means having one portion thereof that provides incrementing signals, said operator-controlled switching means having a second portion thereof that provides decrementing signals, said operator-controlled switching means having a third portion thereof that provides incrementing signals, said operator-controlled switching means having a fourth portion thereof that provides decrementing signals, said controlling and interconnecting means responding to each actuation of said one portion of said operator-controlled switching means, wherein a signal is provided, to address a higher-number location of said desired number of selectable data-storing locations, said controlling and interconnecting means responding to each actuation of said second portion of said operator-controlled switching means, wherein a signal is provided, to address a lower-number location of said desired number of selectable data-storing locations, said controlling and interconnecting means responding to each actuation of said third portion of said operator-controlled switching means, wherein a signal is provided, to write a higher value for the control data in a data-storing location, said controlling and interconnecting means responding to each actuation of said fourth portion of said operator-controlled switching means, wherein a signal is provided, to write a lower value for the control data in a data-storing location.

* * * * *